United States Patent
Shimohata et al.

(10) Patent No.: US 9,030,410 B2
(45) Date of Patent: May 12, 2015

(54) CONTROLLER DEVICE, INFORMATION PROCESSING SYSTEM, AND INFORMATION PROCESSING METHOD

(71) Applicant: Nintendo Co., Ltd., Kyoto (JP)

(72) Inventors: Yasuyuki Shimohata, Kyoto (JP); Toru Yamashita, Kyoto (JP); Kuniaki Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/089,562

(22) Filed: Nov. 25, 2013

(65) Prior Publication Data

US 2014/0078053 A1    Mar. 20, 2014

Related U.S. Application Data

(63) Continuation of application No. 13/702,465, filed as application No. PCT/JP2012/063496 on May 25, 2012.

(51) Int. Cl.
  *G09G 5/00* (2006.01)
  *G06F 3/01* (2006.01)
  *G06F 3/038* (2013.01)
  (Continued)

(52) U.S. Cl.
  CPC *G06F 3/01* (2013.01); *G06F 3/038* (2013.01); *G06F 2203/0384* (2013.01); *A63F 13/26* (2014.09); *A63F 13/42* (2014.09); *A63F 13/533* (2014.09); *A63F 13/235* (2014.09)

(58) Field of Classification Search
  None
  See application file for complete search history.

(56) References Cited

U.S. PATENT DOCUMENTS 5,410,326 A * 4/1995 Goldstein ...................... 348/734
5,554,980 A * 9/1996 Hashimoto et al. ........... 345/158

(Continued)

FOREIGN PATENT DOCUMENTS

JP   2-198299      8/1990
JP   2002-268691   9/2002

(Continued)

OTHER PUBLICATIONS

Office Action Issued in U.S. Appl. No. 13/702,430 on Nov. 25, 2013.

(Continued)

*Primary Examiner* — Jesus Hernandez
(74) *Attorney, Agent, or Firm* — Nixon & Vanderhye, P.C.

(57) ABSTRACT

A controller device is used for more information processes. The controller device is capable of wirelessly communicating with an information processing device. The controller device includes a communication unit, a display unit, and a program executing unit. The communication unit transmits, to the information processing device, operation data obtained based on an operation performed on the controller device, and receives, from the information processing device, image data generated in the information processing device through a process performed based on operation data. A display unit displays an image represented by the image data received from the information processing device. When a predetermined operation on the controller device is performed, the program executing unit executes a predetermined program and displays at least the image resulting from the execution of the program on the display unit. The communication unit transmits, to the information processing device, data indicating that the predetermined program is being executed.

18 Claims, 15 Drawing Sheets

(51) Int. Cl.
  *A63F 13/26* (2014.01)
  *A63F 13/42* (2014.01)
  *A63F 13/533* (2014.01)
  *A63F 13/235* (2014.01)

(56) References Cited

U.S. PATENT DOCUMENTS

| | | | |
|---|---|---|---|
| 5,872,562 | A | 2/1999 | McConnell et al. |
| 6,238,291 | B1 | 5/2001 | Fujimoto et al. |
| 8,292,738 | B2 | 10/2012 | Hosoi et al. |
| 8,350,830 | B2 | 1/2013 | Hosoi et al. |
| 8,749,489 | B2 | 6/2014 | Ito et al. |
| 2003/0236617 | A1 | 12/2003 | Yamada et al. |
| 2004/0064234 | A1 | 4/2004 | Okamoto |
| 2006/0001644 | A1 | 1/2006 | Arakawa et al. |
| 2006/0038833 | A1* | 2/2006 | Mallinson et al. ............ 345/633 |
| 2006/0068917 | A1 | 3/2006 | Snoddy et al. |
| 2006/0223635 | A1* | 10/2006 | Rosenberg ..................... 463/37 |
| 2006/0285843 | A1 | 12/2006 | Sakurai |
| 2007/0050139 | A1 | 3/2007 | Sidman |
| 2007/0060228 | A1* | 3/2007 | Akasaka et al. ................. 463/1 |
| 2008/0040079 | A1 | 2/2008 | Hargreaves |
| 2008/0123582 | A1 | 5/2008 | Maekawa |
| 2008/0297487 | A1 | 12/2008 | Hotelling et al. |
| 2008/0318692 | A1 | 12/2008 | Dohta |
| 2009/0066648 | A1* | 3/2009 | Kerr et al. ..................... 345/158 |
| 2009/0069096 | A1 | 3/2009 | Nishimoto |
| 2009/0247250 | A1 | 10/2009 | Kato et al. |
| 2009/0278796 | A1 | 11/2009 | Komazaki |
| 2009/0300108 | A1* | 12/2009 | Kohno ........................... 709/203 |
| 2010/0033424 | A1 | 2/2010 | Kabasawa et al. |
| 2010/0245605 | A1 | 9/2010 | Sakurai |
| 2010/0248825 | A1 | 9/2010 | Toyoda |
| 2010/0248835 | A1 | 9/2010 | Suzuki et al. |
| 2011/0074591 | A1 | 3/2011 | Arling et al. |
| 2011/0124414 | A1 | 5/2011 | Sawano et al. |
| 2011/0190052 | A1 | 8/2011 | Takeda et al. |
| 2011/0190061 | A1 | 8/2011 | Takeda et al. |
| 2011/0244937 | A1 | 10/2011 | Yamashita et al. |
| 2011/0285704 | A1 | 11/2011 | Takeda et al. |
| 2012/0044177 | A1 | 2/2012 | Ohta et al. |
| 2012/0046106 | A1 | 2/2012 | Ito et al. |
| 2012/0077586 | A1 | 3/2012 | Pishevar |
| 2012/0086630 | A1* | 4/2012 | Zhu et al. ....................... 345/156 |
| 2012/0086631 | A1* | 4/2012 | Osman et al. .................. 345/156 |
| 2012/0144299 | A1 | 6/2012 | Patel et al. |
| 2012/0242526 | A1 | 9/2012 | Perez et al. |
| 2012/0256835 | A1 | 10/2012 | Musick et al. |
| 2012/0280932 | A1 | 11/2012 | Krah et al. |
| 2012/0313976 | A1 | 12/2012 | Shirakawa |
| 2013/0101140 | A1 | 4/2013 | Cho et al. |
| 2013/0113698 | A1 | 5/2013 | Kuroume et al. |
| 2013/0314340 | A1 | 11/2013 | Shimohata et al. |

FOREIGN PATENT DOCUMENTS

| | | |
|---|---|---|
| JP | 2007-061489 | 3/2007 |
| JP | 2009-141602 | 6/2009 |
| JP | 2009-152836 | 9/2009 |
| JP | 2009-289182 | 12/2009 |
| JP | 2010-147726 | 1/2010 |
| JP | 2011-053060 | 3/2011 |
| JP | 2012-096005 | 5/2012 |

OTHER PUBLICATIONS

Notice of Allowance for U.S. Appl. No. 13/702,427, mailed Sep. 11, 2013.
Office Action for U.S. Appl. No. 13/702,465, mailed Aug. 23, 2013.
Quayle Action for U.S. Appl. No. 13/702,427, mailed May 30, 2013.
Japanese Language International Search Report for PCT/JP2012/063494, mailed Aug. 14, 2012.
International Search Report for PCT/JP2012/063495, mailed Aug. 7, 2012.
Office Action issued in U.S. Appl. No. 13/419,697 dated Jul. 7, 2014.
Notice of Allowance dated Mar. 10, 2014 issued in connection with U.S. Appl. No. 13/702,430, filed Dec. 6, 2012.
Search Report issued on Dec. 9, 2014 in corresponding European Application No. 12877547.5.
Office Action issued in U.S. Appl. No. 13/736,364 dated Nov. 7, 2014.

* cited by examiner

|  | TYPES OF DATA | PRIORITY |
|---|---|---|
| DOWN STREAM | OUTPUT IMAGE DATA (PERIODICAL) | 1 |
|  | OUTPUT SOUND DATA (PERIODICAL) |  |
|  | FIRST EXTENSION COMMUNICATION DATA (NON-PERIODICAL) | 5 |
|  | CONTROL DATA (PERIODICAL) | 4 |
| UP STREAM | TRANSMIT INFORMATION DATA (PERIODICAL) | 2 |
|  | CAMERA IMAGE DATA (PERIODICAL) | 3 |
|  | MICROPHONE SOUND DATA (PERIODICAL) |  |
|  | SECOND EXTENSION COMMUNICATION DATA (NON-PERIODICAL) | 6 |

F I G. 1 6

| | COMPONENTS | FIRST INFORMATION PROCESS | SECOND INFORMATION PROCESS |
|---|---|---|---|
| INPUT UNIT | BUTTONS (EXCEPT FOR START-UP BUTTON) | INVALID | SOME ARE USED |
| | START-UP BUTTON | | USED |
| | DIRECTION INPUT UNIT | | USED |
| | ACCELERATION SENSOR | SAME AS DURING SOLO-USE | NOT USED |
| | GYROSENSOR | | |
| | MAGNETIC SENSOR | | |
| | TOUCH PANEL | INVALID | USED |
| | MICROPHONE | SAME AS DURING SOLO-USE | NOT USED |
| | CAMERA | | |
| OTHERS | SPEAKER | VOLUME: 25% | USED |
| | VIBRATOR | STOPPED | NOT USED |
| | MARKER UNIT | SAME AS DURING SOLO-USE | |
| | INFRARED LIGHT EMITTING UNIT | NOT USED | USED |
| | INFRARED COMMUNICATION UNIT | PROHIBITED | NOT USED |
| | NEAR FIELD COMMUNICATION UNIT | PROHIBITED | |
| | CONNECTOR | SAME AS DURING SOLO-USE | |

CONTROLLER DEVICE, INFORMATION PROCESSING SYSTEM, AND INFORMATION PROCESSING METHOD

This application is a continuation of application Ser. No. 13/702,465, filed Dec. 6, 2012, now pending; which is the national stage of Application No. PCT/JP2012/063496, filed May 25, 2011; the entire contents of which is hereby incorporated by reference.

TECHNICAL FIELD

The present invention relates to a controller device for transmitting operation data, an information processing system including a controller device, and an information processing method for use with a controller device.

BACKGROUND ART

There are conventional controller devices capable of accepting user operations and outputting operation data based on the operations. For example, there is a controller device capable of transmitting operation data to an information processing device, which executes an information process based on operation data (see, for example, Patent Document 1).

CITATION LIST

Patent Literature

Patent Document 1: Japanese Laid-Open Patent Publication No. 2007-061489

SUMMARY OF INVENTION

Technical Problem

Such a controller device as described above is used for an information process of an information processing device, and it is desirable that it has more functions.

Thus, it is an object of the present invention to provide a controller device, an information processing system including the controller device, and an information processing method for use in the controller device.

Solution to Problem

In order to solve the problems set forth above, the present invention employs the following configurations (1) to (16).

(1)

An example of the present invention is a controller device capable of wirelessly communicating with an information processing device. The controller device includes a communication unit, a display unit, and a program executing unit.

The communication unit transmits operation data obtained based on an operation performed on the controller device to the information processing device, and receives, from the information processing device, image data generated in the information processing device through a process performed based on the operation data. The display unit displays an image represented by the image data received from the information processing device. The program executing unit executes a predetermined program and displays at least an image resulting from the execution of the program on the display unit, if a predetermined operation is performed on the controller device. The communication unit transmits, to the information processing device, data indicating that the predetermined program is being executed.

With configuration (1) above, while an image obtained by an information process executed in the information processing device is displayed on the controller device, another information process can be executed in the controller device. Thus, the controller device can be used for more information processes. Moreover, since data indicating that the predetermined program is being executed is transmitted to the information processing device, the information processing device can identify the execution status of the program. For example, the information processing device can change the content of the information process for generating the image data based on operation data based on the execution status of the program.

(2)

The display unit may at least display, as the image resulting from the execution of the program, a control image used for performing an operation regarding a predetermined process executed by the program.

With configuration (2) above, an input for the information process of the information processing device can be made by using the controller device, and also an input for the information process of the controller device can be made by using the controller device.

(3)

The communication unit may receive the image data from the information processing device, irrespective of whether the predetermined program is being executed. Then, while the predetermined program is being executed, the display unit displays an image represented by the image data, together with the image resulting from the execution of the program.

With configuration (3) above, an image regarding an information process of the information processing device is displayed on the controller device, and also an image regarding an information process of the controller device is displayed on the controller device. That is, the controller device can present, to the user, images regarding the two information processes. The user can check both of the two images using the controller device.

(4)

The communication unit may transmit, to the information processing device, operation data representing an operation performed on operation units of the controller device. Then, the program executing unit executes the predetermined process using, as an input, an operation performed on one or more of the operation units. When data indicating that the predetermined program is being executed is received, the information processing device generates the image data by executing a process based on the operation data while invalidating operations performed on the one or more of the operation units.

With configuration (4) above, an operation performed on the one or more of the operation units of the controller device is used in the predetermined process executed in the controller device and is not used in the process executed in the information processing device. Therefore, an operation performed on a certain operation unit is not used in a process that is not intended by the user, thereby preventing an erroneous input.

(5)

The controller device may include, as the one or more of the operation units, a touch panel provided on a screen of the display unit.

With configuration (5) above, the controller device allows the user to make an input for an information process of the controller device through an intuitive operation using a touch panel. Moreover, when an image used for performing an operation on the information process is displayed on the display unit as the control image, it is possible to present, to the user, an intuitive and easy operation on the image.

(6)

The controller device may include, as the one or more of the operation units, one or more button.

With configuration (6) above, the controller device allows the user to make an input for an information process of the controller device through an easy operation using a button.

(7)

The controller device may further include a sensor for detecting at least one of a position, an attitude and a movement of the controller device. Then, the communication unit transmits operation data including data based on detection results obtained by the sensor, irrespective of whether the predetermined program is being executed. The program executing unit executes the predetermined process without using the detection results obtained by the sensor.

With configuration (7) above, the operation of moving the controller device itself will not be used in the process of the controller device against the intention of the user, thereby preventing an erroneous input.

(8)

The communication unit may receive sound data from the information processing device. Then, the controller device further includes a sound outputting unit for outputting a sound represented by the sound data and/or a sound generated by the predetermined process. While the predetermined program is being executed, the sound outputting unit outputs the sound represented by the sound data together with the sound generated by the predetermined process, with the sound represented by the sound data being output at a lower volume as compared with that when the predetermined program is not being executed.

With configuration (8) above, the controller device can provide the user with both a sound obtained through an information process of the controller device and a sound obtained through an information process of the information processing device, and can provide the user with a sound obtained through an information process of the controller device in an easy-to-hear manner.

(9)

The communication unit may transmit, to the information processing device, data indicating whether the predetermined program is being executed, together with the operation data, with a predetermined frequency.

With configuration (9) above, the information processing device can reliably check the execution status of the predetermined program.

(10)

The display unit may lay an image resulting from the execution of the predetermined program over the image represented by the image data.

With configuration (10) above, the controller device can provide the user with both an image obtained through an information process of the controller device and an image obtained through an information process of the information processing device, and can provide the user with an image obtained through an information process of the controller device in an easy-to-view manner.

(11)

The program executing unit may execute, as the predetermined program, a program for controlling, in accordance with an operation performed on the controller device, a display device capable of displaying an image generated in the information processing device.

With configuration (11) above, the user can operate the display device using the controller device.

(12)

The controller device may include an infrared light emitting unit for emitting an infrared light signal. The display device may include an infrared light receiving unit for receiving the infrared light signal. Then, the program executing unit controls the display device by making the infrared light emitting unit output the infrared light signal.

With configuration (12) above, an ordinary display device (e.g., a television) having a function of receiving an infrared light signal can be used in the information processing system including the controller device, thereby allowing various display devices to be used in the information processing system. Using an infrared light signal, it is possible to easily control the display device with the controller device.

(13)

The controller device may include a predetermined button. Then, the program executing unit executes the predetermined program when an operation on the predetermined button is performed as the predetermined operation.

With configuration (13) above, the user can easily start up the predetermined program by operating the predetermined button.

(14)

The communication unit may transmit, to the information processing device, data indicating whether the predetermined program is being executed, and data representing an operation on the predetermined button.

With configuration (14) above, the information processing device receiving the two data is capable of determining, with a higher precision, whether the predetermined program is being executed.

(15)

The controller device may further include a storage unit for storing an image. Then, the program executing unit displays the image stored in the storage unit on the display unit when the predetermined operation is performed.

With configuration (15) above, the controller device can easily generate an image resulting from the execution of the predetermined program.

(16)

The communication unit may receive, as the image data, game image data generated by a game process executed in the information processing device. Then, the display unit displays an image represented by the game image data.

With configuration (16) above, the user can start up another program on the controller device while playing a game based on a game process of the information processing device.

Note that another example of the present invention may be an information processing system including a controller device and an information processing device according to configurations (1) to (16) above, or an information processing method to be carried out in the controller device and/or the information processing device.

Advantageous Effects of Invention

As described above, according to the present invention, a controller device can be used for more information processes.

BRIEF DESCRIPTION OF DRAWINGS

FIG. 16 A diagram showing an example of correspondence between first and second information processes and the use of various components of the controller device.

DESCRIPTION OF EMBODIMENTS

1. General Configuration of Information Processing System

Figure 1:
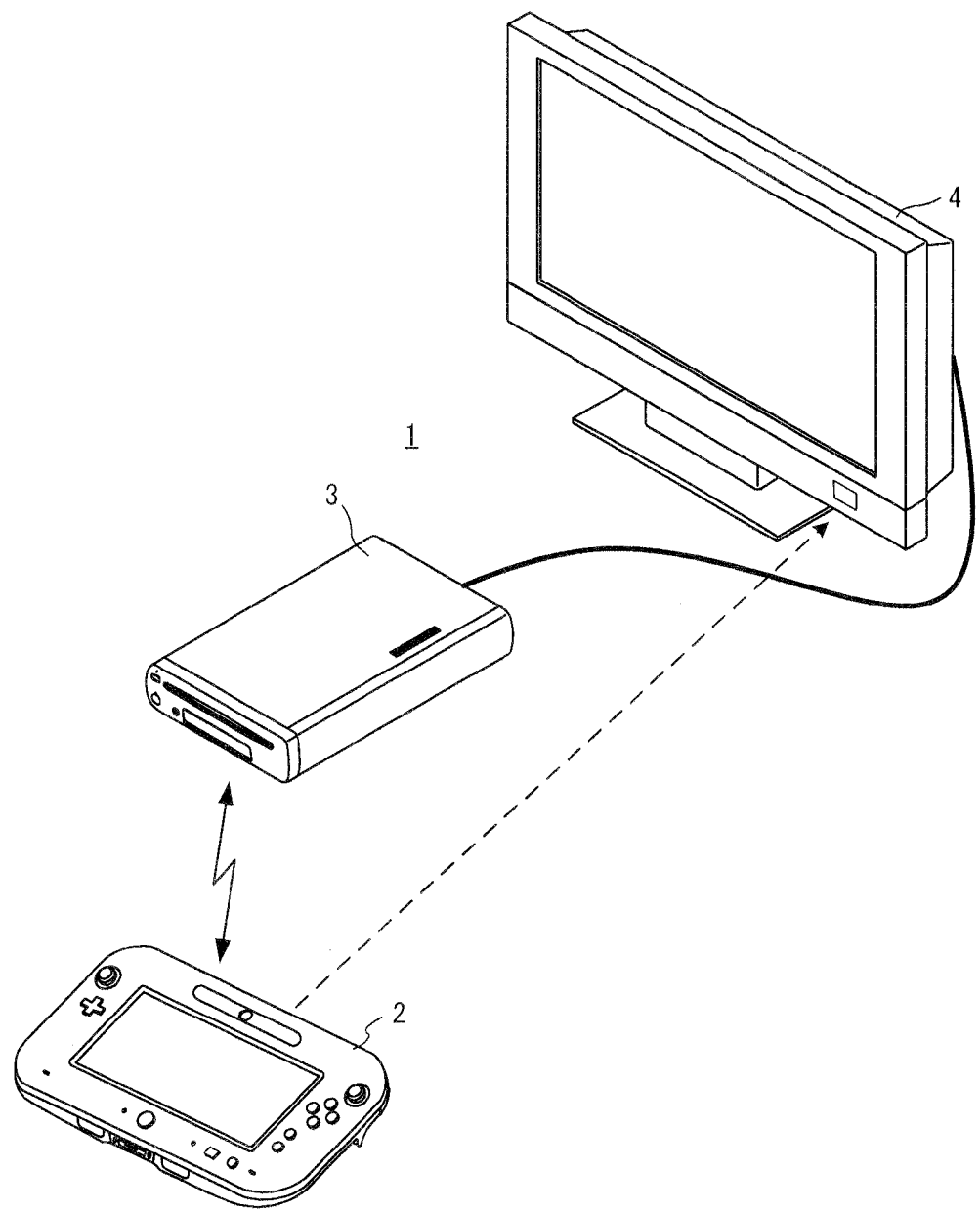
FIG. 1 An external view of an example of an information processing system.

Now, referring to the drawings, an example of a controller device, an information processing system and a communication method according to an embodiment of the present invention will be described. FIG. 1 is an external view of an example of the information processing system. In FIG. 1, an information processing system 1 includes a controller device 2, an information processing device 3, and a display device 4. The information processing system 1 executes an information process in the information processing device 3 based on an operation performed on the controller device 2, and displays an image obtained through the information process on the controller device 2 and/or the display device 4.

The controller device 2 is portable and is of a size that can be held by the user. The controller device 2 is capable of wirelessly communicating with the information processing device 3. The controller device 2 includes an operation unit (in the present embodiment, a group of buttons 14, an acceleration sensor 23, a touch panel 12, etc., to be described below) for outputting data representing an operation by the user, the detailed configuration of which will be described later. The controller device 2 generates operation data based on an operation performed on the controller device 2 (operation unit), and wirelessly transmits the operation data to the information processing device 3. The operation data is data representing an operation performed on the controller device 2 (operation unit), and there is no limitation on the specific content thereof. The details of the operation data of the present embodiment will be described later (see "[6. Generation of operation data]" to be described below).

Note that it can also be said that the operation data represents an instruction by the user made on the controller device 2. That is, it can also be said that the controller device 2 generates instruction data representing an instruction by the user, and wirelessly transmit the instruction data to the information processing device 3. It can also be said that the operation data represents an input made on the controller device 2. That is, it can also be said that the controller device 2 generates input data representing an input made on the controller device 2, and wirelessly transmits the input data to the information processing device 3.

The controller device 2 includes a display unit. The controller device 2 receives image data transmitted from the information processing device 3. The display unit displays an image represented by the received image data. Note that the image data is typically generated in the information processing device 3 based on an information process (the first information process to be described below) using the operation data.

In the present embodiment, the controller device 2 has a function of controlling the display device 4. The controller device 2 can control the operation of the display device 4 by transmitting an infrared light signal, which is the control signal, to the display device 4, for example (see a dotted-line arrow shown in FIG. 1), the details of which will be described below. Note that the controller device 2 does not need to have the function of controlling the display device 4.

The information processing device 3 is a stationary information processing device, for example. The information processing device 3 may be a game device capable of executing a game program, for example. The information processing device 3 performs an information process by executing a program stored in a storage medium (or a storage device) that is accessible by the information processing device 3. In the present embodiment, the information processing device 3 receives the operation data transmitted from the controller device 2, and executes a predetermined information process using the operation data as an input. Note that the information processing device 3 may receive operation data also from another device other than the controller device 2, and execute the predetermined information process based on the operation data received from these devices.

The information processing device 3 generates an image (image data) in the predetermined information process. That is, the information processing device 3 generates image data based on an information process using the operation data. The image is wirelessly transmitted from the information processing device 3 to the controller device 2, and displayed (output) on the controller device 2. Hereinafter, the image generated in the predetermined information process may be referred to as the "output image", and the image data representing the image as the "output image data".

Note that the information processing device 3 may generate a sound (sound data) in addition to the image in the predetermined information process. This sound is wirelessly transmitted from the information processing device 3 to the controller device 2, and output from the controller device 2. Hereinafter, the sound generated in the predetermined information process may be referred to as the "output sound", and sound data representing the sound as the "output sound data".

The information processing device 3 is capable of communicating with the display device 4. In the present embodiment, the information processing device 3 and the display device 4 communicate with each other via wired connection. Note that in a variation of the present embodiment, the communication between the information processing device 3 and the display device 4 may be wireless communication.

The information processing device 3 may generate an image and/or a sound to be output to the display device 4 in the predetermined information process. The image to be output to the display device 4 may be the same as, or different from, the image to be output to the controller device 2 (the output image described above). The sound to be output to the display device 4 may be the same as, or different from, the sound to be output to the controller device 2 (the output sound described above).

The display device 4 is a stationary display device, for example. In the present embodiment, the display device 4 is a television receiver (television). The display device 4 typically has a screen that is larger than the display unit of the controller device 2. The display device 4 displays an image generated in an information process executed in the information processing device 3. The display device 4 includes a speaker 5 (FIG. 4), and the speaker 5 outputs the sound generated in the information process described above.

The display device 4 has a function of receiving a control signal from the controller device 2. For example, the display device 4 includes an infrared light receiving unit capable of receiving an infrared light signal. The display device 4 performs an operation in accordance with the infrared light signal received by the infrared light receiving unit. That is, the display device 4 is capable of receiving an infrared light signal as a control signal to operate in accordance with the control signal.

Note that while FIG. 1 shows a configuration where the information processing system 1 includes one controller device 2, the information processing system 1 may include two controller devices 2. That is, the information processing device 3 is capable of communicating with two controller devices 2. The information processing device 3 is capable of receiving operation data from the controller devices 2. The information processing device 3 is capable of transmitting the output image data (and the output sound data) to the controller devices 2. Thus, according to the present embodiment, the information processing device 3 is capable of accommodating up to two controller devices 2. Note that in a variation of the present embodiment, the information processing device 3 may be capable of simultaneously wirelessly communicating with three or more controller devices 2.

2. Configuration of Controller Device

Figure 2:
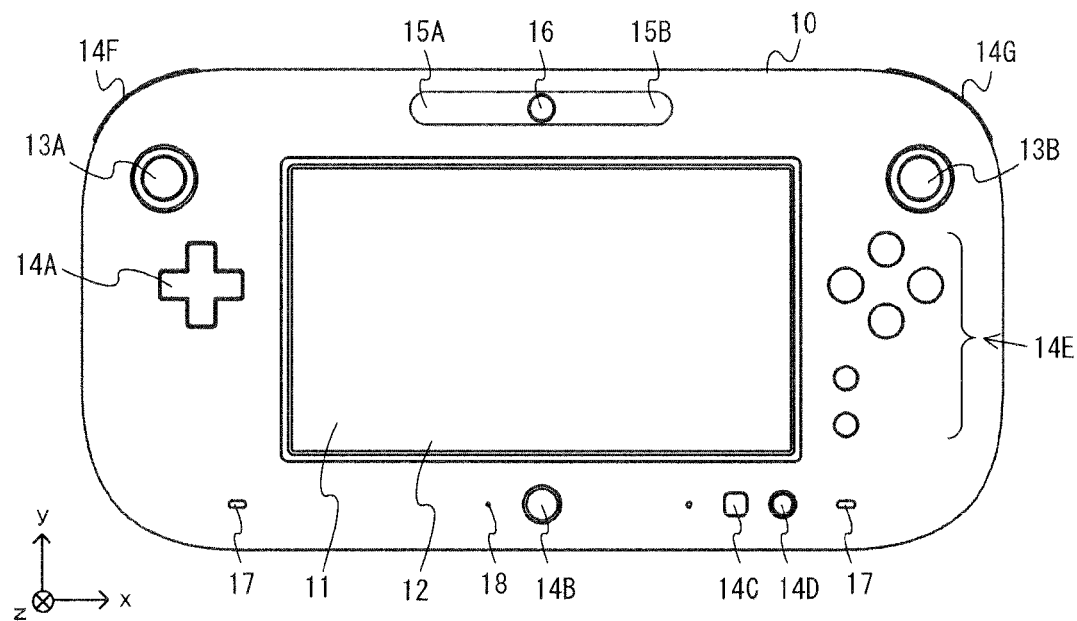
FIG. 2 A front view of an example of a controller device.
Figure 3:
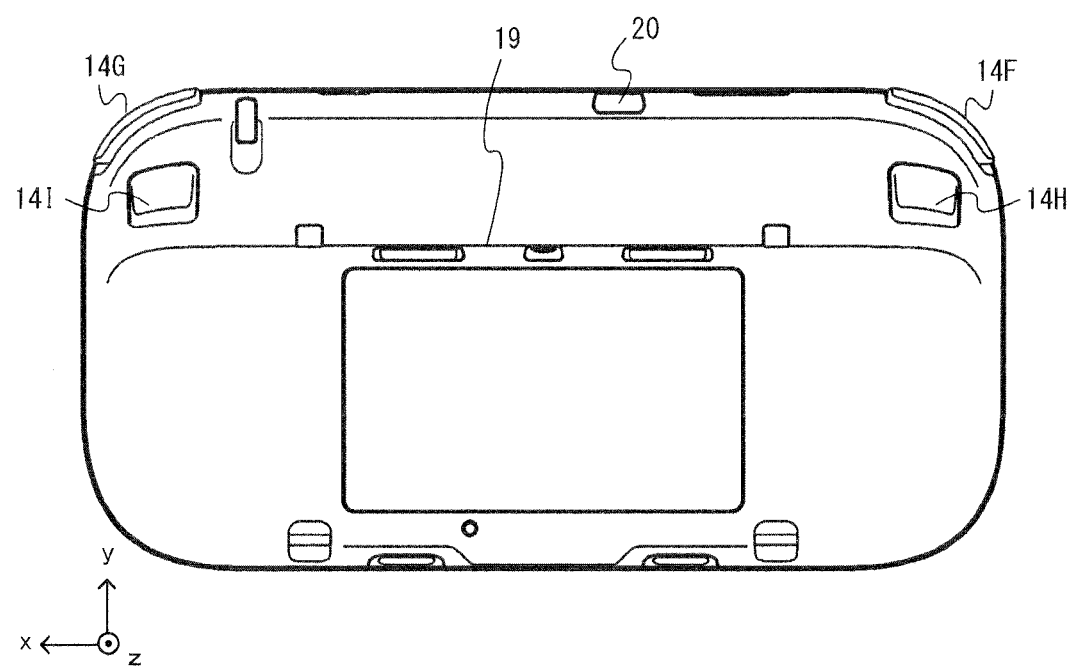
FIG. 3 A back view of an example of a controller device.

Next, referring to FIGS. 2 to 4, a configuration of the controller device 2 will be described. FIG. 2 is a front view of an example of the controller device 2. FIG. 3 is a back view of an example of the controller device 2.

As shown in FIG. 2, the controller device 2 includes a housing 10 that is generally in a horizontally-elongated rectangular plate shape. It can also be said that the controller device 2 is a tablet-type information processing device (terminal device). Note that the "plate shape" as used in the present specification means a plate shape as a whole, and may partially have a curved surface or may partially have protrusions. The shape of the controller device 2 (the housing 10) may be any shape. The housing 10 is sized so that it can be held by the user. Thus, the user can hold and move the controller device 2, and can change the position in which the controller device 2 is placed.

The controller device 2 includes a display unit 11. The display unit 11 may be any display mechanism, and may be an LCD (liquid crystal display device), for example. The display unit 11 is provided near the center of the surface of the housing 10. Therefore, the user can hold and move the controller device 2 while looking at the screen of the display unit 11 by holding opposing end portions of the housing 10 with respect to the display unit 11. Note that the user can hold the controller device 2 in a landscape position (in a horizontally-oriented direction) by holding left and right opposing end portions of the housing 10 with respect to the display unit 11, or the user can hold the controller device 2 in a portrait position (in a vertically-oriented direction).

The controller device 2 includes the operation unit described above. The operation unit may be any unit capable of outputting data representing an operation by the user. In the present embodiment, the controller device 2 includes a plurality of types of operation units to be described below. Note however that the controller device 2 is only required to have at least one operation unit, and the type of the operation unit may be any type.

As shown in FIG. 2, the controller device 2 includes the touch panel 12 as an example of the operation unit described above. The touch panel 12 is provided on the screen of the display unit 11. The touch panel 12 may be of a single-touch type or a multi-touch type. Note that the housing 10 is provided with a hole for accommodating a touch pen used for performing operations on the touch panel 12.

As shown in FIG. 2, the controller device 2 includes a direction input unit 13 as an example of an operation unit. The direction input unit 13 is an operation unit capable of inputting (specifying) a direction. In the present embodiment, the direction input unit 13 is an analog stick. In the present embodiment, the controller device 2 includes, as the direction input unit 13, two analog sticks, i.e., a left analog stick 13A provided on the left side of the display unit 11, and a right analog stick 13B provided on the right side of the display unit 11. The analog stick may be a direction input unit of such a type that a movable member (e.g., a stick unit) can be tilted in any direction with respect to the surface of the housing 10 (in other words, at any angle in the up, down, left, right and diagonal directions), or may be a direction input unit of such a type that the movable member can be slid in any direction with respect to the surface of the housing 10. In the present embodiment, the analog stick is configured so that the movable member can be depressed in a direction generally perpendicular to the surface of the housing 10. That is, the direction input unit 13 of the present embodiment is an analog stick of such a type that allows for an operation of moving the movable member in any direction and an operation of depressing the movable member. Note that the movable member does not need to be configured so that the movable member can be depressed.

The controller device 2 includes a group of buttons 14 (the buttons 14A to 14I) as an example of an operation unit. The buttons 14A to 14I are keys that can be depressed. In the present embodiment, the cross button (direction input button) 14A, the button 14B, the button 14C, and a group of buttons 14E are provided on the front surface of the housing 10. The buttons 14A to 14E provided on the front surface of the housing 10 are arranged at positions at which they can be operated by the thumbs of the user while the user is holding the left and right portions of the controller device 2. Therefore, the user can easily operate these buttons 14A to 14E even while holding and moving the controller device 2.

The cross button 14A has a cross shape, and is a button with which it is possible to specify at least up, down, left and right directions. Therefore, in the present embodiment, the cross button 14A may be used as the direction input unit.

The button 14C is a button used for instructing a start-up of a program executed in the controller device 2. Hereinafter, this program may be referred to as the "second program" for the purpose of distinguishing it from the "first program" to be described later. The second program is a program executed in the controller device 2. The information process executed in the controller device 2 by the second program may be referred to as the "second information process". In the present embodiment, the second program is a program for operating the display device (television) 4, the details of which will be described below. Thus, the controller device 2 has a function as a remote controller of the television. Note that hereinafter, the button 14C may be referred to as the "start-up button".

The button 14B is a button for giving an instruction to display a predetermined menu screen. The button 14D is a power button for turning ON/OFF the power of the controller device 2. By operating the power button, the user can remotely turn ON/OFF the power of the information processing device 3.

As shown in FIGS. 2 and 3, in the present embodiment, the first L button 14F and the first R button 14G are provided on the left and right opposing sides, respectively, on the upper surface of the housing 10. As shown in FIG. 3, the second L button 14H and the second R button 14I are provided on the left and right opposing sides, respectively, on the back surface (reverse surface) of the housing 10. The second L button 14H and the second R button 14I are provided on the upper surface of a projecting portion 19 formed on the back surface of the housing 10. These buttons 14F to 14I are arranged at such positions that the user can operate them with the index finger, the middle finger or the ring finger while holding left and right portions of the controller device 2. Therefore, the user can easily operate these buttons 14F to 14I even while holding and moving the controller device 2.

In the present embodiment, the buttons 14A and 14E to 14I are each assigned to a function in accordance with the information process executed by the information processing device 3. For example, the cross button 14A and the group of buttons 14E may be assigned to the specification of a direction and the specification of a selection, and the buttons 14E to 14I may be assigned to an instruction to confirm a selection and an instruction to cancel a selection. In a variation of the present embodiment, the controller device 2 may include a button for turning ON/OFF the screen display of the display unit 11, and/or a button for performing a connection setting (pairing) with the information processing device 3.

Note that the shapes, the number, the positions, etc., of the buttons 14A to 14I shown in FIGS. 2 and 3 are merely illustrative, and there is no limitation on the shapes, the number and the positions of the buttons of the controller device 2.

In the present embodiment, the projecting portion 19 is provided on the reverse side of the housing 10 (the side opposite to the front surface where the display unit 11 is provided) (see FIG. 3). As shown in FIG. 3, the projecting portion 19 is a mountain-shaped member which is projecting from the reverse surface of the generally plate-shaped housing 10. In the present embodiment, the projecting portion 19 is formed to extend left and right, and can be said to be in an eaves-like shape. The projecting portion has such a height (thickness) that it can rest on fingers of the user holding the reverse surface of the housing 10. The user can hold the controller device 2 stably without getting tired even if the controller device 2 has a relatively large size by holding the projecting portion 19 while resting fingers thereon (placing the projecting portion 19 on the fingers). That is, the projecting portion 19 can be referred to as a supporting member by means of which the housing 10 is supported by fingers, and can be referred to also as a finger-resting portion. Note that in the present embodiment, there is no limitation on the shape and the position of the projecting portion 19. In a variation of the present embodiment, the controller device 2 may be configured without the projecting portion 19.

In the present embodiment, the controller device 2 includes a marker unit 15. As shown in FIG. 2, the marker unit 15 includes a marker 15A and a marker 15B provided on the front surface of the housing 10. The marker 15A and the marker 15B are each formed by an infrared LED. The infrared LED is arranged inside a window portion that is transmissive to infrared light. The marker unit 15 is used for calculating the position, the attitude, the movement, etc., of the controller which is capable of detecting infrared light. In the present embodiment, the information processing device 3 is capable of controlling the lighting of the infrared LEDs of the marker unit 15.

The controller device 2 includes a camera 16 which is an image-capturing device. The camera 16 includes an image-capturing element (e.g., a CCD image sensor, a CMOS image sensor, etc.) having a predetermined resolution, and a lens. As shown in FIG. 2, the camera 16 is provided on the front surface of the housing 10 in the present embodiment. Therefore, the camera 16 can capture an image of, for example, the face of the user holding the controller device 2, and can capture an image of the user playing a game while looking at the screen of the display unit 11, for example.

The controller device 2 includes a microphone 32 (see FIG. 4) which is an example of a sound input unit. As shown in FIG. 2, a microphone hole 18 is provided on the front surface of the housing 10. The microphone 32 is provided inside the housing 10 behind the microphone hole 18. The microphone 32 detects sounds around the controller device 2 (e.g., the voice of the user, etc.).

While the controller device 2 includes the camera 16 and the microphone 32 as described above, the controller device 2 may include neither of, or only one of, the camera 16 and the microphone 32.

The controller device 2 includes a speaker 31 (see FIG. 4) which is an example of a sound outputting unit. As shown in FIG. 2, speaker holes 17 are provided on the front surface of the housing 10. The output sounds of the speaker 31 are output from the speaker holes 17 to the outside of the controller device 2. In the present embodiment, the controller device 2 includes two speakers 31, and the speaker holes 17 are provided at positions of each of the left speaker and the right speaker. Note that the controller device 2 includes a knob (not shown) for adjusting the sound volume of the speaker 31. The controller device 2 includes a sound outputting terminal (not shown) for receiving a sound outputting unit such as an earphone connected thereto. There is no limitation on positions where the sound outputting terminal and the knob are provided. Note that the controller device 2 may be configured without the sound outputting unit.

The housing 10 includes a window 20 capable of transmitting infrared light therethrough. The window 20 is provided for transmitting/receiving infrared light signals between an infrared communication unit 36 and an infrared light emitting unit 38 to be described below. That is, in the present embodiment, the infrared communication unit 36 and the infrared light emitting unit 38 are provided inside the window 20

(inside the housing 10). The infrared communication unit 36 receives infrared light signals from outside the controller device 2 through the window 20, and transmits infrared light signals to the outside of the controller device 2 through the window 20. The infrared light emitting unit 38 transmits infrared light signals to the outside of the controller device 2 through the window 20. In the present embodiment, the window 20 is provided on the upper side surface of the housing 10 (see FIG. 3) so that the infrared light signal is emitted in a forward direction of the user (or the infrared light signal is received from the forward direction of the user) when the user holds the opposing sides of the display unit 11. Note however that the window 20 may be provided at any position such as, for example, on the reverse surface of the housing 10.

The controller device 2 includes a connector 26 (see FIG. 3) for connecting a peripheral device to the controller device 2. The connector 26 is a communication terminal for transmitting/receiving data (information) with another peripheral device connected to the controller device 2. Note that the connector 26 may include a terminal for supplying power to the peripheral device or a terminal for charging.

Herein, in the present specification, another device that is different from the information processing device 3 and is capable of communicating with the controller device 2 is referred to as an "external device". An external device is only required to be capable of communicating with the controller device 2, and may be able to communicate with the infrared communication unit 36 to be described below or may be able to communicate with the controller device 2 via a near field communication unit 37. The external device may be of any type, and it may be, for example, an external storage medium such as a memory card, or an information processing terminal, etc. Hereinafter, the communication between the controller device 2 and an external device may be referred to as "extension communication".

Note that with the controller device 2 shown in FIGS. 2 and 3, the shapes, the number, the positions, etc., of the components are merely illustrative. Other shapes, numbers and positions may be employed for these components.

Next, referring to FIG. 4, the internal configuration of the controller device 2 will be described. FIG. 4 is a block diagram showing an example internal configuration of the controller device 2. The controller device 2 includes components shown in FIG. 4, in addition to those shown in FIGS. 2 and 3. The electronic parts of the components shown in FIG. 4 are, for example, mounted on an electronic circuit board and accommodated in the housing 10.

Figure 4:
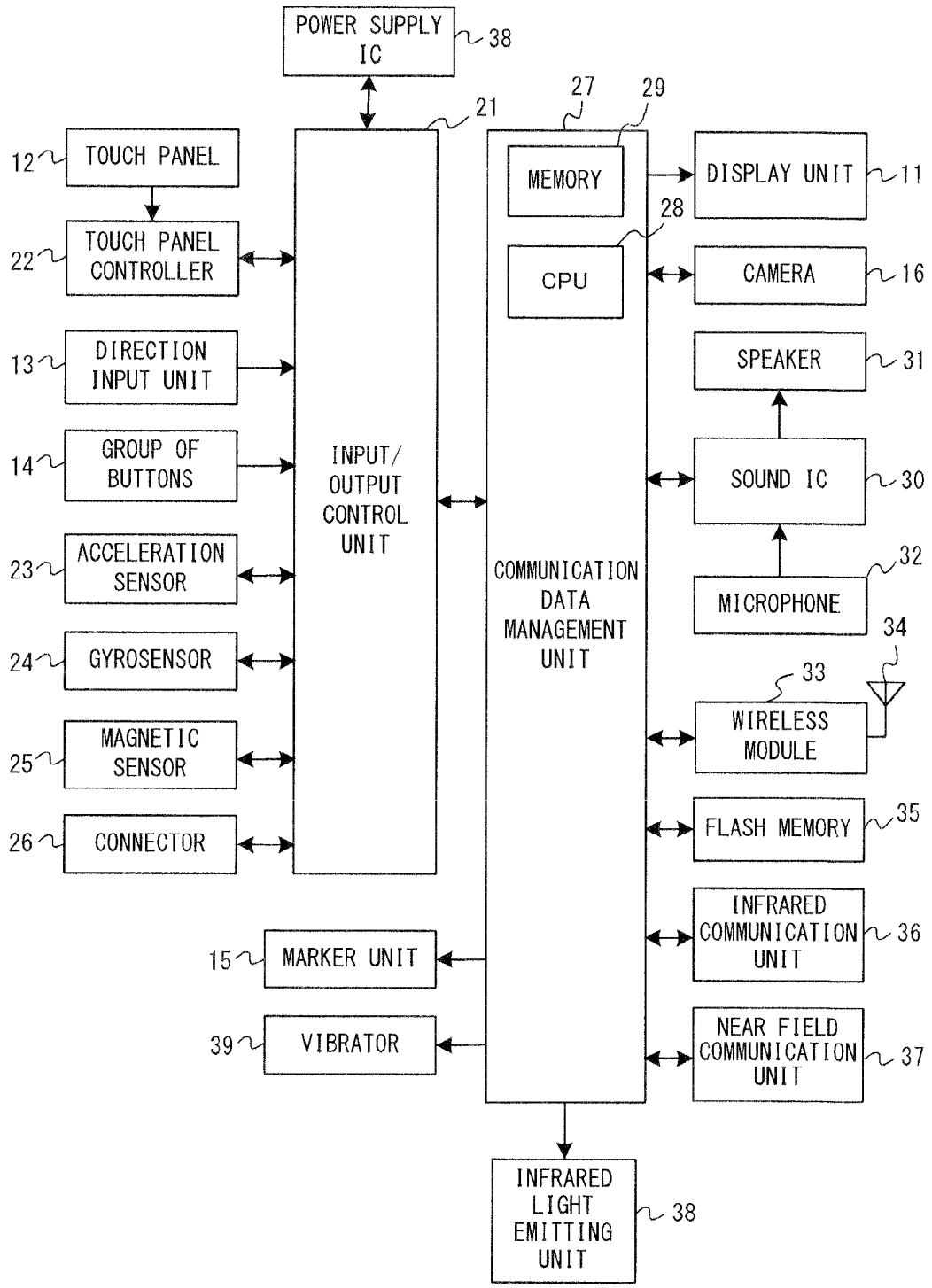
FIG. 4 A block diagram showing an internal configuration of an example controller device.

As shown in FIG. 4, the controller device 2 includes an input/output control unit 21. The input/output control unit 21 controls the input/output of data to/from operation units connected to the input/output control unit 21. The input/output control unit 21 is connected to the operation units (the touch panel 12 is connected thereto via a touch panel controller 22). Hereinafter, the operation units will be described.

The controller device 2 includes the touch panel controller 22. The touch panel controller 22 is a circuit for controlling the touch panel 12. The touch panel controller 22 is connected to the touch panel 12, and is connected to the input/output control unit 21. The touch panel controller 22 generates input position data based on a signal from the touch panel 12, and outputs the input position data to the input/output control unit 21. The input position data represents a position at which an input has been made on the input surface of the touch panel 12 (referred to as the "input position"; referred to also as the touch position). More specifically, the input position data may be data representing two-dimensional coordinates that indicate the input position. The touch panel controller 22 reads a signal from the touch panel 12 and generates the input position data at a rate of once per a predetermined period of time. Various control instructions for the touch panel 12 are output from the input/output control unit 21 to the touch panel controller 22.

The direction input unit 13 described above is connected to the input/output control unit 21. The direction input unit 13 outputs specified direction data, representing the direction specified by the user, to the input/output control unit 21. In the present embodiment, the specified direction data represents the direction of movement and the amount of movement of the movable member operated by a finger of the user. More specifically, the specified direction data represents the direction and the amount of tilt (or slide) of the movable member, for example. Specifically, the amounts of tilt in directions of two axes, i.e., the vertical direction and the horizontal direction, are detected and output. These values of the 2-axis components can be each regarded as a two-dimensional vector representing a direction and an amount. In the present embodiment, the specified direction data further represents whether the movable member has been depressed.

The group of buttons 14 (the buttons 14A to 14I) described above is connected to the input/output control unit 21. The group of buttons 14 outputs button data representing the input status of the buttons 14A to 14I to the input/output control unit 21. The button data represents, for example, whether the buttons 14A to 14I have been depressed, for each button. Note that some of the group of buttons 14 (e.g., the first L button 14F and the first R button 14G) may be buttons of which the amount of depression can be detected. Then, the button data represents the amount of depression, in addition to whether the button has been depressed, for those buttons of which the amount of depression can be detected.

The controller device 2 includes the acceleration sensor 23 as an example of the operation unit. The acceleration sensor 23 is connected to the input/output control unit 21. The acceleration sensor 23 is provided inside the housing 10 and detects the magnitude of the linear acceleration along one or more predetermined axes. Specifically, the acceleration sensor 23 detects the magnitude of linear acceleration along each axis, where the long-side direction of the housing 10 is defined as the x axis, the short-side direction of the housing 10 as the y axis, and the direction perpendicular to the surface of the housing 10 as the y axis. Acceleration data representing the detected acceleration is output to the input/output control unit 21. Control instructions for the acceleration sensor 23 are output from the input/output control unit 21 to the acceleration sensor 23. While the acceleration sensor 23 is a capacitive MEMS acceleration sensor, for example, acceleration sensors of other types may be used. While the acceleration sensor 23 has been described as being capable of detecting acceleration in three axis directions, it may be any acceleration sensor capable of detecting acceleration along one or more axis, e.g., two axes.

The controller device 2 includes a gyrosensor 24 as an example of the operation unit. The gyrosensor 24 is connected to the input/output control unit 21. The gyrosensor 24 is provided inside the housing 10 and detects the angular velocity about one or more predetermined axis. In the present embodiment, the detection axes of the gyrosensor 24 are the same as those of the acceleration sensor 23, i.e., the x axis, the y axis and the z axis as described above. Angular velocity data representing the detected angular velocity is output to the input/output control unit 21. Control instructions for the gyrosensor 24 are output from the input/output control unit 21 to the gyrosensor 24. While the gyrosensor 24 has been described above as being capable of detecting angular velocity about three axes, it may be any gyrosensor capable of detecting angular velocity about one or more axis, e.g., two axes.

The controller device 2 includes a magnetic sensor 25 as an example of the operation unit. The magnetic sensor 25 is connected to the input/output control unit 21. The magnetic sensor 25 detects the magnetic direction (azimuthal direction) by sensing the size and direction of the magnetic field. Magnetic data representing the detected magnetic direction is output to the input/output control unit 21. Control instructions for the magnetic sensor 25 are output from the input/output control unit 21 to the magnetic sensor 25. For the magnetic sensor 25, while there are sensors using an MI (magnetic impedance) element, a flux gate sensor, a Hall element, a GMR (giant magneto-resistive) element, a TMR (tunnel magneto-resistance) element, an AMR (anisotropic magneto-resistive) element, etc., the magnetic sensor 25 may be any magnetic sensor capable of detecting the magnetic direction. Note that strictly speaking, in a place where there is a magnetic field other than the geomagnetic field, the obtained magnetic data does not represent the azimuthal direction in a strict sense (the azimuthal direction with respect to the geomagnetic field). However, even in such a case, when the attitude of the controller device 2 changes, the magnetic data changes, and it is therefore possible to calculate the change in the attitude of the controller device 2. Therefore, the magnetic sensor 25 may be any magnetic sensor capable of detecting the direction based on magnetism, but is not limited to those capable of detecting the azimuthal direction in a strict sense. While the magnetic sensor 25 is described herein as being capable of detecting the magnetic direction in three-dimensional values, the magnetic sensor 25 may be any magnetic sensor capable of detecting the magnetic direction in one or more dimension.

As described above, the controller device 2 includes the acceleration sensor 23, the gyrosensor 24 and the magnetic sensor 25 as sensors for detecting at least one of the position, the attitude and the movement of the controller device 2. Note however that the controller device 2 may be configured to include only one or two of these sensors. The controller device 2 may be configured to include another sensor instead of, or in addition to, these sensors.

The input/output control unit 21 receives data output from the operation units, and generates operation data including these data. That is, the input/output control unit 21 is a generating unit for generating operation data based on an operation performed on the controller device 2. The input/output control unit 21 is connected to a communication data management unit 27. The input/output control unit 21 outputs the generated operation data to the communication data management unit 27. Note that the input/output control unit 21 generates and outputs the operation data with a frequency of once per a predetermined period of time (time T4 to be described later).

The connector 26 described above is connected to the input/output control unit 21. Where another device is connected to the controller device 2 via the connector 26, the input/output control unit 21 may receive data representing an operation performed on the other device and output the data to the communication data management unit 27.

The controller device 2 includes a power supply IC 38. The power supply IC 38 is connected to the input/output control unit 21. The power supply IC 38 controls the power supply from an internal battery to the various units in the controller device 2. A charger capable of obtaining power from an external power supply can be connected to the power supply IC 38 via a charging connector. The controller device 2 can receive power supply or be charged from the external power supply using the charger or a cable. Note that the controller device 2 may be charged by attaching the controller device 2 to a cradle (not shown) having a charging function.

As shown in FIG. 4, the controller device 2 includes the communication data management unit 27. The communication data management unit 27 executes various processes regarding communication with the information processing device 3. The communication data management unit 27 includes a CPU 28 and a memory 29. The communication data management unit 27 is, for example, an LSI (also called a codec LSI) capable of executing the process of compressing/expanding data to be described later. The controller device 2 includes a flash memory 35, and the flash memory 35 is connected to the communication data management unit 27. In the present embodiment, the flash memory 35 stores various programs executed in the controller device 2. In the present embodiment, a program for the management and/or the communication of the device itself (the controller device 2), the second program described above, etc., are stored in the flash memory 35 as the various programs. The CPU 28 executes various processes described above by executing the program stored in the flash memory 35. The memory 29 is used as a storage area when the various processes are executed. A portion of the area of the memory 29 may be used as a memory for the image displayed on the display unit 11 (a so-called VRAM). When the power of the controller device 2 is turned ON, a boot program stored in the flash memory 35 is loaded onto the memory 29 and executed by the CPU 28, thus starting up the controller device 2.

The communication data management unit 27 performs various processes on data to be transmitted to the information processing device 3. That is, the communication data management unit 27 receives data from a component connected to the communication data management unit 27 and performs a predetermined process (e.g., the compression process to be described later) as necessary to generate data to be transmitted to the information processing device 3. The communication data management unit 27 performs various processes on the data received from the information processing device 3. That is, the communication data management unit 27 executes a predetermined process (e.g., the expansion process to be described later) on the data received from the information processing device 3 as necessary, and outputs the processed data to the component connected to the communication data management unit 27. Note that the details of the process executed by the communication data management unit 27 will be described later. The components connected to the communication data management unit 27 will now be described.

The display unit 11 described above is connected to the communication data management unit 27. The display unit 11 receives, from the communication data management unit 27, output image data transmitted from the information processing device 3, and displays an image represented by the output image data. Note that since the information processing device 3 transmits the output image data with a predetermined frequency, and the communication data management unit 27 outputs the output image data with a predetermined frequency, the display unit 11 can display a movie.

The camera 16 described above is connected to the communication data management unit 27. The camera 16 captures an image, and outputs the captured image data to the communication data management unit 27. Hereinafter, data of an image captured by the camera 16 will be referred to as "camera image data". The communication data management unit 27 outputs control instructions for the camera 16, e.g., an image capturing instruction, to the camera 16. Note that the camera 16 can also capture a movie. That is, the camera 16 can repeatedly capture images and repeatedly output the camera image data to the communication data management unit 27.

The controller device 2 includes a sound IC 30. The sound IC 30 is connected to the communication data management unit 27. The sound IC 30 is connected to the speaker 31 and the microphone 32. The sound IC 30 controls the input/output of sound data to/from the speaker 31 and the microphone 32. That is, when sound data (output sound data) is received from the communication data management unit 27, the sound IC 30 performs D/A conversion on the sound data and outputs the obtained sound signal to the speaker 31. Thus, sound is generated from the speaker 31. The microphone 32 senses a sound propagated to the controller device 2 (the voice of the user, etc.), and outputs a sound signal representing the sensed sound to the sound IC 30. The sound IC 30 outputs, to the communication data management unit 27, the sound data (microphone sound data) obtained by performing A/D conversion on the sound signal from the microphone 32.

The controller device 2 includes a wireless module 33 and an antenna 34. The wireless module 33 is connected to the communication data management unit 27. The antenna 34 is connected to the wireless module 33. The wireless module 33 wirelessly communicates with the information processing device 3 using the antenna 34. The wireless module 33 is, for example, a Wi-Fi certified communication module. The wireless module 33 may perform a high-speed wireless communication with the information processing device 3 using a MIMO (Multiple Input Multiple Output) technology employed in the IEEE802.11n standard, for example, or may perform a wireless communication with the information processing device 3 using other communication schemes.

When data is transmitted from the controller device 2 to the information processing device 3, the communication data management unit 27 outputs, to the wireless module 33, data to be transmitted to the information processing device 3. The wireless module 33 wirelessly transmits data to be transmitted to the information processing device 3 via the antenna 34.

Where data from the information processing device 3 is received by the controller device, the wireless module 33 receives data from the information processing device 3 using the antenna 34, and outputs the received data to the communication data management unit 27. The communication data management unit 27 outputs the received data to an appropriate component, to which the data should be sent.

Note that depending on the type of the data, data may be compressed on the transmitting device before being transmitted and the received data may be expanded on the receiving device, for the communication between the controller device 2 and the information processing device 3, the details of which will be described below. The communication data management unit 27 executes the compression process described above, and the expansion process for the compression process which has been executed in the information processing device 3.

In the present embodiment, there is no limitation on the data to be transmitted after being compressed for the communication between the controller device 2 and the information processing device 3. In the present embodiment, data to be compressed on the transmitting side include the output image data and the output sound data transmitted from the information processing device 3, and the camera image data and the microphone sound data transmitted from the controller device 2. Note that in a variation of the present embodiment, only the output image data from the information processing device 3 may be compressed, or the output image data from the information processing device 3 and the camera image data from the controller device 2 may be compressed. Data other than those mentioned above may be compressed, or all data may be transmitted uncompressed.

The method of compression and expansion used in the controller device 2 and the information processing device 3 may be any method. In the present embodiment, the devices (the controller device 2 and the information processing device 3) compress data using a high-efficiency compression technique such as the H.264 standard, for example. Therefore, according to the present embodiment, the image and/or sound generated on the transmitting side can be transmitted at a high speed to the receiving side, and it is therefore possible to reduce the delay which may occur on the receiving side.

As shown in FIG. 4, the controller device 2 includes the infrared communication unit 36. The infrared communication unit 36 performs an infrared communication with an external device other than the information processing device 3. In the present embodiment, the infrared communication unit 36 has a function of performing an infrared communication in accordance with the IrDA standard, for example. The infrared communication unit 36 is connected to the communication data management unit 27. Where data is transmitted from the controller device 2 to an external device via infrared communication, the communication data management unit 27 outputs, to the infrared communication unit 36, data to be transmitted to the external device. The infrared communication unit 36 outputs an infrared light signal representing the data to be transmitted. Where data from the external device is received by the controller device 2, the infrared communication unit 36 receives the infrared light signal from the external device, and outputs the data of the received infrared light signal to the communication data management unit 27. The communication data management unit 27 controls the infrared communication using the infrared communication unit 36, the details of which will be described below (see "<5-4: Operation where communication is performed with external device>").

The controller device 2 includes the near field communication unit 37. The near field communication unit 37 performs a communication (noncontact communication) in accordance with the NFC (Near Field Communication) standard with an external device other than the information processing device 3. The near field communication unit 37 is connected to the communication data management unit 27. Where data is transmitted from the controller device 2 to an external device via near field communication, the communication data management unit 27 outputs, to the near field communication unit 37, the data to be transmitted to the external device. The near field communication unit 37 outputs a wireless signal representing the data to be transmitted. Where data from the external device is received by the controller device 2, the near field communication unit 37 receives the wireless signal from the external device, and outputs the data of the received wireless signal to the communication data management unit 27. The communication data management unit 27 controls communication using the near field communication unit 37, the details of which will be described below (see "<5-4: Operation where communication is performed with external device>").

Where a communication is performed with an external device using the infrared communication unit 36 and/or the near field communication unit 37 described above, data may be transmitted from the external device to the information processing device 3 via the controller device 2. In this case, data may be transmitted from the information processing device 3 to the external device via the controller device 2.

As described above, in the present embodiment, the controller device 2 includes the infrared communication unit 36 and the near field communication unit 37 described above as examples of extension communication units for performing a communication (extension communication) with another external device different from the information processing device 3. Note that the extension communication unit of the controller device 2 may be any extension communication unit having a function of communicating with the external device. For example, the controller device 2 may include only one of the components (the infrared communication unit 36 and the near field communication unit 37) described above, or may include a communication mechanism different from the components.

The controller device 2 includes the infrared light emitting unit 38. The infrared light emitting unit 38 outputs infrared light signals for controlling the display device 4. The infrared light emitting unit 38 includes an infrared LED, for example. The communication data management unit 27 controls the output of the infrared light signal (emission of infrared light) by the infrared light emitting unit 38. Where a control signal (infrared light signal) is transmitted from the controller device 2 to the display device 4, the communication data management unit 27 outputs, to the infrared light emitting unit 38, the control signal to be transmitted to the display device 4. The infrared light emitting unit 38 outputs an infrared light signal representing the control signal received from the communication data management unit 27.

The marker unit 15 described above is connected to the communication data management unit 27. The emission of the infrared LED of the marker unit 15 is controlled by the control instruction of the communication data management unit 27. The control for the marker unit 15 may be simply to turn ON/OFF the power supply.

The controller device 2 includes a vibrator 39. The vibrator 39 is connected to the communication data management unit 27. The vibrator 39 may be any member capable of vibrating and is, for example, a vibration motor or a solenoid. The vibration of the vibrator 39 is controlled by the communication data management unit 27. The controller device 2 is vibrated by actuation of the vibrator 39, whereby the vibration is conveyed to the user's hand holding the controller device 2. The vibrator 39 can be used in a so-called vibration-feedback game, for example.

3. Configuration of Information Processing Device

Figure 5:
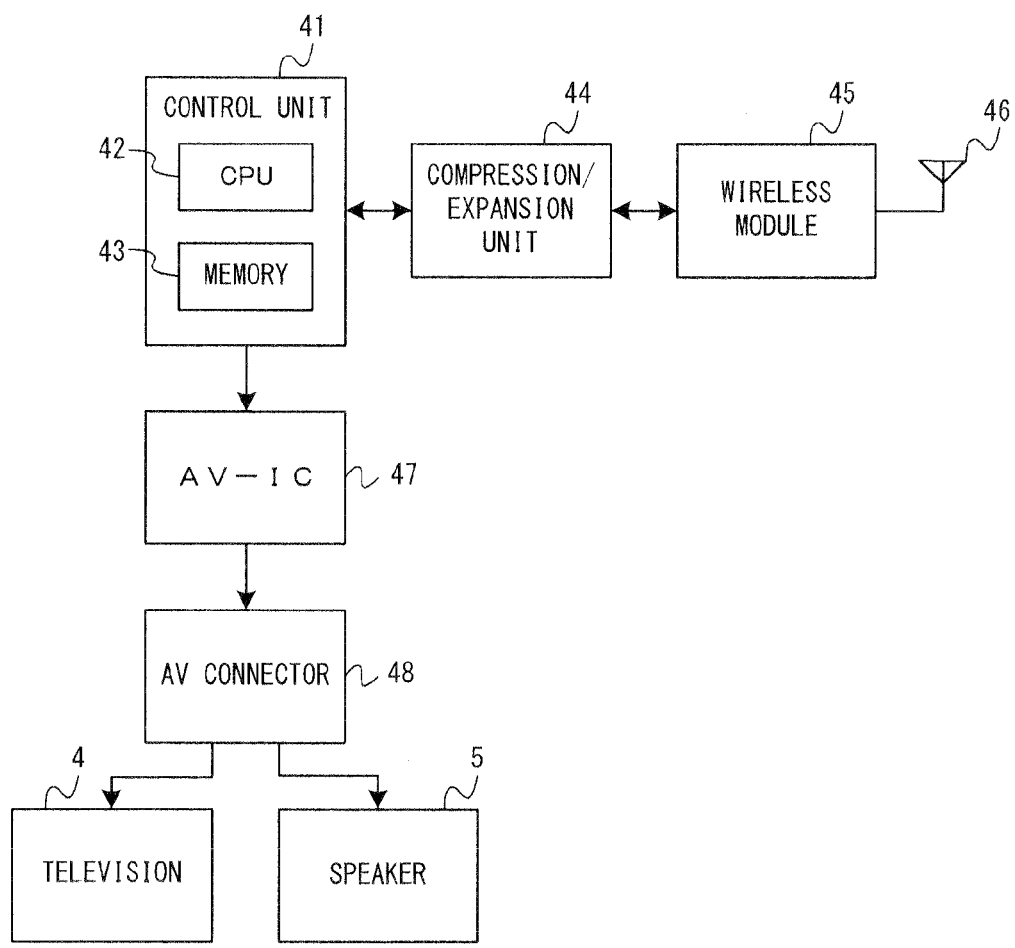
FIG. 5 A block diagram showing an internal configuration of an example information processing device.

Next, referring to FIG. 5, the configuration of the information processing device 3 will be described. FIG. 5 is a block diagram showing an internal configuration of the illustrative information processing device 3. In the present embodiment, the information processing device 3 includes various units shown in FIG. 5.

The information processing device 3 includes a control unit 41. The control unit 41 includes a CPU 42 and a memory 43. The control unit 41 is implemented in the information processing device 3 as a system LSI, for example. Note that in addition to the CPU 42 and the memory 43, the control unit 41 may include members such as a processor (GPU) for generating images, a memory (VRAM) for storing generated images, and/or a circuit for controlling the input/output of data to/from the control unit 41.

The control unit 41 generates output image data by executing a predetermined information process. Hereinafter, the predetermined information process executed by the control unit 41 may be referred to as the "first information process". Note that the information processing device 3 includes a program storing unit (not shown) for storing a program. The CPU 42 executes a program stored in the program storing unit. Thus, the first information process is executed in the information processing device 3. Hereinafter, the program for executing the first information process may be referred to as the "first program".

The first information process is a process of generating output image data and/or output sound data by using operation data as an input. There is no limitation on the specific content of the first information process. The first information process may be, for example, a game process for controlling the game object based on the operation data, or a browser process for displaying webpages based on operation data. That is, the first program may be, for example, a game program for executing a game process, or a browser program for executing a browser process.

The output image generated as the control unit 41 executes the first information process is displayed on the controller device 2. In the present embodiment, the image generated in the control unit 41 is displayed on the display device 4. Moreover, the output sound generated in the control unit 41 is output from the controller device 2. In the present embodiment, the sound generated in the control unit 41 is output from the speaker 5.

Next, a configuration for wirelessly transmitting the output image generated by the control unit 41 to the controller device 2 will be described. In the present embodiment, the information processing device 3 includes a compression/expansion unit 44. The compression/expansion unit 44 is, for example, an LSI (also called a codec LSI) capable of executing the process of compressing/expanding data. The compression/expansion unit 44 is connected to the control unit 41. Note that the connection between the control unit 41 and the compression/expansion unit 44 may be made in accordance with the USB (Universal Serial Bus) standard. The compression and expansion schemes used by the compression/expansion unit 44 are the same as those used by the communication data management unit 27 in the controller device 2.

The information processing device 3 includes a wireless module 45 and an antenna 46. The wireless module 45 is connected to the compression/expansion unit 44. The antenna 46 is connected to the wireless module 45. The wireless module 45 wirelessly communicates with the information processing device 3 using the antenna 46. The wireless module 45 is capable of wirelessly communicating with the wireless module 33 of the controller device 2. Typically, the wireless module 45 has the same function as the wireless module 33 of the controller device 2.

Where data is transmitted from the information processing device 3 to the controller device 2, the control unit 41 outputs, to the compression/expansion unit 44, the data to be transmitted. The compression/expansion unit 44 compresses the data to be transmitted the controller device 2 as necessary, and outputs the data to the wireless module 45. For example, the compression/expansion unit 44 compresses the output image data and the output sound data generated by the control unit 41, and outputs the compressed data to the wireless module 45. The compression/expansion unit 44 outputs some of the data sent from the control unit 41 that are not to be compressed to the wireless module 45 as they are. The wireless module 45 wirelessly transmits the data output from the compression/expansion unit 44 to the controller device 2 via the antenna 46.

Where data from the controller device 2 is received by the information processing device 3, the wireless module 45 receives the data from the controller device 2 using the antenna 46, and outputs the received data to the compression/expansion unit 44. Where compressed data is received from the controller device 2, the compression/expansion unit 44 expands the compressed data. For example, the compression/expansion unit 44 expands the camera image data and the microphone sound data, which are compressed and transmitted by the controller device 2. The compression/expansion unit 44 outputs the expanded data to the control unit 41. Note that when the data received from the controller device 2 is not compressed, the compression/expansion unit 44 outputs the data as it is to the control unit 41.

Next, a configuration for transmitting an image generated by the control unit 41 to the display device 4 will be described. In the present embodiment, the information processing device 3 includes an AV-IC (Integrated Circuit) 47 and an AV connector 48. Of the images and sounds generated by the control unit 41, data of those images and sounds that are output from the display device 4 are read out by the AV-IC 47. The AV-IC 47 outputs the read-out image data to the display device 4 via the AV connector 48. The AV-IC 47 outputs the read-out sound data to the speaker 5 built in the display device 4. Thus, images are displayed on the display device 4, and sounds are output from the speaker 5. Note that the connection and communication between the information processing device 3 and the display device 4 may be done by any scheme. For example, the information processing device 3 may transmit control signals for controlling the display device 4 to the display device 4 via wired or wireless connection. For example, an HDMI cable in compliance with the HDMI (High-Definition Multimedia Interface) standard may be used for the communication between the information processing device 3 and the display device 4. In the HDMI standard, it is possible to control a connection partner device by a function called CEC (Consumer Electronics Control).

In addition to the functions described above, the information processing device 3 may have the following functions, for example. That is, the information processing device 3 may be capable of connecting to a communication network (e.g., the Internet, etc.) outside the information processing system 1, and may have a function of communicating with another information processing device outside the information processing system 1 via the communication network. The information processing device 3 may have a function of communicating with another input device other than the controller device 2 via wired or wireless connection. The information processing device 3 may include an extension connector, and may allow an extension device (e.g., an external storage medium and a peripheral device, etc.) to be connected thereto via the extension connector.

Figures 6, 7:
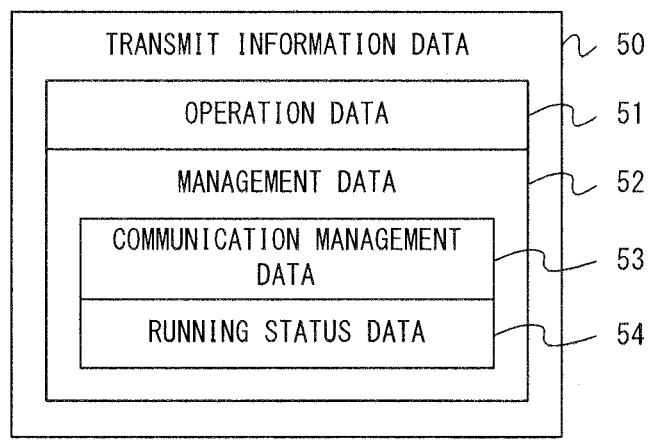
FIG. 6 A diagram showing data transmitted/received between the controller device and the information processing device.
FIG. 7 A diagram showing an example of data included in transmit information data.

4. Data Transmitted/Received Between Controller Device and Information Processing Device Next, referring to FIGS. 6 to 7, data transmitted/received between the controller device 2 and the information processing device 3 will be described. FIG. 6 is a diagram showing data transmitted/received between the controller device 2 and the information processing device 3.

Now, data (down stream) transmitted from the information processing device 3 to the controller device 2 will be described. The information processing device 3 transmits the output image data described above to the controller device 2. The controller device 2 receives the output image data. Therefore, the output image generated by the information processing device 3 can be displayed on the controller device 2. As described above, the information processing device 3 compresses the output image data and transmits the compressed output image data to the controller device 2. When the compressed output image data is transmitted from the information processing device 3, the controller device 2 (the wireless module 33) receives the compressed output image data. The communication data management unit 27 of the controller device 2 expands the received compressed output image data. The communication data management unit 27 outputs the expanded output image data to the display unit 11. Thus, the output image is displayed on the display unit 11.

The information processing device 3 transmits the output sound data described above to the controller device 2. The controller device 2 receives the output sound data. Thus, the output sound generated by the information processing device 3 can be output from the controller device 2. As described above, the information processing device 3 compresses and transmits the output sound data to the controller device 2. When the compressed output sound data is transmitted from the information processing device 3, the controller device 2 (the wireless module 33) receives the compressed output sound data. The communication data management unit 27 of the controller device 2 expands the received compressed output sound data. Then, the communication data management unit 27 outputs the expanded output sound data to the sound IC 30. Thus, the output sound is output from the speaker 31.

The information processing device 3 transmits first extension communication data to the controller device 2. The first extension communication data is data which is transmitted from the information processing device 3 to the controller device 2 in cases where the controller device 2 and an external device described above communicate with each other. For example, the information processing device 3 transmits, as the first extension communication data, data representing an instruction (command) for the controller device 2 or an external device, data to be transmitted to the external device, etc., to the controller device 2. The controller device 2 (the wireless module 33) receives the first extension communication data transmitted from the information processing device 3. The communication data management unit 27 executes a process in accordance with the instruction represented by the received first extension communication data, or transmits the received first extension communication data to the external device. Thus, with the first extension communication data, the information processing device 3 can communicate with the external device via the controller device 2. Note that an operation example of the communication for the first extension communication data will be described below (see "<5-4: Operation where communication is performed with external device>" to be described later).

The information processing device 3 transmits control data to the controller device 2. The control data is, for example, data used in a control regarding the communication between the controller device 2 and the information processing device 3. Note that there is no limitation on the specific content of the control data. For example, the control data may be data representing the content regarding the settings of the wireless communication.

Now, data (up stream) transmitted from the controller device 2 to the information processing device 3 will be described. The controller device 2 transmits transmit information data to the information processing device 3. The transmit information data is data representing information to be transmitted to the information processing device 3. FIG. 7 is a diagram showing an example of data included in the transmit information data. As shown in FIG. 7, transmit information data 50 includes operation data 51 described above, for example. Since the operation data 51 is included in the transmit information data 50, the information processing device 3 can recognize the content of the operation performed on the controller device 2. The details of the operation data 51 will be described later (see "[6. Generation of operation data]" to be described below).

The transmit information data 50 includes management data 52. The management data 52 represents the status regarding the controller device 2. Since the management data 52 is included in the transmit information data 50, the information processing device 3 can recognize the state of the controller device 2. The management data 52 is information that should be managed in the information processing device 3. In the present embodiment, the management data 52 includes communication management data 53. The communication management data 53 represents the status regarding the communication between the controller device 2 and the external device described above. The management data 52 includes running status data 54. The running status data 54 represents the running status of the second program described above. Note that the details of the communication management data 53 and the running status data 54 will be described later.

As described above, the management data 52 may be data representing the status of the controller device 2, may be data representing the status regarding the communication between the controller device 2 and an external device, or may be data representing the status of an external device capable of communicating with the controller device 2. Note that there is no limitation on the specific content of the management data 52. For example, the management data 52 may include only one of, or neither of, the communication management data 53 and the running status data 54. For example, the management data 52 may include data other than the communication management data 53 and the running status data 54.

The transmit information data 50 is generated in the controller device 2 by the following method, for example. As described above, the operation data 51 is generated by the input/output control unit 21 and output to the communication data management unit 27. The communication data management unit 27 adds the management data 52 to the operation data 51. That is, the communication data management unit 27 generates the transmit information data 50 which includes the operation data 51 and the management data 52. The communication data management unit 27 outputs the transmit information data 50 to the wireless module 33. Thus, the transmit information data 50 is transmitted to the information processing device 3. Note that the communication data management unit 27 generates and outputs the transmit information data 50 with a frequency of once per a predetermined period of time (time T4 to be described later (see FIG. 8)).

As described above, in the present embodiment, the transmit information data 50 is transmitted from the controller device 2 to the information processing device 3. That is, the controller device 2 transmits the management data 52, together with the operation data 51, to the information processing device 3. In other words, the controller device 2 transmits the operation data 51 and the management data 52 with the same frequency. More specifically, the controller device 2 transmits the operation data 51 and the management data 52 with the same timing. Note that in a variation of the present embodiment, the controller device 2 may transmit the operation data 51 and the management data 52 separately from each other (with different timings), or may not transmit the management data 52.

The controller device 2 may transmit data other than those described above to the information processing device 3 while the other data are included in the transmit information data 50. For example, where a peripheral device is connected to the controller device 2 via the connector 26, the transmit information data 50 may include data obtained from the peripheral device (e.g., data representing an operation performed on the peripheral device). Then, the input/output control unit 21 receives data from the peripheral device via the connector 26, and outputs the data to the communication data management unit 27. The communication data management unit 27 generates the transmit information data 50 which includes the data obtained from the peripheral device. For example, the transmit information data 50 may include data regarding the sound outputting unit (such as an earphone) connected to the sound outputting terminal described above. For example, the transmit information data 50 may include data indicating whether the sound outputting unit has a sound input function (e.g., whether it is an earphone with a microphone function). For example, the transmit information data 50 may include data indicating whether the sound outputting unit has a button, or may include data representing the input status of the button (whether the button has been depressed). Note that these data may be included in the transmit information data 50 as the management data 52 described above.

Referring back to FIG. 6, the controller device 2 transmits the camera image data described above to the information processing device 3. Now, the controller device 2 compresses and transmits the camera image data to the information processing device 3. Specifically, the communication data management unit 27 compresses the camera image data obtained from the camera 16. The communication data management unit 27 outputs the compressed camera image data to the wireless module 33. The compressed camera image data is transmitted by the wireless module 33 to the information processing device 3. Thus, the information processing device 3 can receive the camera image data, and execute an information process using the camera image data.

The controller device 2 transmits the microphone sound data described above to the information processing device 3. Herein, the controller device 2 compresses and transmits the microphone sound data to the information processing device 3. Specifically, the communication data management unit 27 compresses the microphone sound data received from the microphone 32 via the sound IC 30. The communication data management unit 27 outputs the compressed microphone sound data to the wireless module 33. The compressed microphone sound data is transmitted by the wireless module 33 to the information processing device 3. Thus, the information processing device 3 can receive the microphone sound data, and execute an information process using the microphone sound data.

The controller device 2 transmits second extension communication data to the information processing device 3. The second extension communication data is data which is transmitted from the controller device 2 to the information processing device 3 in cases where the controller device 2 and an external device described above communicate with each other. For example, where the information processing device 3 transmits/receives data with an external device via the controller device 2, the controller device 2 receives the data to be transmitted the information processing device 3 from the external device. The communication data management unit 27 transmits the data received from the external device to the information processing device 3 as the second extension communication data, for example. Thus, with the second extension communication data, the information processing device 3 can obtain data transmitted from the external device via the controller device 2. Note that an operation example of the communication for the second extension communication data will be described below (see "<5-4: Operation where communication is performed with external device>" to be described later).

Note that of the data shown in FIG. 6, the extension communication data (the first extension communication data and the second extension communication data) are transmitted non-periodically, the details of which will be described below. That is, when extension communication data that should be transmitted is generated in the information processing device 3 or the controller device 2, it transmits the extension communication data to the other. Thus, where there is no information to be transmitted as the extension communication data, there is no unnecessary data transmission between the controller device 2 and the information processing device 3, thereby realizing efficient communication. On the other hand, of the data shown in FIG. 6, data other than the extension communication data can be transmitted periodically (in other words, repeatedly at a rate of once per a predetermined period of time). Thus, the other data can be periodically received on the receiving side without communication interruption. Note that the other data do not need to be always transmitted periodically, and the controller device 2 may be capable of, for example, operating both in a mode in which some of the other data (e.g., the camera image data and the microphone sound data) are transmitted and in a mode in which they are not transmitted.

In the present embodiment, the data shown in FIG. 6 are transmitted/received between the controller device 2 and the information processing device 3. Note however that all of the data described above do not need to be transmitted, and some of these data do not have to be transmitted. For example, the information processing device 3 may operate in a mode in which the output sound data is not transmitted, and may not have the function of transmitting the output sound data. For example, the controller device 2 may operate in a mode in which the camera image data and/or the microphone sound data are not transmitted, and may not have the function of transmitting the camera image data and/or the microphone sound data (then, the controller device 2 does not need to include the camera 16 and/or the microphone 32). For example, the extension communication data is transmitted/received only when the controller device 2 and external device communicate with each other, and does not need to be transmitted/received when the controller device 2 and external device do not communicate with each other (when there is no external device capable of communicating with the controller device 2). The controller device 2 does not need to have the function of communicating with an external device, and may not have the function of transmitting/receiving the extension communication data.

(Priority of Communication)

As shown in FIG. 6, the priority of communication is set for the various data transmitted/received between the controller device 2 and the information processing device 3. The priority represents the order of priority in which a plurality of data are transmitted in a case where the controller device 2 and the information processing device 3 (the wireless modules 33 and 45) are capable of transmitting a plurality of data. In other words, the priority represents the order in which the data are transmitted preferentially over the other in such a case. With Wi-Fi certified communication modules, for example, such priorities can be set.

In the present embodiment, the priorities for the data are set as follows.

Priority 1: Output image data and output sound data
Priority 2: Transmit information data
Priority 3: Camera image data and microphone sound data
Priority 4: Control data
Priority 5: First extension communication data
Priority 6: Second extension communication data As described above, the output image data and the output sound data are transmitted most preferentially. The transmit information data is transmitted more preferentially than other data except for the output image data and output sound data. Thus, the output image data, the output sound data and the transmit information data are transmitted more preferentially than the other data. Then, it is possible to reduce the possibility that the function of outputting the output image (and the output sound) from the information processing device 3 and the function of transmitting the content of operation to the information processing device 3, which are basic functions of the information processing device 3, are lowered due to deterioration of the communication status, etc.

The extension communication data have lower priorities than the other data. Thus, even if a communication is performed between the controller device 2 and an external device, the transmission of the other data will not be delayed for the transmission of the extension communication data, and it is therefore possible to stably transmit the other data.

Note that the priority setting shown in FIG. 6 is illustrative, and there is no limitation on the priority set for each data. No priority may be set (the same priority is set) for these data.

5. Communication Operation Between Controller Device and Information Processing Device Next, referring to FIGS. 8 to 12, the communication operation between the controller device 2 and the information processing device 3 will be described. Now, first referring to FIGS. 8 and 9, the basic operation of communication between the controller device 2 and the information processing device 3 (the operation where there is no external device) will be described. Thereafter, referring to FIGS. 10 to 12, the operation where the controller device 2 and an external device communicate with each other will be described.

In the present embodiment, the information processing system 1 is capable of accommodating up to two controller devices 2. That is, the information processing system 1 is capable of operating both in a first communication mode in which the information processing device communicates with one controller device 2, and in a second communication mode in which the information processing device communicates with two controller devices 2.

<5-1: Communication Between Controller Device and Information Processing Device (First Communication Mode)>

Figure 8:
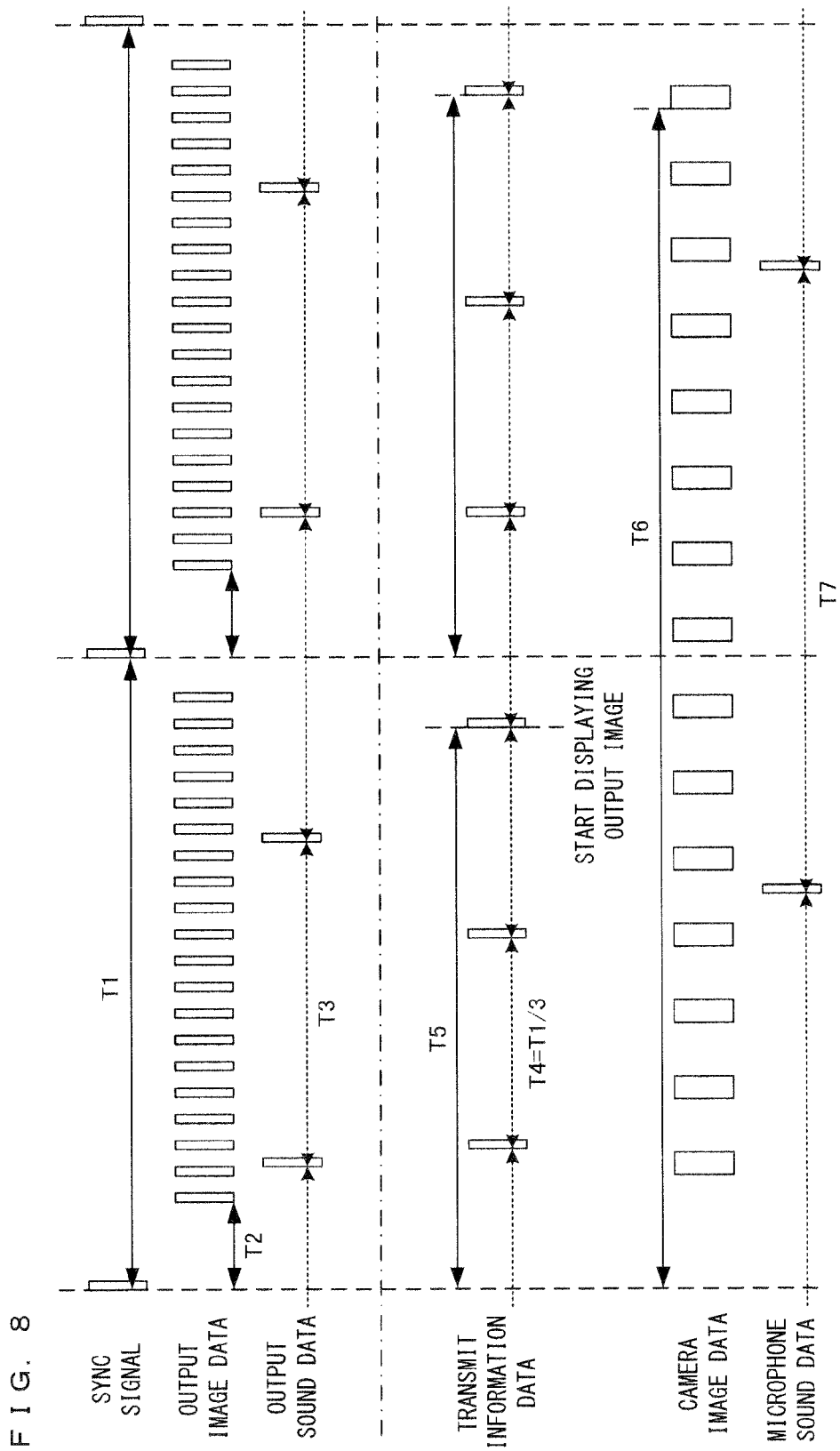
FIG. 8 A diagram showing a timing for transmitting data transmitted/received between the controller device and the information processing device in a first communication mode.

First, communication in the first communication mode will be described. FIG. 8 is a diagram showing a timing for transmitting data transmitted/received between the controller device 2 and the information processing device 3 in the first communication mode. Note that in FIG. 8, each rectangular block represents a unit of data transmission (one packet) (this also applies to FIG. 9).

(Sync Signal)

In FIG. 8, data (down stream) transmitted from the information processing device 3 to the controller device 2 are shown above the one-dot-chain line. The information processing device 3 transmits a sync signal to the controller device 2. The sync signal is a signal for realizing synchronization between the information processing device 3 and the controller device 2 for some processes. That is, with the sync signal, the process timing can be aligned between the information processing device 3 and the controller device 2. The information processing device 3 transmits the sync signal at an interval of a predetermined period of time T1. The controller device 2 receives the sync signal at the interval of time T1. The output image data is transmitted in synchronism with the sync signal, and the update interval for the image represented by the output image data is time T1, the details of which will be described below. That is, it can be said that time T1 is one-frame period. Time T1 is set to 16.68 [msec], for example. Then, the transmission frequency of the sync signal, i.e., the update frequency for the image represented by the output image data (frame rate), is about 59.94 [fps] (generally referred to also as 60 [fps]).

(Output Image Data)

The information processing device 3 transmits output image data to the controller device 2. In the present embodiment, the information processing device 3 transmits one image's worth of (one screeds worth of) the output image data with a predetermined frequency. That is, the information processing device 3 transmits one image's worth of output image data within one-frame period. The controller device 2 receives one image's worth of output image data with the predetermined frequency. As a result, the display unit 11 updates and displays the image at a rate of once per one-frame period. The information processing device 3 transmits output image data divided into a plurality (20 in the figure) of packets. In the present embodiment, the method of compression and transmission of the output image data may be any method. For example, the compression/expansion unit 44 may divide one image's worth of an image into a plurality of areas, and compress the image for each of the divided areas. Then, the wireless module 45 transmits compressed data of each area over a plurality of packets. The packets are transmitted at an interval of a predetermined period of time (e.g., 569 [µsec]).

Note that the information processing device 3 (e.g., the compression/expansion unit 44) may change the number of divisions depending on the communication status and/or on the amount of data transmitted/received between the controller device 2 and the information processing device 3. For example, consider a case where the information processing system 1 is capable of operating both in a first mode in which some of the various data that can be transmitted between the controller device 2 and the information processing device 3 are not transmitted (e.g., a mode in which the controller device 2 does not transmit the microphone sound data and the camera image data), and in a second mode in which all of the various data are transmitted. In this case, the number of divisions may be set to be relatively large in the first mode, and relatively small in the second mode.

The output image data is transmitted in synchronism with the sync signal. The information processing device 3 transmits the output image data with a timing that is determined based on the sync signal. Specifically, the information processing device 3 transmits the output image data (the first packet of the output image data) upon passage of a predetermined period of time T2 since the transmission of the sync signal. Time T2 is set to 3401 [µsec], for example.

(Output Sound Data)

The information processing device 3 transmits the output sound data to the controller device 2. The output sound data is transmitted asynchronously with the sync signal (in other words, the output image data). In other words, the information processing device 3 transmits the output sound data with a timing independent of the sync signal. The controller device 2 receives the output sound data from the information processing device 3 with a timing independent of the sync signal. The information processing device 3 transmits one packet of the output sound data at an interval of a predetermined period of time T3. Time T3 is set to 8.83 [msec], for example. Then, one packet of the output sound data is transmitted twice or once in one-frame period.

(Transmit Information Data)

In FIG. 8, data (up stream) transmitted from the controller device 2 to the information processing device 3 are shown below the one-dot-chain line. The controller device 2 transmits the transmit information data to the information processing device 3. In the present embodiment, the controller device 2 transmits the transmit information data with a predetermined frequency. That is, the controller device 2 transmits the transmit information data at an interval of a predetermined period of time T4. The information processing device 3 receives the transmit information data from the controller device 2 with the predetermined frequency. Time T4 is set to 1/m (m is an integer greater than or equal to 1) of the sync signal transmission interval T1, for example. Specifically, time T4 is set to 5.56 (=T1/3) [msec], for example. Then, the transmit information data will be transmitted with a frequency that is m times the frequency with which one image's worth of output image data is transmitted.

The transmit information data is transmitted in synchronism with the sync signal. That is, the controller device 2 transmits the transmit information data with a timing that is determined based on the sync signal. Specifically, the controller device 2 starts the process of transmitting the transmit information data at a point in time upon passage of a predetermined period of time T5 since the transmission of the sync signal. Time T5 is set to 16 [msec], for example. Note that where the amount of time from the transmission to the reception of the sync signal is sufficiently short, the controller device 2 may regard the point in time at which the sync signal is received as being "the point in time at which the sync signal is transmitted". The controller device 2 may transmit the transmit information data upon passage of a predetermined period of time since the point in time at which the sync signal is received.

Note that in the present embodiment, the controller device 2 performs a predetermined operation in the controller device 2 while realizing synchronization with a timing that is determined based on the sync signal. For example, the controller device 2 starts the process of displaying (rendering) the image of the output image data at a point in time upon passage of a predetermined period of time T5 since the transmission of the sync signal. Time T5 is set to 16 [msec], for example. In this case, although the rendering process is started before all the output image data are received, since the image is divided into areas as described above, the controller device 2 can start the rendering process on areas of the image that have been received and decoded. The reception and decoding of all of the output image data are completed before the last area is rendered, at the latest. A rendering process is completed before a point in time when a rendering process is started in the next frame period following a frame period (a period from when the first sync signal is sent until the next first sync signal is sent) in which the rendering process has been started. Therefore, the amount of time required before the output image is displayed on the controller device 2 since the transmission of the sync signal is within T1+T5, and it is shorter than two frames' worth of time. Therefore, in the present embodiment, it is possible to realize very fast rendering on the controller device 2 even though the image is transmitted from the information processing device 3 to the controller device 2 via wireless connection.

(Camera Image Data)

The controller device 2 transmits the camera image data to the information processing device 3. The controller device 2 transmits one image's worth of camera image data with a predetermined frequency. The information processing device 3 receives one image's worth of camera image data from the controller device 2 with the predetermined frequency. For example, as shown in FIG. 8, the controller device 2 transmits one image's worth of camera image data over two-frame period (at a rate of once per two-frame period). That is, the transmission frequency of one image's worth of camera image data is ½ with respect to that of one image's worth of output image data.

The method of compression and transmission of the camera image data may be any method. For example, the communication data management unit 27 may perform the compression process on one image's worth of camera image data. The wireless module 33 may transmit the compressed camera image data over a plurality (15 in FIG. 8) packets. Note that the controller device 2 (e.g., the communication data management unit 27) may change the rate of compression (in other words, the number of packets) depending on the communication status and/or on the amount of data transmitted/received between the controller device 2 and the information processing device 3. For example, the rate of compression may be set to be relatively low in the first mode, and relatively high in the second mode.

The camera image data is transmitted in synchronism with the sync signal (in other words, the transmit information data). That is, the controller device 2 transmits the camera image data with a timing that is determined based on the sync signal. In the present embodiment, the controller device 2 transmits the last packet of one image's worth of camera image data in synchronism with the sync signal, and transmits each packet other than the last packet as soon as it is ready for transmission (i.e., as soon as the compression thereof is completed). Specifically, the controller device 2 transmits the last packet at a point in time upon passage of a predetermined period of time T6 since the transmission of the sync signal. In the present embodiment, time T6 is set to be a period of time shorter than two-frame period (T1×2). Thus, it is possible to transmit one image's worth of camera image data at a rate of once per two-frame period as described above. Note that in a variation of the present embodiment, the controller device 2 may transmit each packet of one image's worth of camera image data in synchronism with the sync signal, or may transmit the camera image data asynchronously with the sync signal.

(Microphone Sound Data)

The controller device 2 transmits the microphone sound data to the information processing device 3. The microphone sound data is transmitted asynchronously with the sync signal (in other words, the transmit information data). In other words, the controller device 2 transmits the microphone sound data with a timing independent of the sync signal. The controller device 2 transmits one packet of the microphone sound data with a predetermined frequency. That is, the controller device 2 transmits one packet of the microphone sound data at an interval of a predetermined period of time T7. The information processing device 3 receives the microphone sound data (one packet of the microphone sound data) from the controller device 2 with the predetermined frequency. Time T7 is set to 16 [msec], for example.

Note that for data (e.g., the microphone sound data) that is not synchronized with the sync signal, the controller device 2 does not need to strictly manage the transmission timing of the packets. That is, for data that is not synchronized with the sync signal, the wireless module 33 may successively transmit packets of the data in response to achieving the state where the packets are ready for transmission.

<5-2: Operation in Second Communication Mode>

Figure 9:
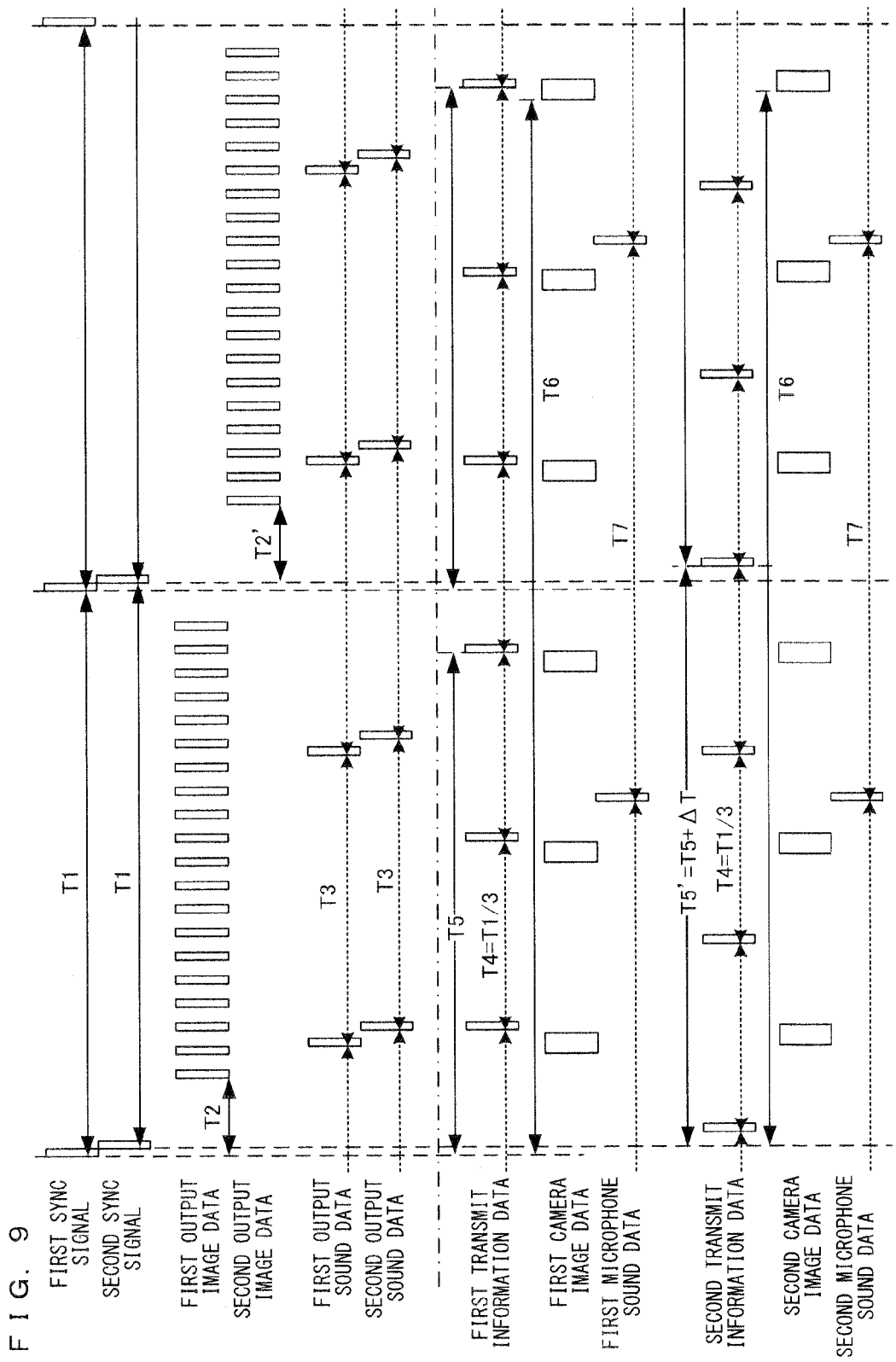
FIG. 9 A diagram showing a timing for transmitting data transmitted/received between the controller device and the information processing device in a second communication mode.

Next, communication in the second communication mode will be described. FIG. 9 is a diagram showing a timing for transmitting data transmitted/received between the controller device 2 and the information processing device 3 in the second communication mode.

Now, in the information processing system 1, a connection setting (also called pairing) process is executed between the information processing device 3 and the controller device 2 before performing a communication between the information processing device 3 and the controller device 2. In the connection setting process, operations are performed, such as exchanging identification information between the information processing device 3 and the controller device 2. If one controller device 2 is recognized in the connection setting process, the controller device 2 and the information processing device 3 operate in the first communication mode described above. On the other hand, if two controller devices 2 are recognized in the connection setting process, the controller device 2 and the information processing device 3 operate in the second communication mode. In this case, one of the two controller devices 2 is set as the first controller device, and the other as the second controller device. There are differences in the communication-related process between the first controller device and the second controller device, the details of which will be described below. Now, the details of the communication in the second communication mode will be described.

(Sync Signal)

In FIG. 9, data (down stream) transmitted from the information processing device 3 to the controller device 2 are shown above the one-dot-chain line. In the second communication mode, the information processing device 3 transmits the first sync signal to the first controller device, and transmits the second sync signal to the second controller device. The process of transmitting the first sync signal is similar to the process of transmitting the sync signal in the first communication mode described above. On the other hand, the information processing device 3 transmits the second sync signal to the second controller device, following the transmission of the first sync signal. Note however that it is not always necessary that the first sync signal and the second sync signal are transmitted one after another, and it is not necessary that the second sync signal is transmitted immediately after the transmission of the first sync signal. The transmission interval of the second sync signal is equal to the transmission interval T1 of the first sync signal.

(Output Image Data)

The information processing device 3 transmits output image data to the two controller devices 2. That is, the first output image data is transmitted to the first controller device. The second output image data is transmitted to the second controller device. The first output image data is output image data representing an output image to be displayed on the first controller device. The second output image data is output image data representing an output image to be displayed on the second controller device. The first controller device receives the first output image data. The second controller device receives the second output image data.

The information processing device 3 transmits one image's worth of output image data in one-frame period. In the second communication mode, the information processing device 3 transmits the same number of output image data to the first controller device and to the second controller device. Specifically, in the present embodiment, the information processing device 3 transmits the output image data alternately to the first controller device and to the second controller device (see FIG.

9). As a more specific process, in a certain frame period (a period from when the first sync signal is sent until the next first sync signal is sent), the information processing device 3 transmits the first output image data to the first controller device. In this frame period, the second output image data is not transmitted to the second controller device. In the next frame period following the certain frame period described above, the information processing device 3 transmits the second output image data to the second controller device. In this next frame period, the first output image data is not transmitted to the first controller device. By repeatedly performing this process, the information processing device 3 alternately transmits output image data to the controller devices 2. From the above, it can be said that for one controller device 2, the information processing device 3 is capable of operating both in the first communication mode in which the output image data is transmitted with a predetermined frequency, and in the second communication mode in which the output image data is transmitted with a frequency that is half the predetermined frequency.

As described above, in the second communication mode, each controller device 2 receives one image's worth of output image data at a rate of once per two-frame period (T1×2). Therefore, the frame rate (updating frequency) of the output image on the controller device 2 is half the frame rate in the first communication mode. That is, the updating frequency (frame rate) of the image represented by the output image data is about 29.97 [fps] (generally referred to also as 30 [fps]).

The method of compression and transmission of the output image data in the second communication mode may be similar to that of the first communication mode described above. In the second communication mode (as in the first communication mode), the information processing device 3 (e.g., the compression/expansion unit 44) may change the number of divisions described above depending on the communication status and/or on the amount of data transmitted/received between the controller device 2 and the information processing device 3.

In the second communication mode (as in the first communication mode), the output image data is transmitted in synchronism with the sync signal. That is, the information processing device 3 transmits the first output image data with a timing that is determined based on the first sync signal, and transmits the second output image data with a timing that is determined based on the second sync signal. The transmission timing of the first output image data based on the first sync signal is similar to that in the first communication mode described above. Time T2 is set to 3401 [µsec], for example (as in the first communication mode). On the other hand, for the second output image data, the information processing device 3 transmits the second output image data (the first packet of the second output image data) upon passage of a predetermined period of time T2' since the transmission of the second sync signal. Time T2' is set to 2.184 [msec], for example, with respect to a second sync signal that is transmitted first in the frame period in which the second output image is transmitted. Note that the transmission timing of the second output image data may be set to 18.864 (=16.68 (one frame period)+2.184) [msec], for example, from a point in time at which a second sync signal is transmitted, wherein the second sync signal is transmitted in a frame period preceding the frame period in which the second output image is transmitted.

(Output Sound Data)

The information processing device 3 transmits output sound data to the two controller devices 2. That is, the first output sound data is transmitted to the first controller device. The second output sound data is transmitted to the second controller device. The first output sound data is output sound data representing an output sound to be output from the first controller device. The second output sound data is output sound data representing an output sound to be output from the second controller device. The first controller device receives the first output sound data. The second controller device receives the second output sound data.

In the second communication mode (as in the first communication mode), the output sound data is transmitted asynchronously with the sync signal (in other words, the output image data). That is, the information processing device 3 transmits the first output sound data with a timing independent of the first sync signal. The information processing device 3 transmits the second output sound data with a timing independent of the second sync signal. The information processing device 3 transmits one packet of the first output sound data at an interval of a predetermined period of time T3, and transmits one packet of the second output sound data at an interval of a predetermined period of time T3. As shown in FIG. 9, the information processing device 3 transmits the first output sound data and the second output sound data with staggered timing.

(Transmit Information Data)

In FIG. 9, data (up stream) transmitted from the controller devices 2 to the information processing device 3 are shown below the one-dot-chain line. The controller devices 2 transmit the first transmit information data and the second transmit information data to the information processing device 3. The first transmit information data is transmit information data transmitted from the first controller device. The second transmit information data is transmit information data transmitted from the second controller device. The process in which the first controller device transmits the first transmit information data is similar to the process in which the controller device 2 transmits the transmit information data in the first communication mode.

On the other hand, the transmission interval of the second transmit information data is equal to that of the first transmit information data. The second transmit information data is transmitted in synchronism with the second sync signal. That is, the second controller device transmits the second transmit information data at a timing that is determined based on the second sync signal. Specifically, the second controller device transmits the second transmit information data at a point in time upon passage of a predetermined period of time T5' since the transmission of the second sync signal. Time T5' is set so that the transmission timing of the second transmit information data is staggered from the transmission timing of the first transmit information data. That is, time T5' is set to time (T5+ΔT), which is staggered from time T5 by a predetermined period of time ΔT. Thus, it is possible to reduce the possibility that the first transmit information data and the second transmit information data collide with each other, and it is possible to more reliably perform a communication. Specifically, time T5' is set to 18.25 [msec] (ΔT=2.5 [msec]), for example.

Note that in the second communication mode (as in the first communication mode), where the amount of time from the transmission to the reception of the sync signal is sufficiently short, the controller device 2 may use the point in time at which the sync signal is received as being "the point in time at which the sync signal is transmitted". The controller device 2 may transmit the transmit information data upon passage of a predetermined period of time since the point in time at which the sync signal is received.

In the second communication mode (as in the first communication mode), each controller device 2 performs the predetermined operation described above in the controller device 2 while realizing synchronization with a timing that is determined based on the sync signal. Note that the second controller device performs the predetermined operation while realizing synchronization with respect to a point in time upon passage of a predetermined period of time T5 since the transmission of the second sync signal. That is, each controller device 2 starts the image display (rendering) process for the output image data at a point in time upon passage of a predetermined period of time T5 since the transmission of the sync signal. Also in the second communication mode, as in the first communication mode, the rendering process for one output image is completed before one-frame period (T1) elapses since the start of the rendering process. Note that in the second communication mode, as described above, one controller device 2 receives one image's worth of output image data at a rate of once per two-frame period. Therefore, in a frame period in which no output image data is transmitted thereto, each controller device 2 executes the image display process using again the output image data which has been used for display in the preceding frame period. That is, in a frame period in which no output image data is transmitted thereto, each controller device 2 performs the display process again using image data which has been stored in the frame buffer in the preceding frame period.

(Camera Image Data)

The controller devices 2 transmit the first camera image data and the second camera image data to the information processing device 3. The first camera image data is camera image data transmitted from the first controller device. The second camera image data is camera image data transmitted from the second controller device.

In second communication mode (as in the first communication mode), each controller device 2 transmits one image's worth of camera image data with a predetermined frequency (e.g., at a rate of once per two-frame period). Note that in the present embodiment, in the second communication mode, each controller device 2 compresses and transmits the camera image data with a rate of compression that is higher than that in the first communication mode. That is, each controller device 2 transmits camera image data using a smaller data size than that in the first communication mode. Therefore, the number of packets of the camera image data transmitted from one controller device in the second communication mode is smaller than that in the first communication mode (see FIGS. 8 and 9). Therefore, the transmission interval of packets of camera image data is greater than that in the first communication mode.

As described above, by decreasing the data size of the camera image data to be transmitted, it is possible to reduce the amount of communication between the controller devices 2 and the information processing device 3. Since there are two controller devices 2 in the second communication mode, there is a possibility that the amount of communication may be greater than that in the first communication mode. Therefore, it is advantageous to reduce the data size of the camera image data in the second communication mode.

The controller devices 2 transmit the camera image data in synchronism with the sync signal (in other words, the transmit information data) (as in the first communication mode). That is, each controller device 2 transmits the last packet of one image's worth of camera image data at a point in time upon passage of a predetermined period of time T6 since the transmission of the sync signal. Note that the predetermined period of time T6 may be set to be different between the controller devices 2 (in other words, so that the transmission timing of the last packet is staggered between the two controller devices). Then, it is possible to reduce the possibility that the last packets transmitted from the controller devices 2 collide with each other, and it is possible to more reliably perform a communication.

(Microphone Sound Data)

The controller devices 2 transmits the first microphone sound data and the second microphone sound data to the information processing device 3. The first microphone sound data is microphone sound data transmitted from the first controller device. The second microphone sound data is microphone sound data transmitted from the second controller device. The method by which the controller devices 2 transmit the microphone sound data in the second communication mode is similar to the method of transmitting the microphone sound data in the first communication mode.

Note that although the various times T1 to T7 in the second communication mode are assumed to be equal to the times T1 to T7 in the first communication mode in the above description, some or all of these times T1 to T7 may be set to different values between the two communication modes.

Note that the management of the timing with which data (packets) are transmitted shown in FIG. 8 or 9 can be used for any component. For example, the management described above may be used by the wireless module (the wireless module 33 in the controller device 2; the wireless module 45 in the information processing device 3). For the controller device 2, the management described above may be used by the communication data management unit 27, or for the information processing device 3, the management described above may be used by the control unit 41 or the compression/expansion unit 44.

Some of the data shown in FIGS. 8 and 9 do not always have to be transmitted/received between the controller device 2 and the information processing device 3. For example, the controller device 2 may transmit the camera image data and/or the microphone sound data to the information processing device 3 as necessary. That is, where an information process using the camera image data (and/or the microphone sound data) is executed in the information processing device 3, the controller device 2 may transmit the camera image data (and/or the microphone sound data). Note that while the camera image data and/or the microphone sound data are transmitted, these data are transmitted periodically (with a constant frequency).

Other than the data shown in FIGS. 8 and 9, the information processing device 3 transmits the control data described above to the controller device 2. Note that the control data may be transmitted by any method. For example, the control data may be transmitted with a constant frequency (e.g., with a frequency of once per one-frame period), or the transmission frequency of the control data may not be constant (i.e., the control data may not be transmitted periodically). The control data may be transmitted in synchronism with the sync signal described above, or may be transmitted asynchronously with the sync signal described above.

<5-3: Advantageous Effects Regarding 5-1, 5-2>

With the configuration and operation described above, the controller device 2 provides the following effects. Note that in order for the following effects to be realized, the controller device 2 may have configurations that are described below along with the effects thereof, and it is not needed to have all the configurations of the present embodiment.

In the first and second communication modes described above, the controller device 2 (more specifically, the input/output control unit 21) generates operation data based on an operation performed on the controller device 2. The controller device 2 (more specifically, the communication data management unit 27 and the wireless module 33) receives, from the information processing device 3, one image's worth of output image data with a first frequency (a frequency of once per time T1 in the example of the first communication mode, and a frequency of once per time (T1×2) in the example of the second communication mode), and transmits the operation data to the information processing device 3 with a second frequency (a frequency of once per time T4 (=T1/3) in the example above) higher than the first frequency. Then, since the operation data is transmitted with a frequency that is higher than the frequency with which the image displayed on the controller device 2 is updated, it is possible to convey the content of the operation performed on the controller device 2 to the information processing device 3 with a high frequency and to provide the controller device 2 with a good controllability. The controller device 2 can receive output image data from the information processing device 3 to display an image while ensuring an operation data transmission frequency such that a certain level of controllability can be provided.

Note that the effects described above can be realized even if some or all of the operation data are the same as the previously-transmitted operation data. For example, for some of the operation data, the controller device 2 may transmit the operation data while updating the content thereof at a rate of once per a plurality of transmissions of the operation data. That is, the content of predetermined data included in the operation data may be updated with a frequency that is lower than the frequency with which the operation data itself is transmitted. Note that the predetermined data may be, for example, data based on sensors whose detection frequency is lower than the frequency with which the operation data is transmitted.

Note that where it is not necessary to transmit the operation data with a frequency that is higher than the frequency with which the image displayed on the controller device 2 is updated, the second frequency does not always need to be set higher than the first frequency, and the second frequency may be set to be less than or equal to the first frequency.

In the first and second communication modes, the controller device 2 transmits the operation data with a frequency that is an integral multiple of (three times in the example of the first communication mode, and six times in the example of the second communication mode) the frequency with which the output image data is received. Then, the number of times the operation data is transmitted over one period of receiving the output image data is constant. In other words, the information processing device 3 can receive a constant number of operation data within one-frame period. Thus, it is possible to improve the controllability of the controller device 2. Note that in a variation of the present embodiment, the operation data transmission frequency does not need to be set to an integral multiple of the frequency with which the output image data is received.

In the first and second communication modes, the information processing device 3 transmits the sync signal to the controller device 2, and transmits the output image data with a timing determined based on the sync signal. Then, the controller device 2 transmits the operation data with the timing determined based on the sync signal transmitted from the information processing device 3. Thus, since it is possible to achieve synchronization between the image received by the controller device 2 and the operation data transmitted from the controller device 2, it is possible to more reliably transmit the operation data with an appropriate timing. Since the operation data transmission timing can be determined by the sync signal from the information processing device 3, it is possible to guarantee the delay time of the operation data. Note that in a variation of the present embodiment, the operation data may be transmitted not in synchronism with the sync signal and/or the output image data, i.e., with a timing independent of the sync signal and/or the output image data.

In the first and second communication modes, the controller device 2 may update and display the output image data with the timing determined based on the sync signal. The output image data is updated and displayed with the first frequency (the frequency with which the output image data is transmitted). Therefore, the controller device 2 updates and displays the output image data with the timing based on the sync signal and with the first frequency. Thus, it is possible to achieve synchronization between the image display timing on the controller device 2 and the operation data transmission timing, and it is possible to transmit the operation data with a more appropriate timing. Note that in a variation of the present embodiment, the output image may be displayed with a timing independent of the sync signal.

In the first and second communication modes, the controller device 2 displays the output image within one-frame period since the transmission of the sync signal. In other words, the controller device 2 starts rendering the output image data transmitted with the timing determined based on the sync signal within a shorter period of time (T5=16 [msec]) than the interval of the first frequency (T1=16.68 [msec]) since the reception of the sync signal. Then, the delay time before starting to render, on the controller device 2, the output image generated in the information processing device 3 can be set to be smaller than the one-frame period of the output image. Note that in a variation of the present embodiment, the display delay time may be set to be greater than or equal to the one-frame period of the output image.

In the first and second communication modes, the controller device 2 receives the output sound data from the information processing device 3 with a timing independent of the sync signal. Therefore, the controller device 2 can successively receive output sound data and successively output an output sound, irrespective of the reception status of the sync signal and/or the output image data. Note that in a variation of the present embodiment, the information processing device 3 may achieve synchronization between the transmission of the output sound data and the transmission of the sync signal.

In the first and second communication modes, the controller device 2 transmits microphone sound data to the information processing device 3 with a timing independent of the sync signal. Therefore, the controller device 2 can successively transmit microphone sound data, irrespective of the reception status of the sync signal. Note that in a variation of the present embodiment, the controller device 2 may transmit the microphone sound data with a timing based on the sync signal.

In the first communication mode, the controller device 2 transmits one image's worth of camera image data obtained by the camera 16 to the information processing device 3 with a frequency that is lower than the first frequency (with a frequency of once per two-frame period in the example above). Then, since the output image data is received with a frequency that is higher than the frequency with which the camera image data is transmitted, the controller device 2 can display the output image with a high frequency even where the camera image data is transmitted. Note that in a variation of the present embodiment, the controller device 2 may set the frequency with which the camera image data is transmitted to be greater than or equal to the frequency with which the output image data is received.

In the first and second communication modes, the controller device 2 receives one packet of output sound data from the information processing device 3 with a frequency that is higher than the first frequency and lower than the second frequency (a frequency of once or more per one-frame period in the example above). Then, since the controller device 2 can receive output sound data at least once within one-frame period, it is possible to perform, with an appropriate frequency, the process of outputting a sound represented by the output sound data. Note that in a variation of the present embodiment, there is no limitation on the frequency with which the output sound data is received.

In the first communication mode, the controller device 2 transmits one packet of sound data obtained by the microphone 32 to the information processing device 3 with a frequency that is higher than the first frequency and lower than the second frequency. Then, since the controller device 2 transmits sound data obtained by the microphone with a frequency of at least once within one-frame period, the information processing device 3 can execute, with an appropriate frequency, the information process on the sound data obtained by the microphone. Note that in a variation of the present embodiment, there is no limitation on the frequency with which the sound data is transmitted.

In the first and second communication modes, the controller device 2 generates operation data (transmit information data) with a frequency of once per predetermined period of time T4, and each time operation data is generated, the controller device 2 transmits the generated operation data. That is, the controller device 2 transmits newly-generated operation data for each transmission. In other words, the controller device 2 transmits, following the previously-transmitted operation data, operation data that is generated based on an operation performed after the operation represented by the previously-transmitted operation data is performed. Thus, since operation data of new content is always transmitted, the controller device 2 can convey the content of operation to the information processing device 3 with a substantially high frequency, and it is possible to improve the controllability of the controller device 2. Note that in a variation of the present embodiment, some or all of the operation data do not always need to be newly generated for each transmission.

The controller device 2 includes a sensor unit including at least one of the touch panel 12, the acceleration sensor 23, and the gyrosensor 24. The controller device 2 generates operation data including data based on the output of the sensor unit ("see [6. Generation of operation data]" to be described later), the details of which will be described below. As described above, since the operation data is transmitted with a high frequency (e.g., a frequency that is higher than the frequency with which the output image data is received), the controller device 2 can transmit data based on the output of the sensor unit to the information processing device 3 with a high frequency. Since the output results of the sensor unit can be conveyed to the information processing device 3 with a high frequency, it is possible to improve the controllability of the operation detected by the sensor unit. Note that in a variation of the present embodiment, the operation data does not need to include data based on the output of the sensor unit.

In the first and second communication modes, the controller device 2 (more specifically, the input/output control unit 21) generates operation data based on an operation performed on the controller device 2. The controller device 2 (more specifically, the communication data management unit 27 and the wireless module 33) receives, from the information processing device 3, one image's worth of output image data transmitted with a timing determined based on a sync signal transmitted from the information processing device 3 with the first frequency, transmits the operation data to the information processing device 3 with the timing determined based on the sync signal transmitted from the information processing device 3 and with a second frequency that is an integral multiple of the first frequency, and transmits one image's worth of camera image data obtained by the camera 16 to the information processing device 3 with a third frequency that is 1/n (n is a natural number) the first frequency. Then, since the operation data is transmitted with a frequency that is an integral multiple of the frequency with which the image displayed on the controller device 2 is updated, it is possible to provide the controller device 2 with a good controllability. The controller device 2 can receive output image data from the information processing device 3 to display an image while ensuring an operation data transmission frequency such that a certain level of controllability can be provided. By using the sync signal, the controller device 2 can more reliably transmit the operation data with an appropriate timing, and it is possible to guarantee the delay time of the operation data by determining the operation data transmission timing using the sync signal. Moreover, by transmitting the camera image data with a third frequency that is 1/n (n is a natural number) the first frequency, the controller device 2 can display the output image with a high frequency even where the camera image data is transmitted.

In the first and second communication modes, the controller device 2 (more specifically, the input/output control unit 21) generates operation data based on an operation performed on the controller device 2. The controller device 2 (more specifically, the communication data management unit 27 and the wireless module 33) transmits camera image data generated by the camera 16 to the information processing device 3 with a predetermined frequency (a frequency of once per two-frame period in the example above), and transmits the operation data to the information processing device 3 with a frequency (the second frequency) that is higher than the frequency with which one image's worth of camera image data obtained by the camera 16 is transmitted. Then, since the operation data is transmitted with a frequency that is higher than the camera image data, it is possible to convey the content of operation performed on the controller device 2 to the information processing device 3 with a high frequency, and to provide the controller device 2 with a good controllability. The controller device 2 can transmit the camera image data to the information processing device 3 while ensuring an operation data transmission frequency such that a certain level of controllability can be provided. Note that in the above, there is no limitation on the frequency (the first frequency) with which the output image data transmitted from the information processing device 3 is received, and the controller device 2 can realize the effects described above, irrespective of the frequency.

Moreover, in the first and second communication modes, the controller device 2 transmits the operation data with a frequency (a frequency of once per time T4 (=T1/3) in the example above) that is an integral multiple of a frequency (a frequency of once per time (T1×2) in the example above) with which one image's worth of camera image data obtained by the camera 16 is transmitted. Then, since the number of times the operation data is transmitted within one cycle of transmitting the camera image data is constant. Therefore, since the information processing device 3 can receive the camera image data and the operation data at a constant ratio, it is possible to simplify the process in the information processing device 3. Note that in a variation of the present embodiment, the operation data transmission frequency does not need to be set to an integral multiple of the frequency with which the output image data is received.

In the present embodiment, the controller device 2 (more specifically, the input/output control unit 21) generates operation data based on an operation performed on the controller device 2. The controller device 2 (more specifically, the communication data management unit 27 and the wireless module 33) receives the output image data from the information processing device 3, and transmits the operation data to the information processing device 3. The controller device 2 is capable of operating both in a first communication mode in which the output image data is received with a first frequency (a frequency of once per one-frame period in the example above), and in a second communication mode in which the output image data is received with a frequency that is half the first frequency (a frequency of once per two-frame period in the example above). Then, the controller device 2 can accommodate the operation of the information processing device 3 transmitting the output image data to one controller device 2 with the first frequency, and can also accommodate the operation of the information processing device 3 transmitting the output image data to each of two controller devices 2 with a frequency that is half the first frequency. That is, it is possible to either use one controller device 2 wirelessly connected to the information processing device 3 or use two controller devices 2 wirelessly connected to the information processing device 3. Note that in the above, there is no limitation on the frequency with which various data (the output image data, etc.) is received from the information processing device 3, and the frequency with which data other than the operation data is transmitted from the controller device 2, and the controller device 2 can realize the effects described above, irrespective of these frequencies.

Note that the controller device 2 may accommodate only one of the first communication mode and the second communication mode. That is, the controller device 2 may have the function of operating in the first communication mode and not have the function of operating in the second communication mode. The controller device 2 may not have the function of operating in the first communication mode, and have the function of operating in the second communication mode. Then, the controller device 2 may have both of, or either one of, the function of performing the operation of the first controller device and the function of performing the operation of the second controller device.

The controller device 2 (more specifically, the communication data management unit 27 and the wireless module 33) transmits the operation data to the information processing device 3 with the second frequency higher than the first frequency both in the first communication mode and in the second communication mode. Then, the controller device 2 can transmit the operation data to the information processing device 3 with a frequency that is higher than the frequency with which the output image data is transmitted both in the two modes. Therefore, it is possible to convey the content of the operation performed on the controller device 2 to the information processing device 3 with a high frequency, and it is possible to provide the controller device 2 with a good controllability. Note that in a variation of the present embodiment, there is no limitation on the operation data transmission frequency in the first communication mode and that in the second communication mode.

In the first communication mode and the second communication mode, the information processing device 3 transmits a sync signal to the controller device 2, and transmits the output image data with a timing determined based on the sync signal. The controller device 2 transmits the operation data with a timing determined based on the sync signal transmitted from the information processing device 3. Then, in the second communication mode, the controller device 2 is capable of transmitting operation data with a timing that is different from a timing with which the operation data is transmitted by another device (another controller device) capable of communicating with the information processing device 3. Then, where two controller devices 2 communicate with the information processing device 3 in the second communication mode, it is possible to reduce the possibility that operation data collide with each other. Note that in a variation of the present embodiment, there is no limitation on the timings with which operation data are transmitted from the two controller devices.

Moreover, in the second communication mode, the controller device 2 is capable of operating both in a mode (the operation mode of the first controller device) in which the operation data is transmitted with the same timing as the first communication mode, and in another mode (the operation mode of the second controller device) in which the operation data is transmitted with a different timing from the first communication mode. Then, it is possible to easily stagger the operation data transmission timing from that of another device (another controller device) capable of wirelessly communicating with the information processing device 3.

The controller device 2 transmits one image's worth of camera image data obtained by the camera 16 of the controller device 2 to the information processing device 3 with a predetermined frequency both in the first communication mode and in the second communication mode. Then, the controller device 2 can transmit the camera image data with the same frequency either in the first communication mode or in the second communication mode. That is, the controller device 2 can transmit the camera image data with the same frequency whether one controller device 2 is used or two controller devices 2 are used. Note that in a variation of the present embodiment, the controller device 2 may use different frequencies with which the camera image data is transmitted in the first communication mode and in the second communication mode. For example, the controller device 2 may set the frequency with which the camera image data is transmitted in the second communication mode to be lower than that in the first communication mode.

In the second communication mode, the controller device 2 transmits the camera image data to the information processing device 3 while reducing the amount of one image's worth data as compared with that in the first communication mode. Now, since there are two controller devices 2 in the second communication mode, the amount of communication between the controller devices 2 and the information processing device 3 tends to increase as compared with that in the first communication mode. In contrast, according to the above description, the controller device 2 can transmit the camera image data with the same frequency as that in the first communication mode while reducing the increase in the amount of communication in the second communication mode. Note that in a variation of the present embodiment, the controller device 2 may set the amount of camera image data in the second communication mode to be the same as that in the first communication mode.

In the embodiment described above, the controller device 2 transmits the operation data together with other data (the management data 52) to the information processing device 3. Now, the controller device 2 can realize the effects described above in "<5-3>", irrespective of whether the operation data is transmitted to the information processing device 3 together with other data (transmitted while being included in the transmit information data) or the operation data is transmitted by itself.

<5-4: Operation where Communication is Performed with External Device>

Next, an operation where the controller device 2 and an external device communicate with each other will be described. In the present embodiment, for the communication with the external device, the extension communication data and the communication management data described above are used in the communication between the controller device 2 and the information processing device 3. That is, between the controller device 2 and the information processing device 3, data representing a communication-related instruction from the information processing device 3 and data transmitted/received to/from the external device are transmitted/received as the extension communication data (the first extension communication data or the second extension communication data). For the information processing device 3 to recognize the status regarding the communication between the controller device 2 and the external device, communication management data which represents the status is transmitted from the controller device 2 to the information processing device 3. Now, details of the operation where the controller device 2 and an external device communicate with each other will be described.

(Operation in Infrared Communication)

Figure 10:
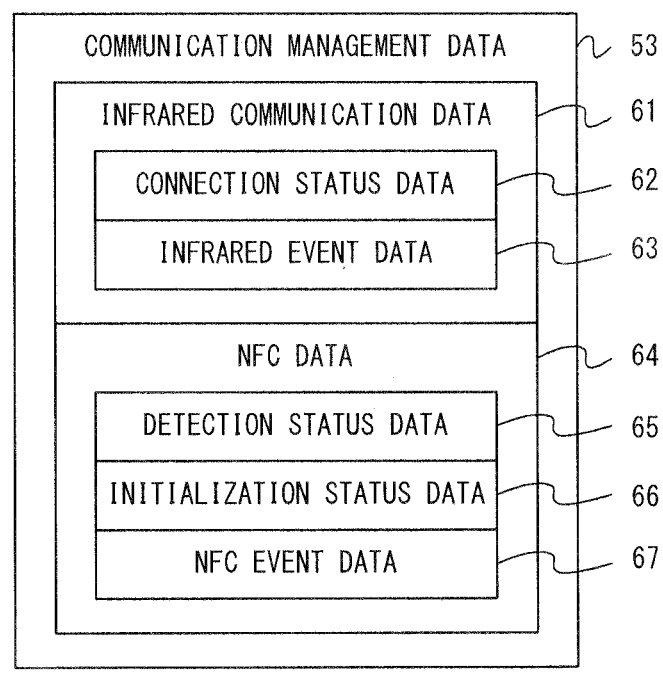
FIG. 10 A diagram showing an example of data included in communication management data.
Figure 11:
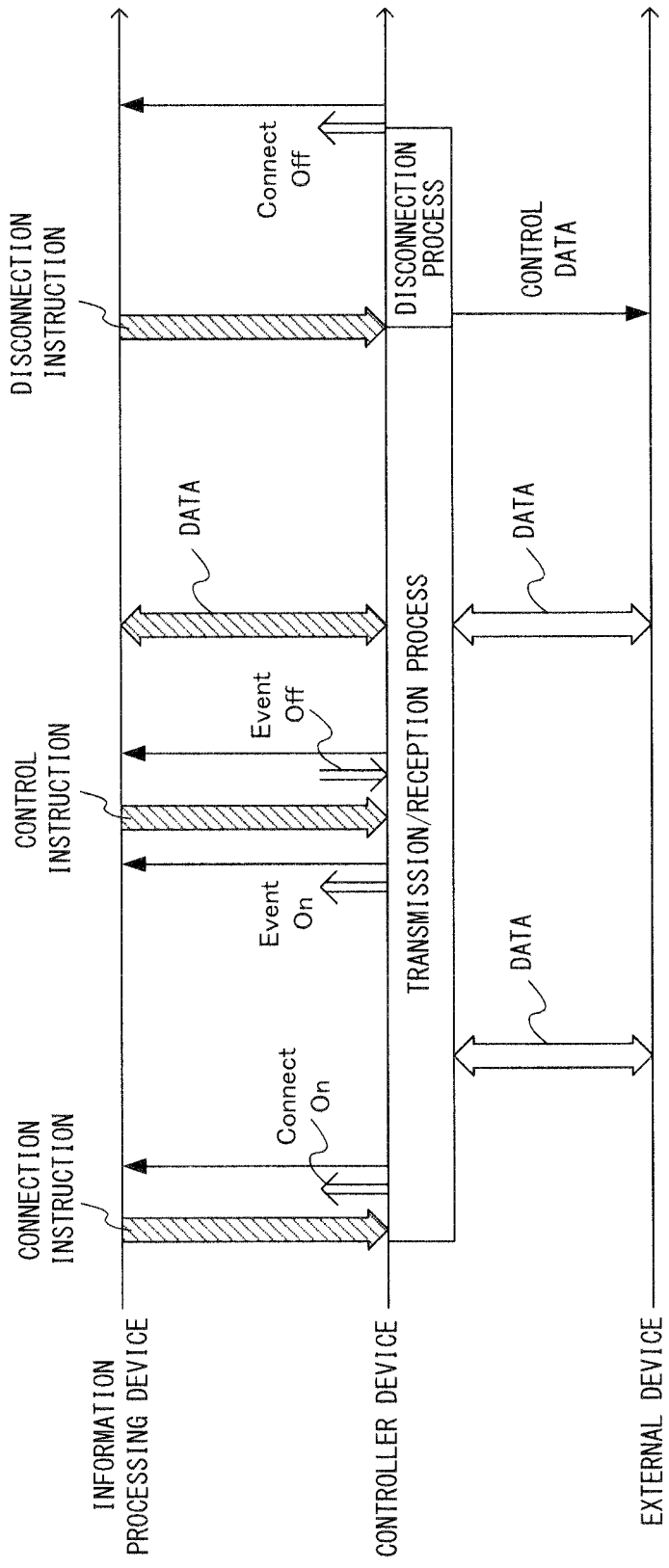
FIG. 11 A diagram showing an example of a communication operation where the controller device and an external device communicate with each other in infrared communication.

First, a case where the controller device 2 and an external device communicate with each other in infrared communication will be described. FIG. 10 is a diagram showing an example of data included in the communication management data. FIG. 11 is a diagram showing an example of a communication operation where the controller device 2 and an external device communicate with each other in infrared communication.

First, the details of the communication management data used in infrared communication will be described. As shown in FIG. 10, the communication management data 53 includes infrared communication data 61. The infrared communication data 61 represents the status regarding the infrared communication by the infrared communication unit 36. Although there is no limitation on the specific content of the infrared communication data 61, the infrared communication data 61 includes the following data, for example.

The infrared communication data 61 includes connection status data 62. The connection status data 62 represents the connection status of the infrared communication between the infrared communication unit 36 and the external device. Specifically, the connection status data 62 is flag data indicating whether the infrared communication has been established (or communication is available), for example. This flag will hereinafter be referred to as the "connection status flag". Note that the communication data management unit 27 of the controller device 2 stores in the memory 29 data representing ON/OFF of the connection status flag. The connection status flag is set to OFF before the start of the infrared communication.

The infrared communication data 61 includes infrared event data 63. The infrared event data 63 represents the status of an event in the infrared communication. For example, the infrared event data 63 is flag data representing the presence/absence of an event (whether an event has occurred). Hereinafter, the flag will be referred to as an "infrared event flag". Herein, an event is an incident that has occurred by the infrared communication and that should be conveyed to the information processing device 3. There is no limitation on the specific content of the event. An example of an event may be, for example, the completion of the reception, by the controller device 2, of data to be transmitted from an external device to the information processing device 3, the occurrence of an error in the infrared communication, etc. Note that the infrared event data 63 may represent the content (type) of the event which has occurred, in addition to, or instead of, the presence/absence of an event. Note that the communication data management unit 27 of the controller device 2 stores, in the memory 29, data representing ON/OFF of the infrared event flag. Before the start of the infrared communication, the infrared event flag is set to OFF.

Now, referring to FIG. 11, an operation where the controller device 2 and the external device communicate with each other in infrared communication will be described. Note that in the present embodiment, the operation of the controller device 2 regarding the infrared communication is managed by the communication data management unit 27. That is, the communication data management unit 27 performs an infrared communication (transmission/reception of infrared light signals) with the external device by controlling the infrared communication unit 36. The communication data management unit 27 performs a communication (transmission/reception of extension communication data, transmit information data, etc.) with the information processing device 3 by controlling the wireless module 33. Note however that the management of the operation may be done by any component of the controller device 2.

When starting infrared communication, the information processing device 3 transmits a connection instruction to the controller device 2. A connection instruction is an instruction (command) for making a connection by infrared communication with an external device. Now, an instruction to the controller device 2 regarding communication (extension communication) between the controller device 2 and an external device is done by transmitting first extension communication data, which represents the instruction, to the controller device 2. That is, the information processing device 3 transmits first extension communication data representing a connection instruction to the controller device 2.

Herein, the extension communication data (the first extension communication data and the second extension communication data) are data that are transmitted non-periodically (not transmitted periodically). Note that "transmitted non-periodically" means that when information that should be transmitted is generated, data representing the information is transmitted, whereas when there is no such information generated, no data is transmitted. As described above, the extension communication data is set with a lower priority than the other ones of the data shown in FIG. 6 (data other than the extension communication data). Therefore, in the present embodiment, it can be said that the extension communication data is data that is transmitted on fewer opportunities (data for which the opportunities of transmission are less ensured) than the other data. Note that in FIG. 11, information that are transmitted/received by extension communication data are indicated by thick hatched arrows. On the other hand, information that are transmitted/received by transmit information data are indicated by thin solid-line arrows. Note that the transmit information data are transmitted periodically, although not shown in FIGS. 11 and 12.

Upon receiving a connection instruction from the information processing device 3, the controller device 2 starts the infrared communication with an external device. Now, methods for the controller device 2 to start the infrared communication with an external device include a method of starting the communication after performing an authentication process, and a method of starting the communication without performing an authentication process. When an authentication process is performed, the controller device 2 performs an authentication process with the external device upon receiving a connection instruction. Then, when the authentication process succeeds (completes), the controller device 2 sets the connection status flag described above to ON (denoted as "Connect On" in FIG. 11). On the other hand, when an authentication process is not performed, the controller device 2 sets the connection status flag to ON upon receiving a connection instruction.

As described above, transmit information data including the connection status data 62 is transmitted to the information processing device 3 at an interval of a predetermined period of time. After the connection status flag is set to ON, the controller device 2 generates transmit information data including the connection status data 62 indicating that the connection status flag is ON. Then, the transmit information data including the connection status data 62 indicating that the connection status flag is ON is transmitted to the information processing device 3. Therefore, the information processing device 3 can recognize that the connection status flag is ON, i.e., the communication connection of infrared communication between the controller device 2 and the external device has been completed. Note that in the case where an authentication process is performed, if the authentication process fails, the connection status flag remains OFF. Therefore, since transmit information data including the connection status data 62 indicating that the connection status flag is OFF is transmitted to the information processing device 3 at an interval of a predetermined period of time, the information processing device 3 can recognize that the connection of infrared communication between the controller device 2 and the external device has not been completed. Then, the information processing device 3 may determine that the connection of infrared communication has failed when, for example, the connection status flag is not turned ON after passage of a predetermined period of time since the transmission of the connection instruction.

When the infrared communication between the controller device 2 and the external device is started, data is transmitted/received between the controller device 2 and the external device. For example, a process in which data to be transmitted from the external device to the information processing device 3 is transmitted from the external device to the controller device 2 is performed. Note that there is no limitation on the method by which data is transmitted/received between the controller device 2 and the external device. For example, the controller device 2 and the external device may alternately transmit and receive data.

If an event occurs in the controller device 2 as a result of the infrared communication, the controller device 2 sets the infrared event flag to ON (denoted as "Event On" in FIG. 11). Note that the occurrence of an event refers to, for example, the completion of the reception, by the controller device 2, of data to be transmitted to the information processing device 3 from the external device, the occurrence of an error in the infrared communication, etc.

After the infrared event flag is set to ON, the controller device 2 generates transmit information data including the infrared event data 63 indicating that the infrared event flag is ON. Then, the transmit information data is transmitted to the information processing device 3. Thus, the information processing device 3 can recognize that the infrared event flag is ON, i.e., that an event has occurred regarding the infrared communication.

When the information processing device 3 recognizes that an event has occurred, the information processing device 3 performs a certain operation in accordance with the event. Specifically, the information processing device 3 transmits a predetermined control instruction to the controller device 2. Although there is no limitation on the content of the control instruction, the control instruction may be, for example, a receiving instruction and/or a transmitting instruction. A receiving instruction is an instruction for the information processing device 3 to receive data to be transmitted from the external device to the information processing device 3, i.e., an instruction for the data to be transmitted from the controller device 2 to the information processing device 3. A transmitting instruction is an instruction for the controller device 2 to transmit, to the external device, data to be transmitted from the information processing device 3 to the external device. Note that as described above, the predetermined control instruction is transmitted to the controller device 2 as the first extension communication data. With the transmitting instruction described above, the information processing device 3 transmits the data to be transmitted to the controller device 2 as the first extension communication data.

Upon receiving the predetermined control instruction, the controller device 2 sets the infrared event flag to OFF (denoted as "Event Off" in FIG. 11). This is for allowing the information processing device 3 to recognize that there is no need to further transmit an instruction since there has been a response (the predetermined control instruction) of the information processing device 3 to the event that has occurred. Note that after the infrared event flag is set to OFF, the controller device 2 generates transmit information data including the infrared event data 63 indicating that the infrared event flag is OFF and transmits the transmit information data to the information processing device 3. Thus, the information processing device 3 can recognize that the infrared event flag is OFF, i.e., that no event has occurred.

Upon receiving the predetermined control instruction, the controller device 2 performs an operation in accordance with the control instruction. For example, when the receiving instruction is received, the controller device 2 transmits, to the information processing device 3, data received from the external device. For example, when the transmitting instruction is received, the controller device 2 receives, from the information processing device 3, data to be transmitted to the external device, and transmits the data to the external device. For example, when the infrared event flag is set to ON in response to the occurrence of an error, the controller device 2 may transmit, to the information processing device 3, the second extension communication data representing the content of the error.

When some data is transmitted to the information processing device 3, as an operation performed in response to the predetermined control instruction, the controller device 2 transmits the data as the second extension communication data. In the present embodiment, it can be said that the second extension communication data, as is the first extension communication data, is data that is transmitted on fewer opportunities than the other data other than the extension communication data.

Upon completion of the operation of the controller device 2 in accordance with the predetermined control instruction, the information processing device 3 transmits a disconnection instruction to the controller device 2. The disconnection instruction is an instruction to disconnect (terminate) the infrared communication with the external device. That is, the information processing device 3 transmits the first extension communication data representing the disconnection instruction to the controller device 2.

Upon receiving the disconnection instruction from the information processing device 3, the controller device 2 performs a process (disconnection process) of disconnecting the infrared communication with the external device. For example, the controller device 2 transmits control data for disconnecting the infrared communication to the external device. When the infrared communication with the external device is terminated by the disconnection process, the controller device 2 sets the connection status flag to OFF (denoted as "Connect Off" in FIG. 11). Note that after the connection status flag is set to OFF, the controller device 2 generates transmit information data including the connection status data indicating that the connection status flag is OFF, and transmits the transmit information data to the information processing device 3. Thus, the information processing device 3 can recognize that the connection status flag is OFF, i.e., that the infrared communication between the controller device 2 and the external device has been completed.

As described above, with infrared communication, instructions from the information processing device 3 and data transmitted/received between the external device and the information processing device 3 are conveyed as extension communication data between the controller device 2 and the information processing device 3. In the present embodiment, the extension communication data is data for which the opportunities of transmission are less ensured since the extension communication data is not transmitted periodically and/or the priority thereof is set to be low. In other words, the transmission/reception of the extension communication data has a small influence on the transmission/reception of the other data such as the output image data and the transmit information data. That is, in the present embodiment, since the infrared communication does not have a substantial influence on the communication of the other data, the other data can be communicated stably.

The infrared communication data 61 representing the communication status of the infrared communication is conveyed by using the transmit information data. As described above, the transmit information data is transmitted periodically and/or the priority thereof is set to be high (as compared with the extension communication data), and therefore the transmit information data is data for which the opportunities of transmission are more ensured. Therefore, as the communication status is periodically conveyed to the information processing device 3 using the transmit information data, the information processing device 3 can quickly recognize the communication status. As described above, in the present embodiment, the information processing device 3 can quickly recognize the communication status of the infrared communication, and the communication between the controller device 2 and the information processing device 3 can be performed stably.

(Operation in Near Field Communication)

Figure 12:
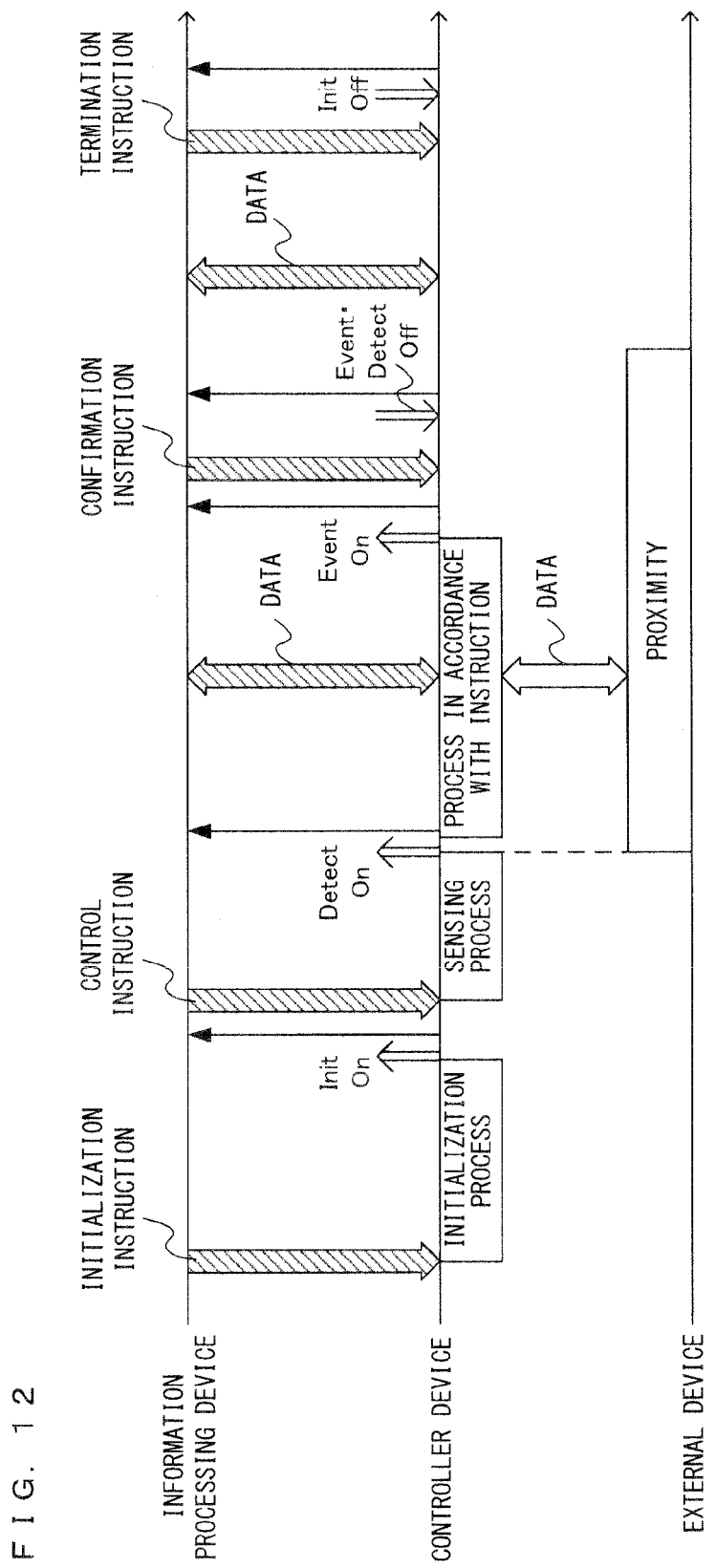
FIG. 12 A diagram showing an example of a communication operation where the controller device and an external device communicate with each other in near field communication.

Next, referring to FIGS. 10 and 12, a case where the controller device 2 and an external device (also referred to as a "tag" in near field communication) communicate with each other in near field communication will be described. FIG. 12 is a diagram showing an example of a communication operation in which the controller device 2 and an external device communicate with each other in near field communication.

First, the details of communication management data used in near field communication will be described. As shown in FIG. 10, the communication management data 53 includes near field communication data (hereinafter referred to as "NFC data") 64. The NFC data 64 represents the status regarding the near field communication by the near field communication unit 37. Although there is no limitation on the specific content of the NFC data 64, the NFC data 64 includes the following data, for example.

The NFC data 64 includes detection status data 65. The detection status data 65 represents the detection status of an external device capable of near field communication with the controller device 2. Specifically, the detection status data 65 is flag data indicating whether the external device has been detected. Hereinafter, the flag will be referred to as the "detection flag". Note that the communication data management unit 27 of the controller device 2 stores, in the memory 29, data representing the ON/OFF of the detection flag. Before the start of near field communication, the detection flag is set to OFF.

The NFC data 64 includes initialization status data 66. The initialization status data 66 represents the status of an initialization process regarding near field communication (e.g., an initialization process for the near field communication unit 37) that is executed in the controller device 2. Specifically, the initialization status data 66 is flag data indicating whether the initialization process has been completed. Hereinafter, the flag will be referred to as the "initialization flag". Note that the communication data management unit 27 of the controller device 2 stores, in the memory 29, data representing ON/OFF of the initialization flag. Before the start of near field communication, the initialization flag is set to OFF.

The NFC data 64 includes NFC event data 67. The NFC event data 67 represents the status of the event in near field communication. For example, the NFC event data 67 is flag data representing the presence/absence of an event (whether an event has occurred). Hereinafter, the flag will be referred to as the "NFC event flag". Herein, an event is an incident that has occurred by the near field communication and that should be conveyed to the information processing device 3. There is no limitation on the specific content of the event. An example of an event may be, for example, the completion of the reception, from an external device, of data to be read out from the external device to the information processing device 3, the occurrence of an error in the near field communication, etc. Note that the NFC event data 67 may represent the content (type) of the event which has occurred, in addition to, or instead of, the presence/absence of an event. Note that the communication data management unit 27 of the controller device 2 stores, in the memory 29, data representing ON/OFF of the NFC event flag. Before the start of the near field communication, the NFC event flag is set to OFF.

Now, referring to FIG. 12, an operation where the controller device 2 and an external device communicate with each other in near field communication will be described. Note that in the present embodiment, the operation in the controller device 2 regarding the near field communication is managed by the communication data management unit 27. That is, the communication data management unit 27 performs a near field communication with an external device by controlling the near field communication unit 37. The communication data management unit 27 performs a communication (transmission/reception of extension communication data, transmit information data, etc.) with the information processing device 3 by controlling the wireless module 33. Note however that the management of the operation may be done by any component of the controller device 2.

When starting the near field communication, the information processing device 3 transmits an initialization instruction to the controller device 2. An initialization instruction is an instruction (command) for performing the initialization process described above. That is, the information processing device 3 transmits the first extension communication data representing the initialization instruction to the controller device 2. Note that in FIG. 12, as in FIG. 11, information that are transmitted/received by extension communication data are denoted by thick hatched arrows, and information that are transmitted/received by transmit information data are indicated by thin solid-line arrows.

Upon receiving an initialization instruction from the information processing device 3, the controller device 2 executes the initialization process described above. Upon completion of the initialization process, the controller device 2 sets the initialization flag described above to ON (denoted as "Init On" in FIG. 12). Now, as described above, transmit information data including the initialization status data 66 is transmitted to the information processing device 3 at an interval of a predetermined period of time. Therefore, after the initialization status flag is set to ON, the controller device 2 generates transmit information data including the connection status data 62 indicating that the initialization status flag is ON and transmits the transmit information data to the information processing device 3. Thus, the information processing device 3 can recognize that the initialization status flag is ON, i.e., that the initialization process has been completed.

When the information processing device 3 recognizes that the initialization process has been completed, the information processing device 3 transmits a predetermined control instruction. That is, the first extension communication data representing a predetermined control instruction is transmitted to the controller device 2. Although there is no limitation on the content of the control instruction, the control instruction may be, for example, a read instruction and/or a write instruction. A read instruction is an instruction for reading out data from an external device, i.e., an instruction for the controller device 2 to receive data from the external device and transmit the data to the information processing device 3. Note that with a read instruction, the controller device 2 transmits the data read out from the external device to the information processing device 3 as the second extension communication data. A write instruction is an instruction for writing data to an external device, i.e., an instruction for the controller device 2 to receive data to be written to the external device from the information processing device 3 and transmit the data to the external device. Note that with a write instruction, the information processing device 3 transmits the data to be written to the controller device 2 as the first extension communication data.

When the controller device 2 receives the predetermined control instruction, the controller device 2 executes a sensing process (e.g., a polling process) for sensing an external device. That is, the controller device 2 senses an external device capable of near field communication with the controller device 2. Therefore, if there is an external device in proximity to the controller device 2 to such a degree that near field communication can be performed therebetween, the external device is sensed. If an external device is sensed as a result of the sensing process, the controller device 2 sets the detection flag described above to ON (denoted as "Detect On" in FIG. 12). After the detection flag is set to ON, the controller device 2 generates transmit information data including the detection status data 65 indicating that the detection flag is ON, and transmits the transmit information data to the information processing device 3. Thus, the information processing device 3 can recognize that the detection flag is ON, i.e., that an external device has been detected that is capable of near field communication with the controller device 2. Note that the information processing device 3 may use a detection flag, with the aim of terminating the near field communication, etc., when no external device is detected within a predetermined period since the transmission of a control instruction, for example.

After the sensing process, the controller device 2 executes a process in accordance with the predetermined control instruction. That is, the near field communication unit 37 of the controller device 2 transmits/receives data between the external device and/or the information processing device 3 as necessary. For example, where the control instruction is a read instruction, data to be read out is received from the external device. For example, where the control instruction is a write instruction, the data to be written is received from the information processing device 3, and the data is transmitted to the external device.

During the process in accordance with the predetermined control instruction, if an event occurs in the controller device 2, the controller device 2 sets the NFC event flag to ON (denoted as "Event On" in FIG. 12). Note that the occurrence of an event refers to, for example, the completion of the process in accordance with the predetermined control instruction, the occurrence of an error in the process, etc. After the NFC event flag is set to ON, the controller device 2 generates transmit information data including the NFC event data 67 indicating that the NFC event flag is ON. Then, the transmit information data is transmitted to the information processing device 3. Thus, the information processing device 3 can recognize that the NFC event flag is ON, i.e., that an event has occurred regarding the near field communication. Note that if the NFC event flag is set to ON in response to the occurrence of an error, the controller device 2 may transmit, to the information processing device 3, the second extension communication data representing the content of the error.

When the information processing device 3 recognizes that an event has occurred, the information processing device 3 transmits a confirmation instruction to the controller device 2. That is, the information processing device 3 transmits the first extension communication data representing the confirmation instruction to the controller device 2. A confirmation instruction is an instruction for confirming that the process in accordance with the control instruction has been completed normally.

Upon receiving the confirmation instruction, the controller device 2 sets the NFC event flag and the sensing flag to OFF (denoted as "Event. Detect Off" in FIG. 12). This is for allowing the information processing device 3 to recognize that there is no need to further transmit an instruction since there has been a response (the confirmation instruction) of the information processing device 3 to the event that has occurred. Note that after the NFC event flag and the sensing flag are set to OFF, the controller device 2 generates transmit information data including the detection status data 65 indicating that the sensing flag is OFF and the NFC event data 67 indicating that the NFC event flag is OFF, and transmits the transmit information data to the information processing device 3. Thus, the information processing device 3 can recognize that the NFC event flag is OFF, i.e., that no event has occurred.

Note that upon receiving the confirmation instruction, the controller device 2 transmits/receives data to/from the information processing device 3 and/or the external device as necessary. For example, where the control instruction is a read instruction, the controller device 2 transmits data read out from the external device to the information processing device 3. The data is transmitted to the information processing device 3 as the second extension communication data.

When the operation in accordance with the predetermined control instruction is completed, the information processing device 3 transmits a termination instruction to the controller device 2. A termination instruction is an instruction for disconnecting (terminating) the near field communication with the external device. That is, the information processing device 3 transmits the first extension communication data representing the termination instruction to the controller device 2.

Upon receiving the termination instruction from the information processing device 3, the controller device 2 executes a termination process on the near field communication unit 37. Upon completion of the termination process, the controller device 2 sets the initialization flag described above to OFF (denoted as "Init Off" in FIG. 12). After the initialization flag is set to OFF, the controller device 2 generates the transmit information data including the initialization status data 66 indicating that the initialization flag is OFF. Then, the transmit information data is transmitted to the information processing device 3. Thus, the information processing device 3 can recognize that the initialization flag is OFF, i.e., that the near field communication between the controller device 2 and the external device has been completed.

As described above, with near field communication, as with infrared communication, instructions from the information processing device 3 and data transmitted/received between the external device and the information processing device 3 are conveyed as the extension communication data between the controller device 2 and the information processing device 3. Therefore, the near field communication does not give a substantial influence on the communication of other data other than the extension communication data, and the other data can be stably communicated. Also with near field communication, as with infrared communication, the NFC data 64 representing the communication status of the near field communication is conveyed by using the transmit information data. Therefore, the information processing device 3 can quickly recognize the communication status. As described above, in the present embodiment, the information processing device 3 can quickly recognize the communication status of the near field communication, and the controller device 2 and the information processing device 3 can stably communicate with each other.

For the operation in the infrared communication and the near field communication described above, the information process (including the management of the flag data) in the controller device 2 is performed by the communication data management unit 27, for example. Note however that the information process may be performed by another component in the controller device 2.

Note that cases where the communication process is performed using the extension communication data and the communication management data in infrared communication and in near field communication have been described above as examples of the communication method between the controller device 2 and the external device by extension communication. Note however that the communication methods of extension communication are not limited to these, and any communication method may be employed. While the communication management data represents the communication-related status of infrared communication and near field communication, it is not limited thereto. The communication management data may be data representing the status regarding communication between the controller device 2 and the external device by extension communication.

Note that data included in the communication management data may be composed of one bit. For example, each data included in the infrared communication data 61 may be flag data composed of one bit. For example, each data included in the NFC data 64 may be flag data composed of one bit. Where data included in the communication management data is composed of one bit, the communication management data can be transmitted to the information processing device 3 while being included in the transmit information data, without substantially influencing the data size of the transmit information data.

<5-5: Advantageous Effects Regarding 5-4>

With the configuration and operation described above, the controller device 2 provides the following effects. Note that in order for the following effects to be realized, the controller device 2 may have configurations that are described below along with the effects thereof, and it is not needed to have all the configurations of the present embodiment.

As described above, the controller device 2 (more specifically, the input/output control unit 21) generates operation data based on an operation performed on the controller device 2. The controller device 2 communicates with another external device different from the information processing device 3. Then, the controller device 2 transmits communication management data representing the management information in communication with the external device, along with the operation data, to the information processing device 3 with a predetermined frequency (a frequency of once per time T4 in the example above). Thus, since the controller device 2 periodically transmits the management information to the information processing device 3, the information processing device 3 can quickly recognize the communication status. Note that in a variation of the present embodiment, the controller device 2 does not need to transmit the communication management data to the information processing device 3, and may non-periodically transmit the communication management data to the information processing device 3.

The controller device 2 is capable of transmitting first-type data of more transmission opportunities (transmit information data) and second-type data of fewer transmission opportunities (second extension communication data) to the information processing device 3. Now, the controller device 2 transmits the communication management data and the operation data to the information processing device 3 as the first-type data, and transmits data received from the external device to the information processing device 3 as the second-type data. Then, the information processing system 1 can stably transmit the communication management data and the operation data even where the data received from the external device is transmitted to the information processing device 3. Note that in a variation of the present embodiment, the communication management data, the operation data, and the data received from the external device may be transmitted from the controller device 2 to the information processing device 3 by any method. For example, these data may be transmitted by a method such that the transmission frequencies are equal to each other (or such that the opportunities of transmission are equal to each other).

The controller device 2 communicates with the information processing device using a wireless communication method in which the transmission of the first-type data is given a higher priority over the transmission of the second-type data (the priority of the transmit information data is higher than the priority of the second extension communication data), and the reception of the output image data is given a higher priority over the transmission of the first-type data (the priority of the output image data is higher than the priority of the transmit information data). Then, when the data received from the external device is transmitted to the information processing device 3, the information processing system 1 can stably transmit the communication management data and the operation data and more stably receive the output image data. Note that with the controller device 2, which receives the output image from the information processing device 3 and displays the output image on the display unit 11, as in the present embodiment, it is advantageous to more stably receive the output image data. Note that in a variation of the present embodiment, there is no limitation on the specific content of the wireless communication method, and the priorities of the first-type data, the second-type data and the output image data may be set in any manner.

6. Generation of Operation Data

Figure 13:
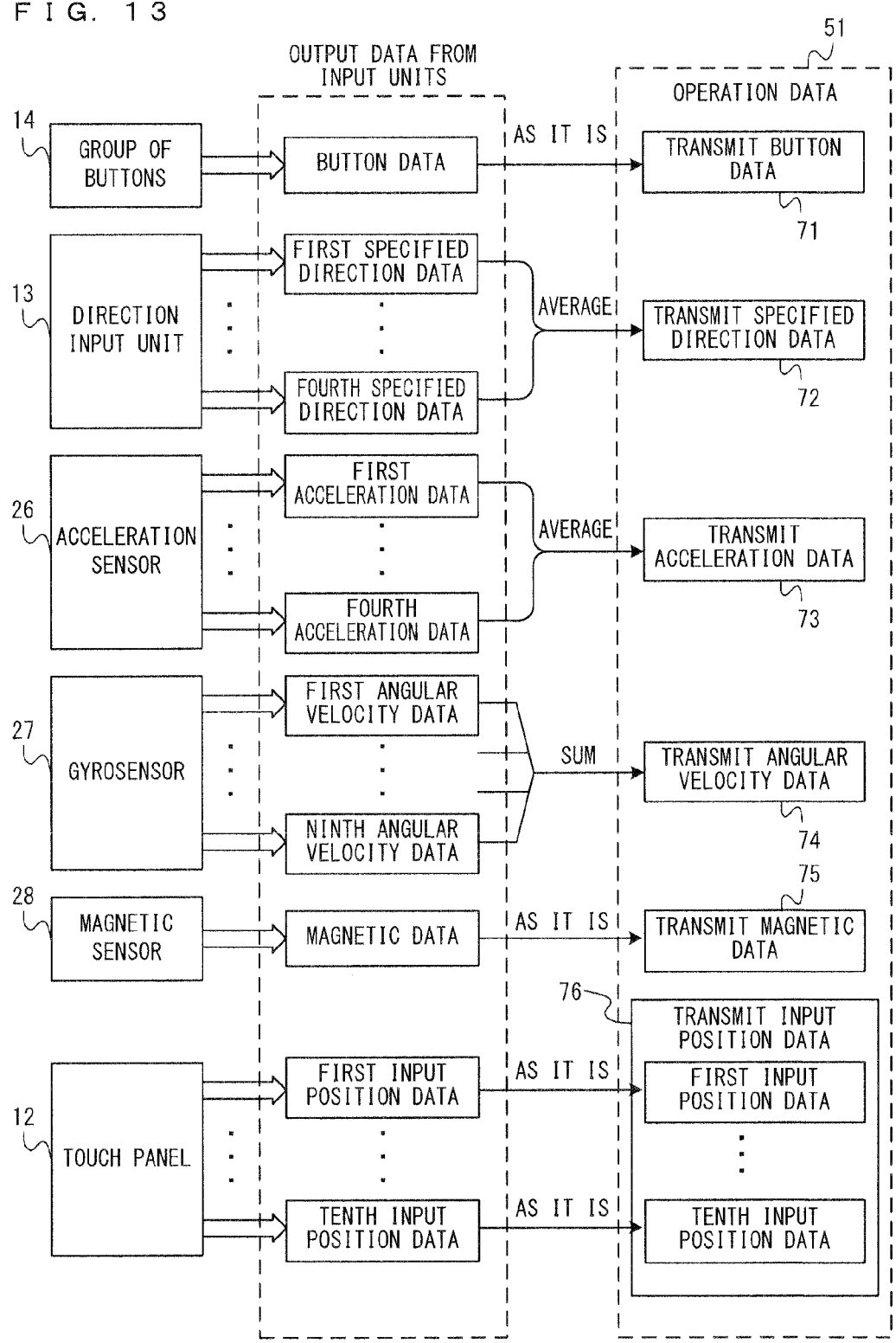
FIG. 13 A diagram showing an example of a method for generating various data included in operation data.

Next, referring to FIG. 13, the details of the method for generating operation data will be described. FIG. 13 is a diagram showing an example of a method for generating various data included in operation data. As described above, the operation data is generated based on an operation performed on the controller device 2. Now, an example of data included in the operation data and an example of a method for generating the same will be described.

(Transmit Button Data)

The operation data 51 includes transmit button data 71. The transmit button data 71 represents the input status of one or more buttons (herein, the group of buttons 14) of the controller device 2. For example, the transmit button data 71 indicates whether each button included in the group of buttons 14 has been depressed.

The transmit button data 71 is data based on button data output from the group of buttons 14. That is, the transmit button data 71 may be data (button data) obtained by simply combining together the data output from the buttons, or may be data obtained by performing some process on the button data. In the present embodiment, the input/output control unit 21 obtains the button data from the group of buttons 14. The input/output control unit 21 uses the obtained button data, as it is, as the transmit button data 71 (see FIG. 13).

As described above, in the present embodiment, the transmit button data 71 included in one piece of operation data 51 (the operation data 51 transmitted in a single transmission) is the button data for one iteration output from the various buttons of the controller device 2. Now, the operation data 51 is transmitted with a frequency (e.g., with a frequency of once per time T4 (=5.56 [msec])) that is higher than the frequency with which the user typically depresses buttons. Therefore, as long as button data for one iteration is included in one piece of operation data 51, it is possible to sufficiently sense the button operation by the user. As the transmit button data 71 includes button data for one iteration, it is possible to reduce the data size of the operation data, and to realize operation data of an efficient data size. Note that in a variation of the present embodiment, one piece of transmit button data 71 may include button data for a plurality of iterations.

(Transmit Specified Direction Data)

The operation data 51 includes transmit specified direction data 72. The transmit specified direction data 72 represents information regarding the direction specified by the user using the controller device 2. For example, the transmit specified direction data 72 represents a direction specified by the user (e.g., the direction in which the movable member is tilted), and an amount for the direction (e.g., the amount by which the movable member is tilted). Specifically, the amounts of tilt in directions of two axes, i.e., the vertical direction and the horizontal direction, are detected and output. These values of the 2-axis components can be regarded as a two-dimensional vector representing a direction and an amount. Note that the transmit specified direction data 72 may indicate whether the movable member has been depressed, in addition to the direction and the amount described above. In the present embodiment, the direction input unit 13 includes two analog sticks 13A and 13B. Therefore, the transmit specified direction data 72 represents information regarding the specified directions of the analog sticks 13A and 13B.

The transmit specified direction data 72 is data based on the specified direction data output from the direction input unit 13. That is, the transmit specified direction data 72 may be the specified direction data itself, or may be data obtained by performing some process on the specified direction data.

In the present embodiment, the input/output control unit 21 obtains specified direction data for four iterations (the first to fourth specified direction data) from the direction input unit 13 over a period of one cycle (time T4) of transmitting the operation data 51. The input/output control unit 21 calculates the average value among values represented by the obtained specified direction data for four iterations. The input/output control unit 21 uses data representing the calculated average value as the transmit specified direction data 72 (see FIG. 13).

As described above, in the present embodiment, the transmit specified direction data 72 included in one piece of operation data 51 is data representing one piece of direction detected by the direction input unit 13 (one piece of the specified direction data). Therefore, it is possible to reduce the data size of the operation data, and to realize operation data of an efficient data size. In the present embodiment, the transmit specified direction data 72 represents the average value among specified directions for a plurality of iterations (four iterations) detected by the direction input unit 13. Therefore, it is possible to precisely calculate the direction specified by the user, and thus to improve the controllability of the controller device 2. Note that in a variation of the present embodiment, one piece of transmit specified direction data 72 may include a plurality of pieces of specified direction data.

(Transmit Acceleration Data)

The operation data 51 includes transmit acceleration data 73. The transmit acceleration data 73 represents information regarding acceleration detected by the acceleration sensor 23 of the controller device 2. While the transmit acceleration data 73 represents three-dimensional acceleration (a vector or a matrix), for example, it may be any data representing acceleration in one or more dimension.

The transmit acceleration data 73 is data based on acceleration data output from the acceleration sensor 23. That is, the transmit acceleration data 73 may be the acceleration data itself, or may be data obtained by performing some process on the acceleration data.

In the present embodiment, the input/output control unit 21 obtains acceleration data for four iterations (first to fourth acceleration data) from the acceleration sensor 23 over a period of one cycle (time T4) of transmitting the operation data 51. That is, the acceleration sensor 23 outputs the detection result with the same frequency as the direction input unit 13. The input/output control unit 21 calculates the average value among values represented by the obtained acceleration data for four iterations. The input/output control unit 21 uses data representing the calculated average value as the transmit acceleration data 73 (see FIG. 13).

As described above, in the present embodiment, the transmit acceleration data 73 included in one piece of operation data 51 is data representing one piece of acceleration detected by the acceleration sensor 23 (one piece of the acceleration data). Therefore, it is possible to reduce the data size of the operation data, and to realize operation data of an efficient data size. In the present embodiment, the transmit acceleration data 73 represents the average value among accelerations for a plurality of iterations (four iterations) detected by the acceleration sensor 23. Therefore, it is possible to improve the detection precision of acceleration applied to the controller device 2, and thus to improve the controllability of the controller device 2. Note that in a variation of the present embodiment, one piece of transmit acceleration data 73 may include a plurality of pieces of acceleration data.

(Transmit Angular Velocity Data)

The operation data 51 includes transmit angular velocity data 74. The transmit angular velocity data 74 represents information regarding the angular velocity detected by the gyrosensor 24 of the controller device 2. While the transmit angular velocity data 74 represents a three-dimensional angular velocity (a vector or a matrix), for example, it may be any data representing angular velocity in one or more dimension.

The transmit angular velocity data 74 is data based on the angular velocity data output from the gyrosensor 24. That is, the transmit angular velocity data 74 may be the angular velocity data itself, or may be data obtained by performing some process on the angular velocity data.

In the present embodiment, the input/output control unit 21 obtains angular velocity data for nine iterations (first to ninth angular velocity data) from the gyrosensor 24 over a period of one cycle (time T4) of transmitting the operation data 51. That is, the gyrosensor 24 outputs the detection results with a higher frequency than the acceleration sensor 23. The input/output control unit 21 calculates the sum of values represented by the obtained angular velocity data for nine iterations. The input/output control unit 21 uses data representing the calculated sum as the transmit angular velocity data 74 (see FIG. 13).

As described above, in the present embodiment, the transmit angular velocity data 74 represents the values of the nine pieces of angular velocity data (the sum of angular velocities for nine iterations detected by the gyrosensor). Therefore, when the information processing device 3 receiving the transmit angular velocity data 74 performs a calculation using an angular velocity, the information processing device 3 performs a process of handling the transmit angular velocity data 74 as being data that represents values of nine pieces of angular velocity data. Note that when angular velocity data for nine iterations cannot be obtained from the gyrosensor 24 in a period of one cycle of transmitting the operation data 51, the controller device 2 may generate, from the obtained angular velocity data for one or more iterations, the transmit angular velocity data 74 representing values of nine pieces of angular velocity data for compatibility with the process described above performed in the information processing device 3. For example, if only angular velocity data for one iteration is obtained from the gyrosensor 24 in the period, the controller device 2 may generate the transmit angular velocity data 74 by multiplying the value of the angular velocity data for one iteration by nine.

As described above, in the present embodiment, the transmit angular velocity data 74 included in one piece of operation data 51 is data representing a value obtained by adding together angular velocities for a plurality of iterations (nine iterations) detected by the gyrosensor 24. Therefore, as compared with a case where angular velocity data for nine iterations are simply transmitted, it is possible to reduce the data size of the operation data, and to realize operation data of an efficient data size. The controller device 2 does not calculate an average value (it does not perform division) though it adds together the values of angular velocity data for nine iterations. Therefore, it is possible to simplify the operation data generation process of the controller device 2, and it is possible to reduce the process load on the controller device 2.

Note that in the present embodiment, for the direction input unit 13 and the acceleration sensor 23, since the number of obtained data is 2 to the $n^{th}$ power (n is an integer greater than or equal to 1; herein, 4), the controller device 2 can perform the division for calculating the average value through a simple operation (a bit shift operation). For the acceleration sensor 23 and the direction input unit 13, since abrupt changes in the output value are less expected than the gyrosensor 24, a sufficient precision can be obtained even if the number of samples is limited to 2 to the $n^{th}$ power. On the other hand, in the present embodiment, for the gyrosensor 24, since the number of obtained data is not 2 to the $n^{th}$ power, the controller device 2 cannot perform the division for calculating the average value through a bit shift operation. Nevertheless, since the data of the gyrosensor 24 may possibly have abrupt changes, it is desirable for ensuring the precision to use data of as many samples as possible, rather than to limit the number of samples to 2 to the $n^{th}$ power. Therefore, in order to reduce the process load on the controller device 2, it is advantageous to calculate the added value, without calculating the average value, as in the present embodiment.

Note that in a variation of the present embodiment, one piece of transmit angular velocity data 74 may be composed of one piece of angular velocity data. One piece of transmit angular velocity data 74 may represent the average value among angular velocities for a plurality of iterations detected by the gyrosensor 24.

(Transmit Magnetic Data)

The operation data 51 includes transmit magnetic data 75. The transmit magnetic data 75 represents information regarding the magnetic direction detected by the magnetic sensor 25 of the controller device 2. While the transmit magnetic data 75 represents a three-dimensional magnetic direction (a vector or a matrix), for example, it may be any data representing magnetic direction in one or more dimension.

The transmit magnetic data 75 is data based on the magnetic data output from the magnetic sensor 25. That is, the transmit magnetic data 75 may be the magnetic data itself, or may be data obtained by performing some process on the magnetic data.

In the present embodiment, the input/output control unit 21 obtains magnetic data for one iteration from the magnetic sensor 25 over a period of one cycle (time T4) of transmitting the operation data 51. That is, the magnetic sensor 25 outputs the detection result with a lower frequency than the acceleration sensor 23. This is because the number of sampling iterations of a magnetic sensor is typically lower than the number of sampling iterations of an acceleration sensor, etc. The input/output control unit 21 uses the obtained magnetic data, as it is, as the transmit magnetic data (see FIG. 13).

As described above, in the present embodiment, the transmit magnetic data 75 included in one piece of operation data 51 is data representing one piece of magnetic direction detected by the magnetic sensor 25 (one piece of the magnetic data). In other words, the transmit magnetic data 75 is data representing a magnetic direction for one iteration detected by the magnetic sensor 25. Therefore, it is possible to reduce the data size of the operation data 51, and to realize operation data 51 of an efficient data size. While the output result of the magnetic sensor 25 can be used for calculating the attitude of the controller device 2, the attitude of the controller device 2 can also be calculated by using detection results of other sensors (the acceleration sensor 23 and/or the gyrosensor 24). Therefore, where the output result of the magnetic sensor 25 is used in combination with the output result of another sensor, it is possible to precisely calculate the attitude of the controller device 2 using one magnetic data. Note that in a variation of the present embodiment, one piece of transmit magnetic data 75 may include a plurality of pieces of magnetic data.

(Input Position Data)

The operation data 51 includes transmit input position data 76. The transmit input position data 76 represents information regarding the input position (touch position) detected by the touch panel 12 of the controller device 2. The transmit input position data 76 represents two-dimensional coordinate values representing the input position, for example. Where the touch panel 12 is of a multi-touch type, for example, the transmit input position data 76 may be data representing information regarding a plurality of input positions.

The transmit input position data 76 is data based on the input position data output from the touch panel 12. That is, the transmit input position data 76 may be the input position data itself, or may be data obtained by performing some process on the input position data.

In the present embodiment, the input/output control unit 21 obtains input position data for ten iterations (first to tenth input position data) from the touch panel 12 via the touch panel controller 22 over a period of one cycle (time T4) of transmitting the operation data 51. The input/output control unit 21 generates the transmit input position data 76 including the obtained input position data for ten iterations (see FIG. 13).

As described above, in the present embodiment, the transmit input position data 76 included in one piece of operation data 51 is data representing ten pieces of the input position detected by the touch panel 12 (ten pieces of the input position data). Now, the touch panel 12, as opposed to the sensors 23 to 25, senses whether there is an input (on the touch panel 12). There may be a case where only one of the input position data successively obtained from the touch panel 12 indicates that there is an input as a result of erroneous detection. Considering such a nature of the touch panel 12, there may be deterioration in the detection precision of the touch panel 12 if the values of the input position data are put together by such an operation as addition.

In view of this, in the present embodiment, the controller device 2 transmits a plurality of input position data, as they are, to the information processing device 3, while they are included in the transmit input position data 76. Then, the controller device 2 can improve the detection precision of the touch panel 12. Since the controller device 2 does not perform a calculation on the input position data, it is possible to simplify the process of generating the transmit input position data 76, and it is therefore possible to reduce the process load of the process of generating the operation data.

Note that in a variation of the present embodiment, one piece of transmit input position data 76 may be composed of one piece of input position data. One piece of transmit input position data 76 may represent the average value among input positions for a plurality of iterations detected by the touch panel 12.

Note that in the example described above with reference to FIG. 13, the controller device 2 includes the various operation units 12 to 14 and 23 to 25 (the touch panel 12, the direction input unit 13, the group of buttons 14, the acceleration sensor 23, the gyrosensor 24, and the magnetic sensor 25), and the operation data 51 includes the various data 71 to 76 (the transmit button data 71, the transmit specified direction data 72, the transmit acceleration data 73, the transmit angular velocity data 74, the transmit magnetic data 75, and the transmit input position data 76). Note however that there is no limitation on the specific content of the operation units of the controller device 2 or the specific content of the operation data 51. Data included in the operation data may be any of the following.

(cases where operation data includes any one of data 71 to 76)
  only data 71
  only data 72
  only data 73
  only data 74
  only data 75
  only data 76

(cases where operation data includes any two of data 71 to 76)
  data 71 and 72
  data 71 and 73
  data 71 and 74
  data 71 and 75
  data 71 and 76
  data 72 and 73
  data 72 and 74
  data 72 and 75
  data 72 and 76
  data 73 and 74
  data 73 and 75
  data 73 and 76
  data 74 and 75
  data 74 and 76
  data 75 and 76

(cases where operation data includes any three of data 71 to 76)
  data 71, 72, and 73
  data 71, 72, and 74
  data 71, 72, and 75
  data 71, 72, and 76
  data 71, 73, and 74
  data 71, 73, and 75
  data 71, 73, and 76
  data 71, 74, and 75
  data 71, 74, and 76
  data 71, 75, and 76
  data 72, 73, and 74
  data 72, 73, and 75
  data 72, 73, and 76
  data 72, 74, and 75
  data 72, 74, and 76
  data 72, 75, and 76
  data 73, 74, and 75
  data 73, 74, and 76
  data 73, 75, and 76
  data 74, 75, and 76

(cases where operation data includes any four of data 71 to 76)
  data 71, 72, 73, and 74
  data 71, 72, 73, and 75
  data 71, 72, 73, and 76
  data 71, 72, 74, and 75
  data 71, 72, 74, and 76
  data 71, 72, 75, and 76
  data 71, 73, 74, and 75
  data 71, 73, 74, and 76
  data 71, 73, 75, and 76
  data 71, 74, 75, and 76
  data 72, 73, 74, and 75
  data 72, 73, 74, and 76
  data 72, 73, 75, and 76
  data 72, 74, 75, and 76
  data 73, 74, 75, and 76

(cases where operation data includes any five of data 71 to 76)

data 71, 72, 73, 74, and 75
data 71, 72, 73, 74, and 76
data 71, 72, 73, 75, and 76
data 71, 72, 74, 75, and 76
data 71, 73, 74, 75, and 76
data 72, 73, 74, 75, and 76

Note that in the example described above, the controller device 2 does not need to include an operation unit, of the operation units 12 to 14 and 23 to 25, associated with data that is not included in the operation data 51.

The controller device 2 may include another operation unit other than the operation units 12 to 14 and 23 to 25, and the operation data 51 may include another data other than the data 71 to 76. For example, the controller device 2 may include a touch pad, and the operation data 51 may include data based on a detection result of the touch pad.

While it is assumed in the embodiment above that the process of generating the operation data is executed by the input/output control unit 21, the process may be executed by any component of the controller device 2. For example, the communication data management unit 27 may perform the process. For example, if the input/output control unit 21 and the communication data management unit 27 are configured as a single component (e.g., an LSI), the component may execute the process.

The information processing device 3 receives the operation data described above from the controller device 2, and executes a predetermined process based on the operation data in the first information process described above. The information processing device 3 calculates action information of the controller device 2 using the sensor data (the data 73 to 75) based on the sensors 23 to 25, for example. Action information is information regarding at least one of the attitude, the position and the movement. Then, the information processing device 3 may calculate the action information using the sensor characteristic data in addition to the sensor data. Now, the sensor characteristic data is data representing the input-output relationship (input-output characteristic) of the sensor. For example, the sensor characteristic data represents the correspondence between an input value to a sensor and an output value for that input. Specifically, for the acceleration sensor 23, for example, there are provided sensor characteristic data representing the output value when the input is 0 [G] and those when the input is ±1 [G]. For example, for the gyrosensor 24, there are provided sensor characteristic data representing the output value when the input is 0 [rpm] and those when the input is ±200 [rpm]. These sensor characteristic data are obtained by obtaining data output from a sensor when a known amount of an action (a known quantity of acceleration or angular velocity) is applied to the sensor. The output values for ±200 [rpm] are calculated based on the output values when the angular velocity of ±78 [rpm] is applied to the gyrosensor 24. Note that while sensor characteristic data are provided herein for the acceleration sensor 23 and for the gyrosensor 24, there may be sensor characteristic data provided for the magnetic sensor 25. Since the sensor characteristics may differ for each individual sensor, the content of the sensor characteristic data may be defined for each individual sensor (for each individual controller device).

The sensor characteristic data is stored in advance in the controller device 2. Then, the controller device 2 transmits the sensor characteristic data to the information processing device 3 with a predetermined timing. Note that the sensor characteristic data is transmitted separately from the operation data. For example, the sensor characteristic data may be transmitted when the controller device 2 starts communicating with the information processing device 3. When the information processing device 3 executes an information process in accordance with a detection result of a sensor associated with sensor characteristic data, the information processing device 3 executes the information process based on the sensor characteristic data and the sensor data of the sensor included in the operation data. Note that the information processing device 3 may use the sensor characteristic data and the sensor data in the information process to be executed. The information processing device 3 may execute a calibration process using the sensor characteristic data before the information process, and execute the information process using the results of the calibration process and the sensor data.

(Advantageous Effects)

With the configuration and operation described above, the controller device 2 provides the following effects. Note that in order for the following effects to be realized, the controller device 2 may have configurations that are described below along with the effects thereof, and it is not needed to have all the configurations of the present embodiment.

In the present embodiment, the controller device 2 includes operation units at least including the gyrosensor 24, the acceleration sensor 23, the direction input unit 13, and the touch panel 12, and generates the operation data 51 based on data obtained by the operation units. The controller device 2 wirelessly transmits the operation data 51 to the information processing device 3 for each iteration of a predetermined cycle. Now, the operation data 51 transmitted in a single transmission includes the following data. That is, the controller device 2 generates the operation data 51 transmitted in a single transmission so that the following data are included therein.

(1) data representing a value obtained by adding together nine pieces of angular velocity detected by the gyrosensor 24;

(2) data representing one piece of acceleration detected by the acceleration sensor 23;

(3) data representing one piece of direction detected by the direction input unit 13; and (4) data representing ten pieces of position detected by the touch panel 12.

With the above, with the controller device 2 including a gyrosensor, an acceleration sensor, a direction input unit, and a touch panel, it is possible to realize operation data of an efficient data size while ensuring the controllability of the controller device 2. With operation data including data (2) and (3) above, it is possible to reduce the data size of the operation data, and to realize operation data of an efficient data size. With operation data including the data (1) above, it is possible to reduce the data size of the operation data. It is also possible to simplify the operation data generation process. With operation data including the data (4) above, it is possible to improve the detection precision of the touch panel 12. It is also possible to reduce the process load of the process for generating the operation data. Note that in the above, there is no limitation on the operation data transmission frequency, and the controller device 2 can realize the effects described above, irrespective of the transmission frequency.

Note that the data (1) above is not limited to data representing a value obtained by adding together the values of angular velocities for nine iterations actually detected by the gyrosensor, but may be any data that as a result represents a value equivalent to the sum of the angular velocities for nine iterations. For example, in a case where the gyrosensor can only detect the angular velocity for fewer iterations than nine over a period of one cycle of transmitting the operation data for some reason (e.g., the capability of the sensor), the controller device 2 may generate the data (1) above by calculating, from the detected angular velocities, the value obtained by adding together nice pieces of angular velocity. Specifically, the controller device 2 may generate the data (1) above by multiplying a single value of angular velocity detected by nine. This also provides effects similar to those described above.

In a case where the touch panel can only detect positions for fewer iterations than ten for some reason, the controller device 2 may generate the data (4) above by generating, from the detected positions, values of ten pieces of position. For example, the controller device 2 may generate the data (4) above by generating ten pieces of position by copying some of the positions, fewer than ten, detected by the touch panel. This also provides effects similar to those described above.

Note that in a variation of the present embodiment, the operation data may not include some or all of the data (1) to (4) above.

In the present embodiment, the controller device 2 includes operation units at least including the gyrosensor 24, the acceleration sensor 23, and the touch panel 12, and generates the operation data 51 based on data obtained by the operation units. The controller device 2 wirelessly transmits the operation data 51 to the information processing device 3 for each iteration of a predetermined cycle. Now, the operation data 51 transmitted in a single transmission includes the following data.

(1') data representing a value obtained by adding together angular velocities for a plurality of iterations (e.g., nine iterations) detected by the gyrosensor 24;

(2') data representing the average value among accelerations for a plurality of iterations (e.g., four iterations) detected by the acceleration sensor 23; and (4') data representing positions for a plurality of iterations (e.g., ten iterations) detected by the touch panel 12.

Then, the controller device 2 can provide effects similar to those of a case where the operation data includes the data (1) to (4) above.

Note that in a case where the gyrosensor can only detect angular velocities for fewer iterations than nine for some reason, the controller device 2 may generate the data (1') above by calculating, from the detected angular velocities, the values of the angular velocities for nine iterations. In a case where the touch panel can only detect positions for fewer iterations than ten for some reason, the controller device 2 may generate, from the detected positions, the data (4') above by generating the values of positions for ten iterations. This also provides effects similar to those described above.

Note that in a variation of the present embodiment, the operation data may not include some or all of the data (1') to (4') above.

Moreover, in the present embodiment, the operation unit further includes the magnetic sensor 25, and the operation data further includes the following data.

(5) data representing one piece of magnetic direction detected by the magnetic sensor 25 (in other words, data representing a magnetic direction for one iteration detected by the magnetic sensor 25)

Then, the controller device 2 can transmit data based on the detection result of the magnetic sensor 25 to the information processing device 3 while reducing the data size of the operation data. Note that in a variation of the present embodiment, the operation data may not include the data (5) above.

Moreover, in the present embodiment, the controller device 2 generates the operation data 51 including data (the transmit acceleration data 73) representing the average value among accelerations for a plurality of iterations (e.g., four iterations) detected by the acceleration sensor 23 as the data (2) above.

Then, it is possible to improve the detection precision of the acceleration applied on the controller device 2, and it is thus possible to improve the controllability of the controller device 2. Note that in a variation of the present embodiment, the operation data 51 may not include data representing the average value of acceleration.

Moreover, in the present embodiment, the controller device 2 generates the operation data 51 including data representing the average value among specified directions for a plurality of iterations (e.g., four iterations) detected by the direction input unit 13 (the transmit specified direction) as the data (3) above. Then, it is possible to precisely calculate the direction specified by the user, and it is thus possible to improve the controllability of the controller device 2. Note that in a variation of the present embodiment, the operation data 51 may not include data representing the average value of specified direction.

Moreover, in the present embodiment, the controller device 2 includes, in the operation data 51, data representing the average value among accelerations for 2 to the $n^{th}$ power iterations (n is an integer greater than or equal to 1). Then, since the division for calculating the average value can be done through a bit shift operation, it is possible to simplify the process of generating the operation data 51, and to reduce the process load on the controller device 2. Note that in a variation of the present embodiment, the operation data 51 may not include data representing the average value among accelerations for 2 to the $n^{th}$ power iterations.

In the embodiment above, it can be said that the controller device 2 has the following configuration. That is, the controller device 2 includes a first sensor (e.g., the magnetic sensor 25), a second sensor (e.g., the acceleration sensor 23) for outputting detection results with a higher frequency than the first sensor, and a third sensor (e.g., the gyrosensor 24) for outputting detection results with a higher frequency than the second sensor, wherein the controller device 2 generates operation data including the following data.

data representing a value for one iteration detected by the first sensor;

data representing an average value among values for a plurality of iterations detected by the second sensor; and data representing a sum of values for a plurality of iterations detected by the third sensor.

With the configuration described above, the controller device 2 includes, in the data to be transmitted, data representing a value for one iteration detected by the first sensor, whereby it is possible to reduce the data size of the operation data. Since the controller device 2 includes, in the data to be transmitted, data representing an average value among values for a plurality of iterations detected by the second sensor, it is possible to improve the detection precision of the second sensor while suppressing the data size of the operation data. Moreover, since the controller device includes, in the data to be transmitted, data representing the sum of values for a plurality of iterations detected by the third sensor, it is possible to improve the detection precision of the third sensor while suppressing the data size of the operation data. Note that since the detection frequency of the third sensor is higher than the second sensor, and more data are output from the third sensor, it is possible to reduce the process load on the controller device 2 by omitting the division for calculating the average value. Note that in a variation of the present embodiment, the operation data 51 may not include some or all of the data detected by the three sensors described above.

In the embodiment above, the controller device 2 transmits, to the information processing device 3, sensor characteristic data separately from the operation data, the sensor characteristic data representing a sensor input-output relationship (input-output characteristic) of at least one of the gyrosensor and the acceleration sensor. The information processing device 3 executes an information process based on the sensor characteristic data and the operation data in accordance with a detection result of the sensor associated with the sensor characteristic data. Then, the information processing system 1 can more precisely perform the information process using detection results of sensors, and it is possible to improve the controllability of the controller device 2. Note that in a variation of the present embodiment, the controller device 2 may not transmit the sensor characteristic data to the information processing device 3. The information processing device 3 may execute the information process, not based on the sensor characteristic data.

In the embodiment described above, the controller device 2 transmits the operation data together with other data (the management data 52) to the information processing device 3. Now, the controller device 2 can realize the effects described above in "(Advantageous effects)" above, irrespective of whether the operation data is transmitted to the information processing device 3 together with other data (transmitted while being included in the transmit information data) or the operation data is transmitted by itself.

7. Execution of Second Program

<7-1: Outline>

Figure 14:
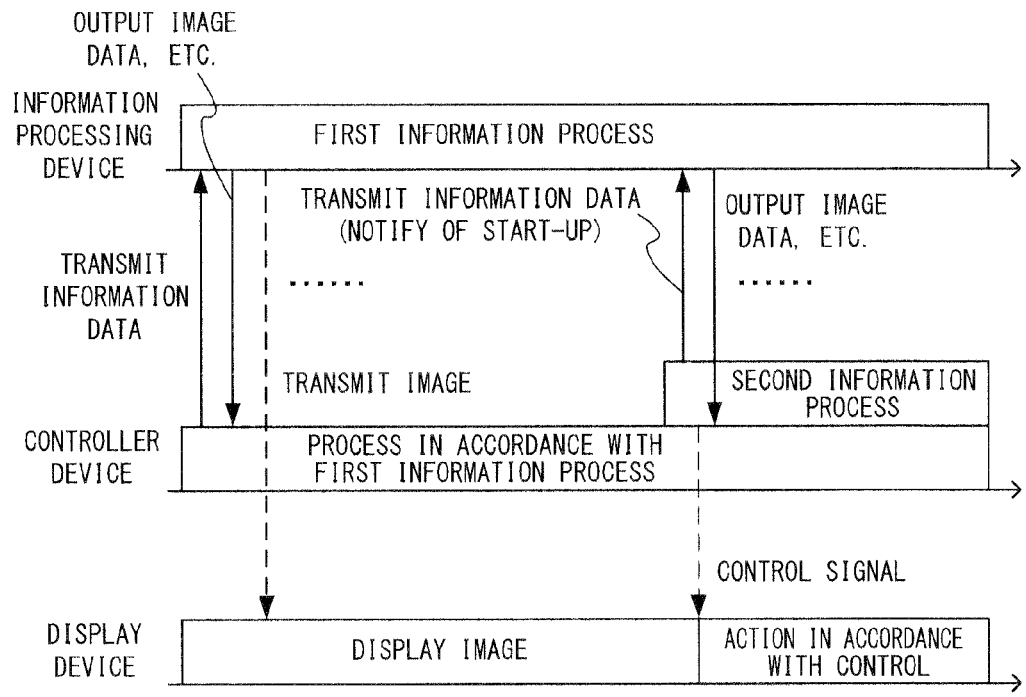
FIG. 14 A diagram showing an example of operations in various devices of the information processing system.

Next, referring to FIGS. 14 to 18, an operation where the second program (second information process) is executed in the controller device 2 will be described. FIG. 14 is a diagram showing an example of operations in various devices of the information processing system 1. In the present embodiment, where the first program (first information process) is executed in the information processing device 3, the controller device 2 can execute the second program (second information process). Now, referring to FIG. 14, the outline of operations of the various devices where the first and second information processes are executed will be described.

As shown in FIG. 14, the information processing device 3 executes the first information process. As described above, the first information process is a process executed based on the operation data for generating the output image data and/or the output sound data (hereinafter referred to also as the "output image data, etc."). Where the first information process is executed, the controller device 2 transmits the operation data (transmit information data) as described above (see FIG. 14). The information processing device 3 executes the first information process based on the operation data to generate the output image data, etc. Then, the information processing device 3 transmits the output image data, etc., to the controller device 2 (see FIG. 14). The controller device 2 receives the output image data, etc., and outputs the output image, etc. (see FIG. 14). That is, the controller device 2 displays the output image on the display unit 11, and outputs the output sound from the speaker.

As shown in FIG. 14, in the first information process, the information processing device 3 may generate an image and/or a sound to be displayed on the display device 4, and output the image and/or the sound from the display device 4. That is, the information processing device 3 may output an image to the display device 4 to display the image on the display device 4, and may output a sound to the speaker 5 to output the sound from the speaker 5. Thus, in the first information process, the display device 4 displays an image generated by the first information process.

While the first information process is being executed, if a predetermined operation is performed on the controller device 2, the controller device 2 starts executing the second information process. That is, the controller device 2 starts up the second program (starts executing the second program). The predetermined operation for starting up the second program may hereinafter be referred to as the "start-up operation".

Note that there is no limitation on the content of the second program (second information process). In the present embodiment, the second program is a program for controlling the display device (television) 4 in accordance with an operation performed on the controller device 2. In other words, the second information process is a process of outputting a control signal for controlling the display device 4 in accordance with an operation performed by the user on the controller device 2. Note that in the present embodiment, the controller device 2 controls the display device 4 by using an infrared light signal from the infrared light emitting unit 38 as the control signal, the details of which will be described below.

While the second program is being executed (i.e., during the second information process), the controller device 2 displays an image resulting from the execution of the second program on the display unit 11. An image resulting from the execution of the second program refers to an image displayed as a result of the execution of the second program (in other words, the execution of the second information process). Hereinafter, the "image resulting from the execution of the second program" will be referred to as the "second output image". In the description of "[7. Execution of second program]", the output image represented by the output image data generated by the information processing device 3 may be referred to as the "first output image". In the present embodiment, a control image is displayed on the display unit 11, for example, as the second output image. A control image is an image used for performing an operation regarding the process executed by the second program, i.e., the second information process. Specific examples of the control image will be described later.

Note that while the second program is being executed, the controller device 2 may output a sound resulting from the execution of the second program from the speaker 31. A sound resulting from the execution of the second program refers to a sound to be output as a result of the execution of the second program (in other words, the execution of the second information process). Hereinafter, the "sound resulting from the execution of the second program" will be referred to as the "second output sound". In the description of "[7. Execution of second program]", the output sound represented by the output sound data generated by the information processing device 3 may be referred to as the "first output sound".

As described above, in the present embodiment, when an output image is displayed on the controller device 2 as a result of the first information process executed on the information processing device 3 side, another information process (second information process) can be executed on the controller device 2 side. Thus, the user can use another application executed on the controller device 2 while using an application (the first program) executed on the information processing device 3. Then, the controller device 2 can be used for more information processes. The user can use the controller device 2 for more purposes, and it is possible to improve the usability for the user.

As shown in FIG. 14, while the second program is being executed, the controller device 2 transmits, to the information processing device 3, "running" data, which indicates that the second program is being executed. In the present embodiment, the "running data" is the running status data 54 described above (see FIG. 7). It can be said that button data representing the input status for the start-up button 14C described above is also "running" data. The "running" data may be transmitted by any method from the controller device 2 to the information processing device 3. Note that in the present embodiment, the "running" data is transmitted together with the operation data, i.e., while being included in the transmit information data, as described above.

Specifically, as shown in FIG. 7, the management data 52 included in the transmit information data 50 includes the running status data 54. The running status data 54 represents the running status of the second program. Specifically, the running status data 54 is flag data indicating whether the second program has started up (whether it is running). Note that where a plurality of second programs are provided, for example, the running status data 54 may represent the second program that has started up. The running status data 54 may be composed of one bit. Then, the controller device 2 can transmit the running status data 54, while it is included in the transmit information data 50, to the information processing device 3, without substantially influencing the data size of the transmit information data.

By transmitting the "running" data to the information processing device 3, the controller device 2 can convey the running status of the second program to the information processing device 3. Thus, the information processing device 3 can identify the running status of the second program. The information processing device 3 may change the content of the first information process, depending on the running status of the second program, the details of which will be described below.

As shown in FIG. 14, in the present embodiment, the first information process continues to be executed while the execution of the second program is being executed (as does while the second program is not being executed). That is, while the second program is being executed, the information processing device 3 executes the first information process to transmit the output image data, etc. to the controller device 2. In response to this, the controller device 2 displays, on the display unit 11, the output image (first output image) represented by the output image data from the information processing device 3. That is, the controller device 2 receives the output image data and displays the first output image, irrespective of whether the second program is being executed. Therefore, while the second program is being executed, the controller device 2 displays the first output image, together with the second output image, on the display unit 11. Thus, according to the present embodiment, the user can check both the first information process and the second information process by looking at the display unit 11.

<7-2: Example of Image During Execution>

Figure 15:
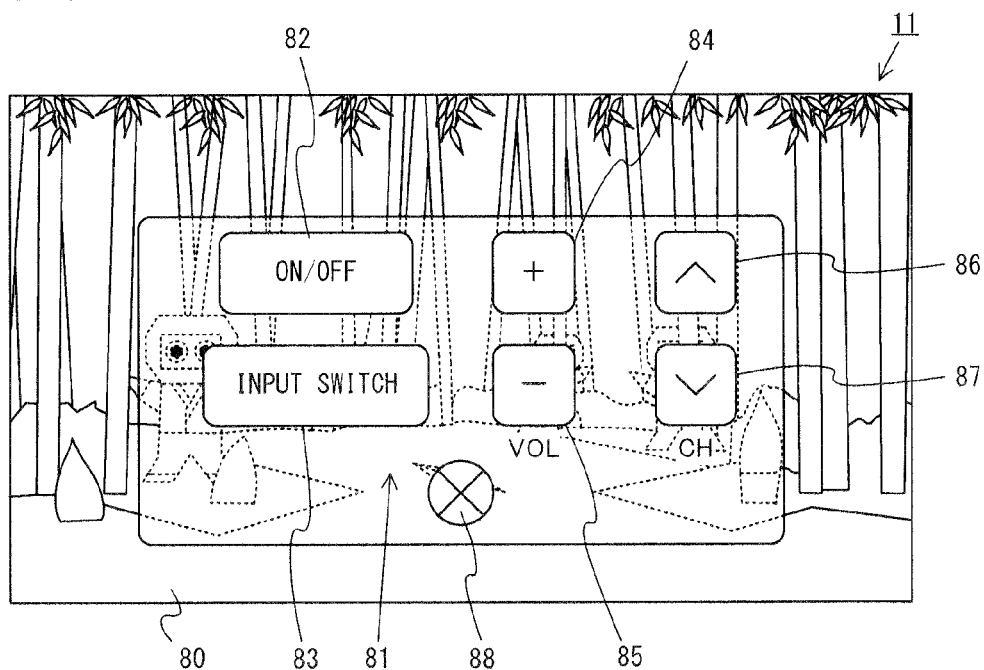
FIG. 15 A diagram showing an example of an image displayed on the controller device while a second information process is being executed.

FIG. 15 is a diagram showing an example of an image displayed on the controller device while the second information process is being executed. In FIG. 15, a first output image 80 is displayed on the display unit 11 of the controller device 2. The first output image 80 is an image generated as a result of the execution of the first program, and there is no limitation on the specific content thereof. FIG. 15 illustrates a case where the first program is a game program, and a game image is displayed as the first output image 80. That is, the information processing device 3 executes the game process, and transmits the game image data generated by the game process to the controller device 2 as the output image data. The controller device 2 receives the game image data. Then, the controller device 2 displays an image represented by the game image data on the display unit 11. Where the information processing device 3 is capable of communicating with another information processing device via a network (e.g., the Internet), the first program may be a browser program, for example, and an image of a webpage may be displayed as the first output image 80.

A control image 81 is also displayed on the display unit 11 as the second output image. The control image 81 is laid over the first output image 80, for example. Note that in FIG. 15, a part of the control image 81 (a part other than the button images) is displayed as being translucent (represented by dotted lines in FIG. 15). Note however that a part or whole of the control image 81 may be opaque, or a part thereof may be transparent.

The control image 81 is an image relating to user operations performed on the process (the second information process) executed by the second program. In the present embodiment, the control image 81 is an image used for performing an operation on the second information process. Specifically, the control image 81 includes button images 82 to 88 used for making instructions to the second information process.

As described above, in the present embodiment, the second program is a program capable of controlling the action of the display device 4. Therefore, the control image 81 includes the button images (button images representing operations to be performed on the display device 4) 82 to 87 used for performing operations on the display device 4. Specifically, the control image 81 includes the power button image 82 used for instructing to turn ON/OFF the power of the display device 4. The control image 81 includes the input switch button image 83. The input switch button image 83 is a button image used for instructing to switch between inputs to the display device 4 (e.g., switch between a mode in which television broadcast video is received and displayed, and another mode in which the output image from the information processing device 3 is received and displayed). The control image 81 includes the volume up button image 84 and the volume down button image 85. The volume up button image 84 is a button image for instructing to increase the sound volume of the display device 4. The volume down button image 85 is a button image used for instructing to decrease the sound volume of the display device 4. The control image 81 includes the channel increment button image 86 and the channel decrement button image 87. The channel increment button image 86 is an image representing an instruction to change, by one, the channel selection of the display device (television) 4 in the ascending order. The channel decrement button image 87 is an image representing an instruction to change, by one, the channel selection of the display device 4 in the descending order.

Through an operation on the button images 82 to 87 (specifically, an operation of touching the button images), the user can operate the power, input switch, sound volume, and channel selection of the display device 4. Note that the control image 81 may include only some of the button images 82 to 87. The control image 81 may include buttons, which an ordinary television remote controller would have, in addition to, or instead of, the button images 82 to 87. For example, the control image 81 may include some of button images representing channel numbers, a button image representing an instruction to display the EPG (Electronic Program Guide) obtained from television broadcast, and a button image representing an instruction to record video (where the display device 4 has a video recording function). The control image 81 may include an image of the program listing.

The control image 81 includes the end button image 88 as a button image for making instructions to the second information process. The end button image 88 is a button image for ending the second information process, i.e., instructing to end the execution of the second program. The user can end the second information process through an operation on the end button image 88.

Note that an example has been described above where a button image used for performing an operation is displayed as an example of the "image relating to an operation", which is displayed as the second output image. Note that the "image relating to an operation" may be, for example, an image showing a method of operation. The "image relating to an operation" may be an image showing the correspondence between a button on the controller device 2 and an instruction made by the button, e.g., "L button: volume up" and "R button: volume down" (in other words, the association between buttons and instructions).

<7-3: Use of Operation Data in Information Processes>

As described above, in the present embodiment, the first information process is also executed while the second information process is being executed. Thus, both operations for the first information process and operations for the second information process are performed with the controller device 2. That is, each component of the controller device 2 may be possibly used for any of the information processes. Therefore, in the present embodiment, the components of the controller device 2 are used as follows so that the controller device 2 is compatible with the two information processes. The details will now be described.

FIG. 16 is a diagram showing an example of correspondence between the first and second information processes and the use of the components of the controller device 2. Some of the group of buttons 14 (except for the start-up button 14C) of the controller device 2 are used in the second information process. That is, some of the buttons 14A to 14I are used in the second information process. For example, the cross button 14A may be used for an operation of changing the selection of a button image, and any of the group of buttons 14E may be used for confirming the execution of an instruction represented by the button image being selected.

Since the group of buttons 14 (except for the start-up button 14C) are used in the second information process as described above, they are not used (invalidated) in the first information process while the second information process is being executed. Note that those of the group of buttons 14 that are not used in the second information process may be used in the first information process while the second information process is being executed.

The start-up button 14C is used in the second information process for starting up (or ending) the second program. Therefore, the start-up button 14C is not used in the first information process, irrespective of whether the second information process is being executed.

The direction input unit 13 is used in the second information process. For example, the direction input unit 13 may be used for an operation of changing the selection of a button image. The direction input unit 13 is not used in the first information process while the second information process is being executed.

The sensors 23 to 25 are not used in the second information process. Therefore, in the first information process while the second information process is being executed, the sensors 23 to 25 are handled as they are during solo-process execution. Note that the "solo-process execution" refers to when the first information process is being executed while the second information process is not being executed. That is, sensors that are used during solo-process execution are used, as they are, in the first information process also while the second information process is being executed. On the other hand, sensors that are not used during solo-process execution are still not used in the first information process while the second information process is being executed.

The touch panel 12 is used in the second information process. The touch panel 12 is used for performing operations on the button images, for example. Therefore, it is not used in the first information process.

The microphone 32 is not used in the second information process. Therefore, in the first information process while the second information process is being executed, the microphone 32 is handled as it is during solo-process execution.

The camera 16 is not used in the second information process. Therefore, in the first information process while the second information process is being executed, the camera 16 is handled as it is during solo-process execution.

As described above, input units (the operation units, the microphone 32, and the camera 16) are each used in one of the two information processes. That is, those input units that are used in the second information process are not used in the first information process. On the other hand, those that are not used in the second information process are handled as they are during solo-process execution in the first information process. Thus, a user input on one information process will not be used erroneously in the other information process, thus preventing erroneous inputs.

Note that "an operation unit being not used in the first information process" means that the information processing device 3 executes the first information process while any operations on the operation unit are invalidated or, in other words, the information processing device 3 executes the first information process while invalidating the operation data representing any operation on the operation unit. Then, the controller device 2 may or may not transmit, to the information processing device 3, the operation data regarding the operation unit not used in the first information process.

The components having the output function or the communication function are handled as follows. While the second information process is being executed, the speaker 31 is used in both the first and second information processes. Therefore, the user can hear both sounds of the two information processes. For example, the controller device 2 can warn the user by outputting an alert sound in both of the two information processes.

Specifically, the controller device 2 (the communication data management unit 27 and/or the sound IC 30) mixes together a sound by the first information process (the first output sound) and a sound by the second information process (the second output sound), and outputs the mixed sound from the speaker 31. Now, in the present embodiment, while the second information process is being executed, the controller device 2 outputs the first output sound at a lower sound volume than that during solo-process execution of the first information process. The controller device 2 may output the first output sound while setting a smaller ratio with respect to the second output sound. Specifically, the controller device 2 may mix together and output the first output sound and the second output sound at a ratio of 25:100 (denoted as "sound volume: 25%" in FIG. 16). Then, the controller device 2 can make the second output sound easier to hear for the user, and can allow the user to hear both sounds of the two information processes.

The vibrator 39 is not used in the second information process. The vibrator 39 is also not used in the first information process while the second information process is being executed, in view of the possibility that the actuation of the vibrator 39 while the second information process is being executed may give some influence on the operation regarding the second information process.

The marker unit 15 is not used in the second information process. Therefore, in the first information process while the second information process is being executed, the marker unit 15 is handled as it is during solo-process execution.

The infrared light emitting unit 38 is used in the second information process. Note that in the first information process, the infrared light emitting unit 38 is not used (the use thereof is prohibited).

The infrared communication unit 36 is not used in the second information process. In the second information process, since the infrared light emitting unit 38 is used, an infrared light signal from the infrared light emitting unit 38 is emitted through the window 20 (see FIG. 3) of the controller device 2. Therefore, in the first information process while the second information process is being executed, the use of the infrared communication unit 36 is prohibited, in view of the possibility that the output of the infrared light signal from the infrared communication unit 36 may have some influence on the infrared light signal from the infrared light emitting unit 38.

The near field communication unit 37 is not used in the second information process. In the first information process while the second information process is being executed, the use of the near field communication unit 37 is prohibited, in view of the possibility that the use of the near field communication unit 37 may cause some influence (an operation error, etc.).

As described above, components that communicate with an external device in extension communication (the infrared communication unit 36 and the near field communication unit 37) are not used in the first information process while the second information process is being executed. Therefore, it is possible to reduce the possibility of an operation error, etc. Note however that in a variation of the present embodiment, the components may be used in the first information process while the second information process is being executed.

Note that "a component having the communication function being not used in the first information process" means that the information processing device 3 executes the first information process while invalidating the data that the component obtains from an external device (the second extension communication data, etc.). Then, the controller device 2 may or may not transmit the data to the information processing device 3.

The connector 26 is not used in the second information process. Where a peripheral device having an additional operation function is connected to the connector 26, the connector 26 is handled as it is during solo-process execution in the first information process while the second information process is being executed so that the peripheral device can be used after the execution of the second information process. Note that in the first information process while the second information process is being executed, the use of the connector 26 may be prohibited in view of the possibility that the use of the connector 26 may cause some influence (an operation error, etc.).

Note that where the use of a component having the communication function is prohibited, the controller device 2 does not transmit communication-related control instructions (commands). If communication connection is alive at the point in time when the use is prohibited (at the point in time when the second program is started up), the controller device 2 executes a process of stopping (disconnecting) the communication.

<7-4: Process Example>

Figure 17:
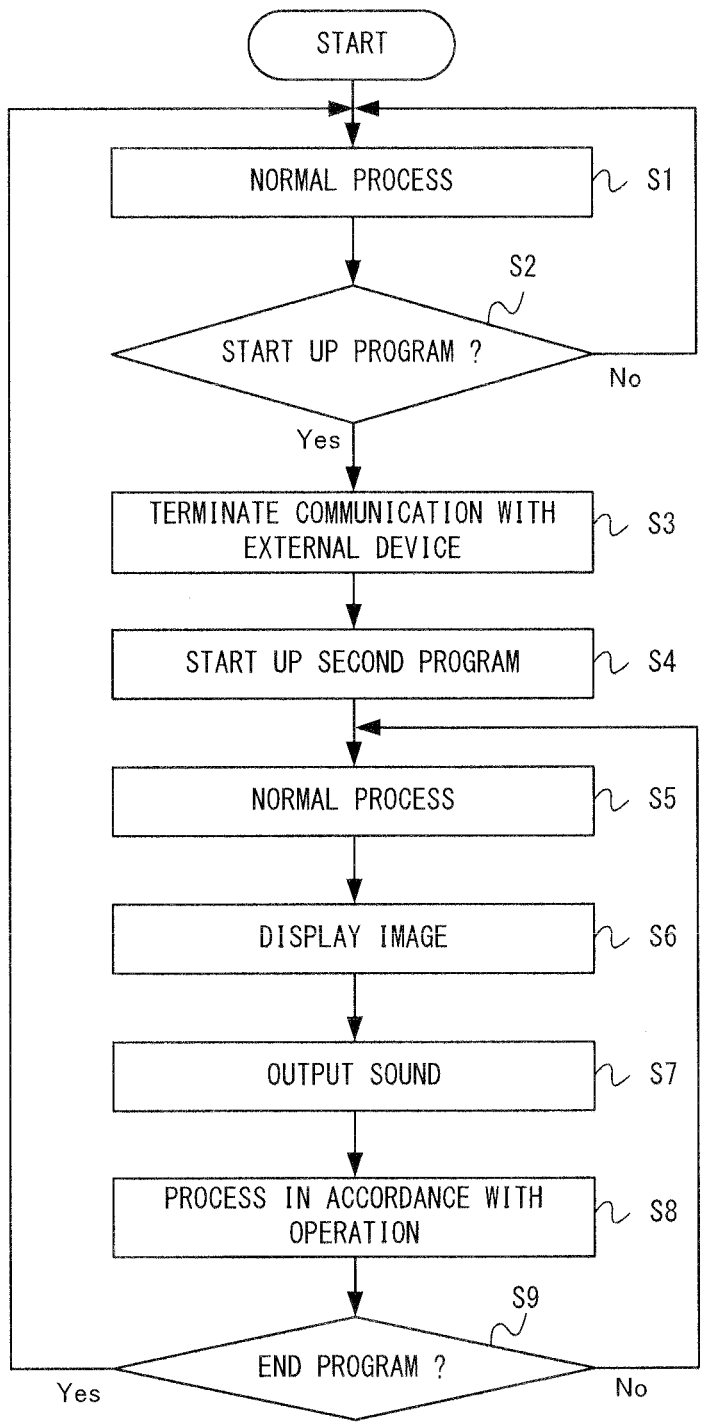
FIG. 17 A flow chart showing an example of a process of the controller device.

Next, an example of the flow of a process in the controller device 2 and the information processing device 3 will be described. FIG. 17 is a flow chart showing an example of the process in the controller device 2. In the present embodiment, the process in the controller device 2 is executed in the communication data management unit 27. Now, after the start-up of the controller device 2 and the information processing device 3, the information processing device 3 starts executing the first program in response to the user giving an instruction to execute the first program. The flow chart shown in FIG. 17 shows the process executed after the start of execution of the first program. Note that the execution of the first program may be started by any method. For example, in response to the start-up of the controller device 2 and the information processing device 3, a menu screen may be displayed on the controller device 2, and the first program may be started up in response to the user giving an instruction to execute the first program while the menu screen is being displayed. The first program may be started up automatically after the start-up of the controller device 2 and the information processing device 3.

The processes of the steps shown in FIG. 17 are executed by the communication data management unit 27. Note however that the processes of the steps may be executed by any component of the controller device 2, and it is not limited to the communication data management unit 27.

After the start of execution of the first program, in step S1, a process in accordance with the first information process is executed. That is, the controller device 2 receives data transmitted from the information processing device 3, and executes a process in accordance with the received data. For example, the communication data management unit 27 receives the output image data, and displays the output image on the display unit 11. For example, the communication data management unit 27 receives the output sound data, and outputs the output sound from the speaker 31. The controller device 2 generates the data to be transmitted to the information processing device 3, and transmits the data to the information processing device 3. For example, the input/output control unit 21 generates operation data, and the communication data management unit 27 generates transmit information data including the generated operation data, and transmits the transmit information data to the information processing device 3. For example, the communication data management unit 27 transmits the camera image data and/or the microphone sound data to the information processing device 3 as necessary. For example, the communication data management unit 27 communicates with an external device as necessary, and transmits the data obtained through the communication to the information processing device 3 and/or receives data necessary for the communication from the information processing device 3. Note that the specific content of the processes described above executed in step S1 is described in [4. Data transmitted/received between controller device and information processing device] to [6. Generation of operation data] above.

In step S2, the controller device 2 determines whether or not to start up the second program. That is, the controller device 2 determines whether the start-up operation described above has been performed. Note that the controller device 2 can make the determination of step S2 by referencing the button data representing the input status of the start-up button 14C described above, for example, to determine whether the start-up button 14C has been depressed. Note that the process of step S2 may be executed by either one of the communication data management unit 27 and the input/output control unit 21. If the determination result of the process of step S2 is affirmative, the process of step S3 is executed. On the other hand, the determination result of the process of step S2 is negative, the process of step S1 is executed.

As described above, the process of step S1 is executed repeatedly until it is determined in step S2 to start up the second program. That is, the process in accordance with the first information process is executed on the controller device 2 until the start-up operation is performed. Note that while it is assumed in the above description that the process of step S1 is executed repeatedly with a predetermined frequency, processes performed in step S1 may not always be executed with the same frequency as the frequency with which step S1 is performed. For example, where the process of step S1 is executed with the frequency of once per one-frame period (time T1) described above, the process of transmitting the transmit information data may be executed with a higher frequency than this frequency. That is, the process of transmitting the transmit information data may be executed a plurality of times in a single iteration of step S1.

In step S3, the controller device 2 stops (disconnects) communication with an external device. For example, the communication data management unit 27 executes a disconnection process, such as transmitting an instruction to disconnect the communication to the external device. Upon completion of the process of disconnecting the communication with an external device, the controller device 2 executes the process of step S4. Note that at the point in time of step S3 (at the point in time when the second program is started up), if the controller device 2 and an external device are not communicating with each other, the controller device 2 proceeds to the process of step S4 without performing the disconnection process.

In step S4, the controller device 2 starts up the second program. That is, the CPU 28 of the communication data management unit 27 reads out the second program from the flash memory 35, and starts executing the second program. Note that the processes of steps S6 to S9 to be described later are performed by the CPU 28 executing the second program. Following step S4, the process of step S5 is executed. Thereafter, the processes of steps S5 to S9 are executed repeatedly.

As described above, when a predetermined operation is performed on the controller device 2, the controller device 2 executes a predetermined program (the second program). Now, in the above description, the controller device 2 executes the predetermined program when the predetermined operation is performed in a state where an image represented by the image data received from the information processing device 3 is displayed on the display unit 11. Note that the controller device 2 may execute the predetermined program also when the predetermined operation is performed in a state where the image represented by the image data is not displayed on the display unit 11. That is, the controller device 2 may execute the second program (in response to the predetermined operation) even when the first program is not being executed in the information processing device 3.

In step S5, the controller device 2 executes a process in accordance with the first information process. The process of step S5 may be the same as the process of step S1, except that the output image display process and the output sound output process are not executed (these processes are executed in steps S6 and S7 to be described later). In step S5, the controller device 2 may not include, in the operation data, those data that are not used in the first information process during the second information process. Following step S5, the process of step S6 is executed.

In step S6, the controller device 2 displays at least the second output image on the display unit 11. As described above, in the present embodiment, the controller device 2 displays the first output image and the second output image while laying them over each other on the display unit 11. Specifically, in the process of step S6, the communication data management unit 27 obtains the second output image. Now, in the present embodiment, data used for obtaining the second output image is stored in the storage unit (e.g., the flash memory 35) in the controller device 2. The communication data management unit 27 obtains the second output image using the data stored in the storage unit. Note that the "data used for obtaining the second output image" may be the image data of the second output image itself, or data used for generating the second output image (e.g., data of a button image). The controller device 2 may obtain the "data used for obtaining the second output image" by receiving it from the information processing device 3. Next, the communication data management unit 27 generates an image obtained by laying the second output image over the first output image generated in step S5. Then, the communication data management unit 27 displays the generated image on the display unit 11. Thus, the first output image and the second output image are displayed on the display unit 11.

In step S7, the controller device 2 outputs a sound to the speaker 31. As described above, in the present embodiment, the controller device 2 outputs the first output sound and the second output sound from the speaker 31. Specifically, in the process of step S7, the communication data management unit 27 obtains the second output sound. Herein, in the present embodiment, the data used for obtaining the second output sound is stored in the storage unit (e.g., the flash memory 35) in the controller device 2. The communication data management unit 27 obtains the second output sound using data stored in the storage unit. Note that the "data used for obtaining the second output sound" may be the sound data of the second output sound itself, or data (e.g., sound source data) used for generating the second output sound. The controller device 2 may obtain "data used for obtaining the second output sound" by receiving it from the information processing device 3. Next, the communication data management unit 27 mixes together the first output sound generated in step S5 and the second output image, and outputs the mixed sound to the sound IC 30. As described above, the communication data management unit 27 may mix the first output sound and the second output sound while using a lower ratio for the first output sound. Thus, the first output sound and the second output sound are output from the speaker 31.

In step S8, the controller device 2 executes a process in accordance with an operation by the user. There is no limitation on the content of the specific process in step S8. In the present embodiment, the controller device 2 executes a process of transmitting a control signal to the display device 4 in accordance with an operation by the user. Specifically, the communication data management unit 27 determines whether an operation has been performed (e.g., a button image has been touched) on any of the button images (the button images 82 to 87) representing instructions to the display device 4. Then, if there is a button image, of the button images, on which an operation has been performed, the communication data management unit 27 outputs a control signal associated with the button image. Now, control signals to the display device 4 may be stored in the storage unit (e.g., the flash memory 35) in the controller device 2 while being associated with the button images, for example. Then, the communication data management unit 27 reads out from the storage unit a control signal that is associated with the button image that has been operated, and outputs the control signal. Note that the controller device 2 may receive and thereby obtain a control signal from the information processing device 3, and output the obtained control signal. The control signal is output as an infrared light signal by the infrared light emitting unit 38. That is, the communication data management unit 27 makes the infrared light emitting unit 38 output the control signal. Thus, the control signal is received by the infrared light receiving unit of the display device 4, and the display device 4 performs an operation in accordance with the control signal. Following step S8, the process of step S9 is executed.

Note that in step S8, where no operation has been performed on the button images (i.e., where there is no button image that has been operated), the controller device 2 does not output the control signal.

In step S9, the controller device 2 determines whether or not to end the second program. The determination of step S9 is done based on whether an operation to end the second program has been performed, for example. The operation to end the second program may be, for example, an operation performed on the start-up button 14C described above (while the second information process is being executed), or an operation performed on the end button image 88 (FIG. 15) described above. Note that the controller device 2 can make the determination of step S9 by referencing the button data representing the input status of the start-up button 14C described above, for example, to determine whether the start-up button 14C has been depressed. The controller device 2 can make the determination of step S9 by referencing the input position data, for example, to determine whether an operation on the end button image 88 has been performed. If the determination result of step S9 is negative, the process of step S5 is executed again. Thereafter, a series of processes of steps S5 to S9 are executed repeatedly until the determination result of step S9 is affirmative. On the other hand, if the determination result of step S9 is affirmative, the process of step S1 is executed again. Then, the execution of the second program is ended, and the controller device 2 executes a process in accordance with the first information process.

Note that in the flow chart shown in FIG. 17, it is assumed that the controller device 2 executes the processes of steps S3 to S9 in series. Note however that in the present embodiment, the controller device 2 may execute some of the processes of steps S3 to S9 in parallel.

Figure 18:
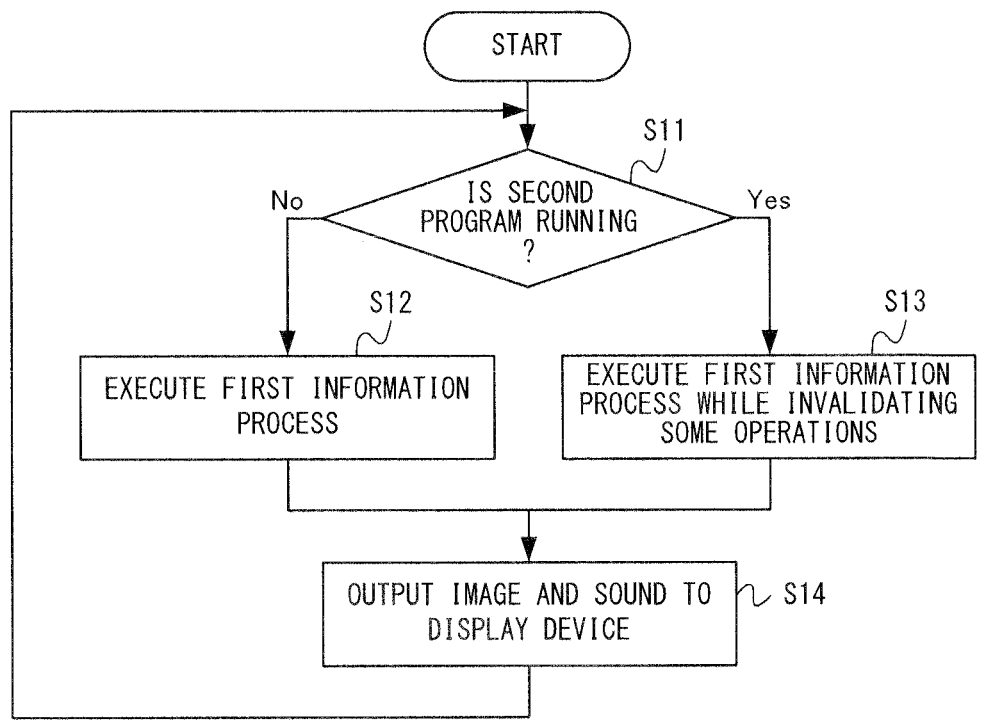
FIG. 18 A flow chart showing an example of a process of the information processing device.

FIG. 18 is a flow chart showing an example of the process of the information processing device 3. The flow chart shown in FIG. 18 shows the process to be executed after the start of the execution of the first program in the information processing device 3. It is assumed that the processes of the steps shown in FIG. 18 are executed by the CPU 42 of the control unit 41. Note however that it is not limited to the CPU 42, and the processes of the steps may be executed by any component of the controller device 2.

After the start of the execution of the first program, in step S11, the information processing device 3 determines whether the second program is being executed. The information processing device 3 makes the determination based on the running status data described above received from the controller device 2, for example. That is, the CPU 42 references the running status data included in the operation data received from the controller device 2 to determine whether the running status data is indicating that the second program is being executed. Note that the information processing device 3 may make the determination using the button data of the start-up button 14C instead of, or in addition to, the running status data. If the determination result of the process of step S11 is negative, the process of step S12 is executed. On the other hand, if the determination result of the process of step S11 is affirmative, the process of step S13 is executed.

In step S12, the information processing device 3 executes the first information process. That is, the information processing device 3 receives the operation data from the controller device 2, and executes the first information process based on the received operation data to generate the output image data (and the output sound data). The information processing device 3 transmits the output image data (and the output sound data) to the controller device 2. Then, the information processing device 3 may transmit, to the controller device 2, a control instruction instructing the components (e.g., the vibrator 39, and the marker unit 15, etc.) of the controller device 2 to perform operations. Note that this control instruction may be transmitted as the control data described above. The information processing device 3 may transmit, to the controller device 2, the first extension communication data described above regarding communication between the controller device 2 and an external device.

Note that in step S12, the information processing device 3 uses the operation data as an input for the first information process without imposing any limitation due to the fact that the second information process is being executed. That is, the information processing device 3 executes the first information process without invalidating some data included in the operation data. Note however that the button data of the start-up button 14C is not used in the first information process. Following step S12, the process of step S14 to be described later is executed.

The information processing device 3 may use the camera image data and/or the microphone sound data from the controller device 2 in the first information process. That is, the information processing device 3 may execute the information process using the operation data and the camera image data (and/or the microphone sound data) received from the controller device 2. For example, in the first information process, the information processing device 3 may execute a process of performing a predetermined retouch on the image represented by the camera image data to display the processed image on the display device 4, or may recognize the sound represented by the microphone sound data to execute a process in accordance with the result of sound recognition.

The information processing device 3 may use the second communication management data from the controller device 2 in the first information process. That is, the information processing device 3 may execute an information process using the operation data and the communication management data received from the controller device 2. For example, the information processing device 3 may change the content of the information process in accordance with the content of the communication management data, or may execute an information process using the operation data and the communication management data as an input.

On the other hand, in step S13, the information processing device 3 executes the first information process while invalidating some of the operations performed on the controller device 2. That is, the information processing device 3 executes the first information process without using some data of the operation data received from the controller device 2 to generate the output image data (and the output sound data). Note that examples of operation units that are invalidated (the use of which is restricted) in the first information process are described in "<7-3: Use of operation data in information processes>" above. In the first information process in step S13, the information processing device 3 does not transmit a control instruction for actuating the vibrator 39 to the controller device 2. In the first information process in step S13, the information processing device 3 does not transmit, to the controller device 2, the first extension communication data regarding communication between the controller device 2 and an external device. Following step S13, the process of step S14 is executed.

In step S14, the information processing device 3 outputs an image and a sound to the display device 4. The image and the sound to be output to the display device 4 may be generated in the process of step S12 or S13, or generated based on the first information process in step S14. The CPU 42 outputs the image and the sound generated to the AV-IC 47. The AV-IC 47 outputs the image to the display device 4 via the AV connector 48. Thus, the image is displayed on the display device 4. The AV-IC 47 outputs the sound to the speaker 5 via the AV connector 48. Thus, the sound is output from the speaker 5.

Following step S14, the process of step S11 described above is executed again. The information processing device 3 repeatedly executes a process loop composed of a series of processes of steps S11 to S14 at a rate of once per a predetermined period of time (e.g., one-frame period). Note that the information processing device 3 ends the series of processes shown in FIG. 18 when the user, etc., gives an instruction to end, for example.

Note that the processes of the steps in the flow chart shown in FIGS. 17 and 18 are merely illustrative, and the order of the steps may be switched around or other processes may be executed in addition to the processes of the steps, as long as similar results are obtained.

<7-5: Advantageous Effects>

With the configuration and operation described above, the controller device 2 provides the following effects. Note that in order for the following effects to be realized, the controller device 2 may have configurations that are described below along with the effects thereof, and it is not needed to have all the configurations of the present embodiment.

As described above, in the present embodiment, the controller device 2 transmits operation data to the information processing device 3, and receives, from the information processing device 3, image data generated in the information processing device 3 through a process performed based on the operation data. Then, if a predetermined operation (start-up operation) is performed on the controller device 2, the controller device 2 executes a predetermined program (second program) and displays at least the image resulting from the execution of the program on the display unit. The controller device 2 transmits data ("running" data) indicating that the predetermined program is being executed to the information processing device 3. Thus, while an image obtained by the information process executed on the information processing device 3 (the first information process) is displayed on the controller device 2, another information process (the second information process) can be executed on the controller device 2. Thus, the controller device 2 can be used for more information processes. The user can use the controller device 2 for more purposes, and it is possible to improve the usability for the user. In the present embodiment, since data indicating that the predetermined program is being executed is transmitted to the information processing device 3, the information processing device 3 can identify the execution status of the program. Therefore, the information processing device 3 can change the content of the information process of generating the image data based on the operation data, in accordance with the execution status of the program.

In the present embodiment, the controller device 2 at least displays, as the image (the second output image) resulting from the execution of the program (the second program), the control image 81 used for performing an operation regarding a predetermined process executed by the program. Then, an input for the information process of the information processing device 3 can be made by using the controller device 2, and also an input for the information process of the controller device 2 can be made by using the controller device 2. Note that in a variation of the present embodiment, the controller device 2 may display an image other than the control image.

In the present embodiment, the controller device 2 receives the image data from the information processing device 3, irrespective of whether the predetermined program is being executed. Then, while the program is being executed, the controller device 2 displays an image represented by the image data (the first output image), together with the image resulting from the execution of the program (the second output image). Then, an image regarding an information process of the information processing device 3 is displayed on the controller device 2, and also an image regarding an information process of the controller device 2 is displayed on the controller device 2. That is, the controller device 2 can present, to the user, images regarding the two information processes. The user can check both of the two images using the controller device 2. Note that in a variation of the present embodiment, the controller device 2 may not receive the image data from the information processing device 3 while the predetermined program is being executed. In a variation of the present embodiment, the controller device 2 may not display the image represented by the image data (the first output image) while the program is being executed.

In the present embodiment, the controller device 2 executes a predetermined process (the second information process) using, as an input, an operation performed on one or more of the operation units (some of the group of buttons 14, the direction input unit 13, and the touch panel 12). Then, when data ("running") indicating that the predetermined program is being executed is received, the information processing device 3 generates the image data by executing a process based on the operation data while invalidating operations performed on the one or more of the operation units. Then, an operation performed on the one or more of the operation units of the controller device is used in the predetermined process executed in the controller device 2 and is not used in the process executed in the information processing device 3. Therefore, an operation performed on a certain operation unit is not used in a process that is not intended by the user, thereby preventing an erroneous input. Note that in a variation of the present embodiment, the information processing device 3 may execute a process based on the operation data without invalidating the operation performed on the one or more of the operation units even if the data ("running") indicating that the predetermined program is being executed is received.

In the present embodiment, the controller device 2 includes, as the one or more of the operation units, the touch panel 12 provided on a screen of the display unit 11. Then, the controller device 2 can allow the user to make an input for an information process on the controller device 2 through an intuitive operation using the touch panel 12. Moreover, when an image used for performing an operation on the information process (e.g., a button image used for making an instruction to the information process) is displayed on the display unit 11 as the control image, it is possible to present, to the user, an intuitive and easy operation on the image. Note that in a variation of the present embodiment, the one or more of the operation units may be an operation unit other than the touch panel.

In the present embodiment, the controller device 2 includes, as the one or more of the operation units, one or more buttons. Then, the controller device 2 can allow the user to make an input for an information process of the controller device 2 through an easy operation using a button. Note that in a variation of the present embodiment, the one or more of the operation units may be an operation unit other than buttons.

In the present embodiment, the controller device 2 includes a sensor (the acceleration sensor 23, the gyrosensor 24, and the magnetic sensor 25) for detecting at least one of a position, an attitude and a movement of the controller device 2. The controller device 2 transmits operation data including data based on detection results obtained by the sensor (for the process of generating the image data in the information processing device 3), irrespective of whether the predetermined program is being executed. Then, the controller device 2 executes the predetermined process (the second information process) without using the detection results obtained by the sensor. Then, the operation of moving the controller device 2 itself will not be used in the process of the controller device 2 against the intension of the user, thereby preventing an erroneous input. Where the information processing device 3 uses operation data including data based on detection results obtained by the sensors, the controller device 2 can allow the user to make an input for the information process in the information processing device 3 through an intuitive operation of moving the controller device 2 itself. Moreover, where an input for the information process in the controller device 2 is made by using the touch panel 12, it is possible to provide the user with intuitive operations for both the information process in the controller device 2 and the information process in the information processing device 3. Note that in a variation of the present embodiment, the controller device 2 may execute the predetermined process using data based on the detection results obtained by the sensors.

In the present embodiment, the controller device 2 outputs the sound represented by the sound data from the information processing device 3 (the first output sound) and/or the sound generated by the predetermined process (the second output sound). While the predetermined program is being executed, the controller device 2 outputs the sound represented by the sound data (the first output sound) together with the sound generated by the predetermined process (the second output sound) with the sound represented by the sound data being output at a lower volume as compared with that when the program is not being executed. Then, the controller device 2 can provide the user with both a sound obtained through an information process of the controller device 2 and a sound obtained through an information process of the information processing device 3, and can provide the user with a sound obtained through an information process of the controller device 2 in an easy-to-hear manner. Note that in a variation of the present embodiment, while the predetermined program is being executed, the controller device 2 may output the sound represented by the sound data while the volume thereof is larger than (or about the same as) that when the program is not being executed.

In the present embodiment, the controller device 2 transmits, to the information processing device 3, data indicating whether the predetermined program is being executed, together with the operation data, with a predetermined frequency. Then, the information processing device 3 can reliably check the execution status of the predetermined program. Note that in a variation of the present embodiment, the controller device 2 may transmit, to the information processing device 3, data indicating whether the predetermined program is being executed, separately from the operation data.

In the present embodiment, the controller device 2 lays an image resulting from the execution of the predetermined program (the second output image) over the image represented by the image data (the first output image). Then, the controller device 2 can provide the user with both an image obtained through an information process of the controller device 2 and an image obtained through an information process of the information processing device 3, and can provide the user with an image obtained through an information process of the controller device 2 in an easy-to-view manner. Note that in a variation of the present embodiment, the controller device 2 may display the image resulting from the execution of the predetermined program separately from the image represented by the image data, or may display only the image resulting from the execution of the predetermined program.

In the present embodiment, the controller device 2 executes, as the predetermined program, a program for controlling, in accordance with an operation performed on the controller device 2, the display device 4 capable of displaying an image generated in the information processing device 3. Then, the user can operate the display device 4 using the controller device 2. Note that where the image generated in the information processing device 3 is displayed on the display device 4, for example, it is advantageous to be able to operate the display device 4 using the controller device 2.

That is, in the present embodiment, the controller device 2 executes a program for controlling, in accordance with an operation performed on the controller device 2, another device different from the controller device 2 (the display device 4 in the above description). Thus, the user can operate another device using the controller device 2.

Note that there is no limitation on the content of the predetermined program, and it is not limited to the program for controlling another device. For example, where the controller device 2 is capable of communicating with another information processing device via a network (e.g., the Internet), the predetermined program may be a program for exchanging E-mail with the other information processing device (a so-called mailer), or a program for exchanging video and sound with the other information processing device (a program having the function of a so-called television telephone).

In the present embodiment, the controller device 2 includes the infrared light emitting unit 38 for emitting an infrared light signal. The display device 4 includes an infrared light receiving unit for receiving the infrared light signal. The controller device 2 controls the display device 4 by making the infrared light emitting unit output the infrared light signal. Then, an ordinary display device (e.g., a television) having a function of receiving an infrared light signal can be used in the information processing system 1 of the present embodiment, thereby allowing various display devices to be used in the information processing system 1. Using an infrared light signal, it is possible to easily control the display device 4 with the controller device 2. Note that in a variation of the present embodiment, the controller device 2 does not need to have the function of communicating using the infrared light signal. The communication between the controller device 2 and the display device 4 may be done by methods other than the method using the infrared light signal.

In the present embodiment, the controller device 2 includes a predetermined button (the start-up button 14C), and the predetermined program is executed when an operation on the predetermined button is performed as the predetermined operation. Then, the user can easily start up the predetermined program by operating the predetermined button. Note that the predetermined operation may be done by an operation (e.g., an operation on a touch panel) other than an operation on a button.

Note that in the above, if the operation on the predetermined button is not used in the information process of the information processing device 3 (the process of generating output image data based on operation data), the user can start up the predetermined program, irrespective of the status of the information process in the information processing device 3.

In the present embodiment, the controller device 2 transmits, to the information processing device 3, data indicating whether the predetermined program is being executed, and data representing an operation on the predetermined button. Thus, the information processing device 3 receiving these data is capable of determining, with a higher precision, whether the predetermined program is being executed. Note that in a variation of the present embodiment, only one of the two data may be transmitted to the information processing device 3.

In the present embodiment, the controller device 2 further includes a storage unit (the flash memory 35) for storing an image, and displays the image stored in the storage unit on the display unit 11 when the predetermined operation (the start-up operation) is performed. Then, the controller device 2 can easily generate an image resulting from the execution of the predetermined program. Note that in a variation of the present embodiment, the image obtained as a result of the execution of the predetermined program may not be an image stored in the storage unit.

In the present embodiment, the controller device 2 receives, as the image data, game image data generated by a game process executed in the information processing device 3. The display unit 11 displays an image represented by the game image data. Then, the user can start up another program on the controller device 2 while playing a game based on a game process of the information processing device 3. Note that in a variation of the present embodiment, the information processing device 3 may execute another information process different from the game process, and another image different from the game image may be displayed on the controller device 2.

8. Examples of Other Embodiments

In the embodiment above, the transmission/reception of various data (including the running status data) between the controller device 2 and the information processing device 3 has been described in "[5. Communication operation between controller device and information processing device]". Note however that the transmission/reception of data between the controller device 2 and the information processing device 3 may be performed by any method, and there is no limitation on the transmission interval, the transmission timing, etc., of the various data.

In the embodiment above, the generation method of operation data and detailed content thereof have been described in "[6. Generation of operation data]". Note however that there is no limitation on the generation method of operation data and detailed content thereof.

Note that in the embodiment above, the information processing system 1 includes three devices (the controller device 2, the information processing device 3, and the display device 4). Note however that the information processing system may be provided as the controller device 2 and the information processing device 3 (i.e., in a form that does not include the display device 4). The information processing system may be in a form where the information processing device 3 and the display device 4 are configured as an integral unit.

INDUSTRIAL APPLICABILITY

As described above, the present invention is applicable to an information processing system such as a game system and a controller device for use therein, for example, with the aim of using a controller device capable of communicating with an information processing device for more information processes, for example.

REFERENCE SIGNS LIST

1 Information processing system
2 Controller device
3 Information processing device
4 Display device
11 Display unit
12 Touch panel
13 Direction input unit
14 Group of buttons
16 Camera
21 Input/output control unit
23 Acceleration sensor
24 Gyrosensor
25 Magnetic sensor
27 Communication data management unit
28 CPU
29 Memory
31 Speaker
32 Microphone
33 Wireless module
36 Infrared communication unit
37 Near field communication unit
38 Infrared light emitting unit
41 Control unit
42 CPU
43 Memory
44 Compression/expansion unit
45 Wireless module
50 Transmit information data
51 Operation data
52 Management data
53 Communication management data
54 Running status data
71 Transmit button data
72 Transmit specified direction data
73 Transmit acceleration data
74 Transmit angular velocity data
75 Transmit magnetic data
76 Transmit input position data
80 Output image (first output image)
81 Control image (second output image)

The invention claimed is:

1. A system including a controller device and an information processing device,
    the controller device comprising:
        a first transceiver configured to transmit operation data from the controller device to the information processing device; and
        a first processing system that includes at least one processor circuit coupled to a memory device and the first transceiver, the at least one processor circuit configured to:
            determine that a first input has been detected and/or sensed on the controller device;
            in response to determination of the first input, execute a first process using further input that is detected and/or sensed on the controller device, the first process being a process for controlling a media device different from the information processing device by causing the controller device to output a control signal that is receivable by the media device; and cause the transceiver to transmit, to the information processing device, data indicating execution of the first process, the information processing device comprising:
a second transceiver configured to receive the operation data and the data indicating execution of the first process;
a second processing system that includes at least one processor circuit coupled to a memory device and the second transceiver, the at least one processor circuit configured to:
execute a second process using the operation data received by the second transceiver; and
set the second process in a different mode in response to receiving the data indicating executing of the first process.

2. The system of claim 1, wherein the first transceiver is further configured to transmit the operation data while the first process is being executed by using the input.

3. The system of claim 1, wherein:
the controller device further comprises a display device,
the second processing system is further configured to:
generate, in accordance with execution of the second process, image data; and
transmit, via the second transceiver and to the controller device, the generated image data to the controller device, and
the first processing system is further configured to:
accept, via the first transceiver, the transmitted image data; and
generate image(s) based on the accepted image data and output the generated image(s) to the display device for display thereon.

4. The system of claim 3, wherein the image data is generated by the second process and transmitted to the controller device concurrently with execution of the first process using the further input.

5. The system of claim 1, wherein the respective execution of the first and second processes does not rely upon output of the other one of the first and second processes.

6. The system of claim 1, wherein the second processing system is further configured to:
responsive to the second process being set to the different mode from a first mode, continue executing the second process without using at least some of the received operation data that would otherwise be used when the second process is operating in the first mode.

7. The system of claim 1, wherein
the first process is part of a first computer program,
the second process is part of a second computer program,
the second computer program being different from the first computer program.

8. The system of claim 1, wherein the processing system is further configured to activate the first process in response to the first input.

9. The system of claim 1, wherein the transmitted operation includes operation data based on the input used in execution of the first process.

10. A system comprising:
a controller device; and
an information processing device,
the controller device comprising:
a first transceiver configured to transmit operation data from the controller device to the information processing device; and
a first processing system that includes at least one processor circuit coupled to a memory device and the transceiver, the at least one processor circuit configured to:
determine that a first input has been detected and/or sensed on the controller device;
perform a first process of a first program in response to the first input, the performed first process using second input that is detected and/or sensed on the controller device, the first program being a program for controlling a media device different from the information processing device by causing the controller device to output a control signal that is receivable by the media device; and
cause the transceiver to transmit, to the information processing device, data indicating performance of the first process,
the information processing device comprising:
a second transceiver configured to receive the operation data and the data indicating performance of the first process;
a second processing system that includes at least one processor circuit coupled to a memory device and the transceiver, the at least one processor circuit configured to:
perform a second process of a second program, the second program being different from the first program, using the operation data received by the second transceiver; and
set the second process in a different mode in response to receiving the data indicating performance of the first process.

11. The system of claim 10, wherein:
the controller device further comprises a display device,
the second processing system is further configured to:
generate, in accordance with execution of the second process, image data; and
transmit, via the second transceiver and to the controller device, the generated image data, and
the first processing system is further configured to:
accept, via the first transceiver, the transmitted image data; and
generate image(s) based on the accepted image data and output the generated image(s) to the display device for display thereon.

12. The system of claim 11, wherein the image data is generated by the second process and transmitted to the controller device concurrently with execution of the first process using the second input.

13. The system of claim 10, wherein the respective execution of the first and second processes does not rely upon output of the other one of the first and second processes.

14. A controller device that is configured for wireless communication with a computer system, the controller device comprising
a first transceiver configured to transmit operation data from the controller device to the computer system; and
a first processing system that includes at least one processor circuit coupled to a memory device and the first transceiver, the at least one processor circuit configured to:
determine that a first input has been detected and/or sensed on the controller device;

in response to determination of the first input, execute a first process using further input that is detected and/or sensed on the controller device, the first process for controlling a media device different from the information processing device by causing the controller device to communicate with the media device; and cause the transceiver to transmit, to the computer system, data indicating execution of the first process, wherein the computer system that the controller device wirelessly communicates with receives the operation data and the data indicating execution of the first process, executes a second process using the operation data received by the second transceiver, and sets the second process in a different mode in response to receiving the data indicating executing of the first process.

15. The controller device of claim 14, wherein the execution of the first process does not rely upon output of the second process.

16. The controller device of claim 14, wherein, while the first process is being executed, operation data unrelated to execution of the first process can be detected and transmitted to the computer system.

17. The controller device of claim 14, further comprising:
the controller device further comprises a display device,
the first processing system is further configured to:
   accept, via the first transceiver, image data transmitted from the computer system that has been generated in accordance with execution of the second process; and
   generate image(s) based on the accepted image data and output the generated image(s) to the display device for display thereon.

18. The controller device of claim 17, wherein the images from the accepted image data are output concurrently with execution of the first process that uses the further input.

* * * * *